(12) United States Patent
Shelby et al.

(10) Patent No.: US 10,034,147 B2
(45) Date of Patent: Jul. 24, 2018

(54) NEXT GENERATION BROADCAST SYSTEM AND METHOD

(71) Applicants: COHERENT LOGIX, INCORPORATED, Austin, TX (US); Sinclair Television Group, Inc., Cockeysville, MD (US)

(72) Inventors: Kevin A. Shelby, Austin, TX (US); Michael J. Simon, Frederick, MD (US)

(73) Assignees: Coherent Logix, Incorporated, Austin, TX (US); Sinclair Television Group, Inc., Cockeysville, MD (US)

( * ) Notice: Subject to any disclaimer, the term of this patent is extended or adjusted under 35 U.S.C. 154(b) by 175 days.

(21) Appl. No.: 14/498,845

(22) Filed: Sep. 26, 2014

(65) Prior Publication Data
US 2015/0085735 A1    Mar. 26, 2015

Related U.S. Application Data

(60) Provisional application No. 61/883,168, filed on Sep. 26, 2013, provisional application No. 61/883,749, (Continued)

(51) Int. Cl.
*H04W 4/06* (2009.01)
*H04H 20/72* (2008.01)
(Continued)

(52) U.S. Cl.
CPC .............. *H04W 4/06* (2013.01); *H04H 20/72* (2013.01); *H04L 1/0017* (2013.01);
(Continued)

(58) Field of Classification Search
CPC ................................ H04W 4/06; H04H 20/72
See application file for complete search history.

(56) References Cited

U.S. PATENT DOCUMENTS 6,577,353 B1   6/2003   Welles, II et al.
6,763,229 B2   7/2004   Meehan
(Continued)

OTHER PUBLICATIONS

Gardikis et al; "Dynamic IP Configuration of Terminals in Broadcasting Networks"; Computer Networks, Elsevier Science Publishers B.V., Amsterdam, NL; vol. 52, No. 1; Nov. 20, 2007 (Nov. 20, 2007); pp. 292-302; XP022354907.

*Primary Examiner* — Rasheed Gidado
(74) *Attorney, Agent, or Firm* — Meyertons Hood Kivlin Kowert & Goetzel, P.C.; Jeffrey C. Hood

(57) ABSTRACT

In a next generation broadcast architecture, a broadcast gateway may send segments of a data file to a broadcast transmission system and to a server. The broadcast transmission system wirelessly transmits the segments to a user equipment (UE) device. When the UE device fails to decode a segment, it sends a request for re-transmission of the segment to the server via an IP network. The server re-transmits the requested segment to the UE device via the IP network. Furthermore, the gateway may receive one or more IP data flows (e.g., video streams) having variable bit rate. The gateway may apply dynamically-variable coding to the IP data flows so that the resulting coded IP data flows have an aggregate bit rate that matches a constant physical transport rate of the broadcast transmission system.

10 Claims, 62 Drawing Sheets

Related U.S. Application Data filed on Sep. 27, 2013, provisional application No. 61/890,709, filed on Oct. 14, 2013.

(51) Int. Cl.

| | |
|---|---|
| *H04L 29/06* | (2006.01) |
| *H04N 21/61* | (2011.01) |
| *H04L 1/16* | (2006.01) |
| *H04L 1/18* | (2006.01) |
| *H04L 1/00* | (2006.01) |

(52) U.S. Cl.
CPC .......... *H04L 1/1678* (2013.01); *H04L 1/1877* (2013.01); *H04L 65/4076* (2013.01); *H04L 65/4084* (2013.01); *H04L 65/80* (2013.01); *H04N 21/6125* (2013.01); *H04N 21/6131* (2013.01); *H04L 1/0003* (2013.01); *H04L 1/0007* (2013.01); *H04L 1/0009* (2013.01); *H04L 1/0066* (2013.01); *H04L 2001/0093* (2013.01)

(56) References Cited

U.S. PATENT DOCUMENTS

| | | | | |
|---|---|---|---|---|
| 7,215,948 | B2* | 5/2007 | Tsukagoshi | H04L 12/185 455/414.2 |
| 2002/0001303 | A1* | 1/2002 | Boys | H04H 20/72 370/352 |
| 2002/0066097 | A1* | 5/2002 | Hattori | G06Q 30/0241 725/34 |
| 2003/0088876 | A1* | 5/2003 | Mao | H04N 7/17336 725/91 |
| 2005/0108759 | A1 | 5/2005 | Arsenault et al. | |
| 2006/0253888 | A1 | 11/2006 | Senga et al. | |
| 2007/0041320 | A1* | 2/2007 | Chen | H04W 88/181 370/235 |
| 2008/0253436 | A1 | 10/2008 | Bellec | |
| 2009/0034459 | A1* | 2/2009 | Shousterman | H04L 12/189 370/329 |
| 2009/0034479 | A1* | 2/2009 | Wakayama | H04L 45/16 370/332 |
| 2009/0178087 | A1 | 7/2009 | Menn et al. | |
| 2009/0182882 | A1* | 7/2009 | Hinrichs | H04H 60/13 709/227 |
| 2010/0080305 | A1 | 4/2010 | Guo et al. | |
| 2010/0281521 | A1* | 11/2010 | Sakakihara | G06F 21/40 726/3 |
| 2013/0055316 | A1* | 2/2013 | Brisebois | H04N 21/222 725/62 |
| 2014/0229529 | A1* | 8/2014 | Barone | H04L 65/103 709/203 |
| 2014/0235200 | A1* | 8/2014 | Cai | H04W 4/24 455/406 |
| 2014/0241168 | A1* | 8/2014 | Merlin | H04L 1/0003 370/241 |

* cited by examiner

NGB Gateway

NGB Gateway

Next Generation Broadcast Platform (NGBP)

*IP Core Network BMX Concepts*

| Bandwidth | 1.7 MHz | 2.5 MHz | 5 MHz | 6 MHz | 7 MHz | 8 MHz | 10 MHz | 15 MHz | 20 MHz |
|---|---|---|---|---|---|---|---|---|---|
| Sub-Frame | ~25ms – ~250ms | | | | | | | | |
| Sub-Carrier Spacing | 56 Hz – 22322 Hz | | | | | | | | |
| Sampling Frequency | ~1.845 MHz | ~2.857 MHz | ~5.714 MHz | ~6.857 MHz | 8.0 MHz | ~9.143 MHz | ~11.429 MHz | ~17.143 MHz | ~22.857 MHz |
| (FFT Size) (GIF ΔT/T$_U$) | (1024/ 2048/ 4096/ 8192/ 16384) (1/128, 1/32, 1/16, 19/256, 1/8, 19/128, 1/4) | | | | | | | | |
| Used Sub-Carriers | 853 – 27265 | | | | | | | | |
| OFDM Symbols Sub-Frame (250ms) | ~(12 – 5252) Non-Integer | | | | | | | | |
| Resource Element (RE) | 1 Sub-Carrier | | | | | | | | |
| Resource Frequency Domain | N/A | | | | | | | | |
| Resource Block Time/Frequency | N/A | | | | | | | | |
| # RB Sub-Frame | N/A | | | | | | | | |

*FIG. 3B*

| Bandwidth | 5 MHz | 6 MHz | 10 MHz | 12 MHz |
|---|---|---|---|---|
| Sub-Frame | 10ms | | | |
| Sampling Frequency | 12.288 MHz | | | |
| FFT Size<br>Sub-Carrier Δ Hz/<br>Cyclic Prefix μs/<br>Doppler 600 MHz (MPH) | 6144 /2000 /56 /224<br>9216 /1333/ 83 /149<br>12288 /1000 /111/112<br>18432 /670 /167 /75 | 6144 /2000 /56 /224<br>9216 /1333/ 83 /149<br>12288 /1000 /111/112<br>18432 /670 /167 /75 | 6144 /2000 /56 /224<br>9216 /1333/ 83 /149<br>12288 /1000 /111/112<br>18432 /670 /167 /75 | 6144 /2000 /56 /224<br>9216 /1333/ 83 /149<br>12288 /1000 /111/112<br>18432 /670 /167 /75 |
| Used Sub-Carriers/<br>OFDM Symbol | 4750 | 5700 | 9500 | 11400 |
| Integer# Symbols (FFT)<br>/Sub-Frame | 18/12/9/6 | 18/12/9/6 | 18/12/9/6 | 18/12/9/6 |
| Resource Element (RE) | 1 Sub-Carrier | | | |
| # (RE) Frequency Domain<br>(Stripe) | 475<br>Deterministically<br>Spread<br>(Max Frequency<br>Diversity) | 570<br>Deterministically<br>Spread<br>(Max Frequency<br>Diversity) | 475<br>Deterministically<br>Spread<br>(Max Frequency<br>Diversity) | 570<br>Deterministically<br>Spread<br>(Max Frequency<br>Diversity) |
| # Stripes /OFDM Symbol | 10 | 10 | 20 | 20 |

*FIG. 3C*

| BW (MHz) | Sampling Freq (MHz) | ΔF (kHz) | FFT | MPH | TU (μs) | TU=TxN Value (N) | CP (μs) | CP=TxN Value (N) | Guard Interval fraction % | # Payload Symbols 10ms Slot | # Payload Symbols 990ms (SF) |
|---|---|---|---|---|---|---|---|---|---|---|---|
| 5,6,10,12 | 12.288 | 2 | 6144 | 224 | 500 | 6144 | 55.58 | 683 | 10 | 18 | 1782 |
| 5,6,10,12 | 12.288 | 1.33 | 9216 | 149 | 750 | 9216 | 83.33 | 1024 | 10 | 12 | 1188 |
| 5,6,10,12 | 12.288 | 1 | 12288 | 112 | 1000 | 12288 | 111.16 | 1366 | 10 | 9 | 891 |
| 5,6,10,12 | 12.288 | .67 | 18432 | 75 | 1500 | 18432 | 166.66 | 2048 | 10 | 6 | 594 |

*FIG. 5B*

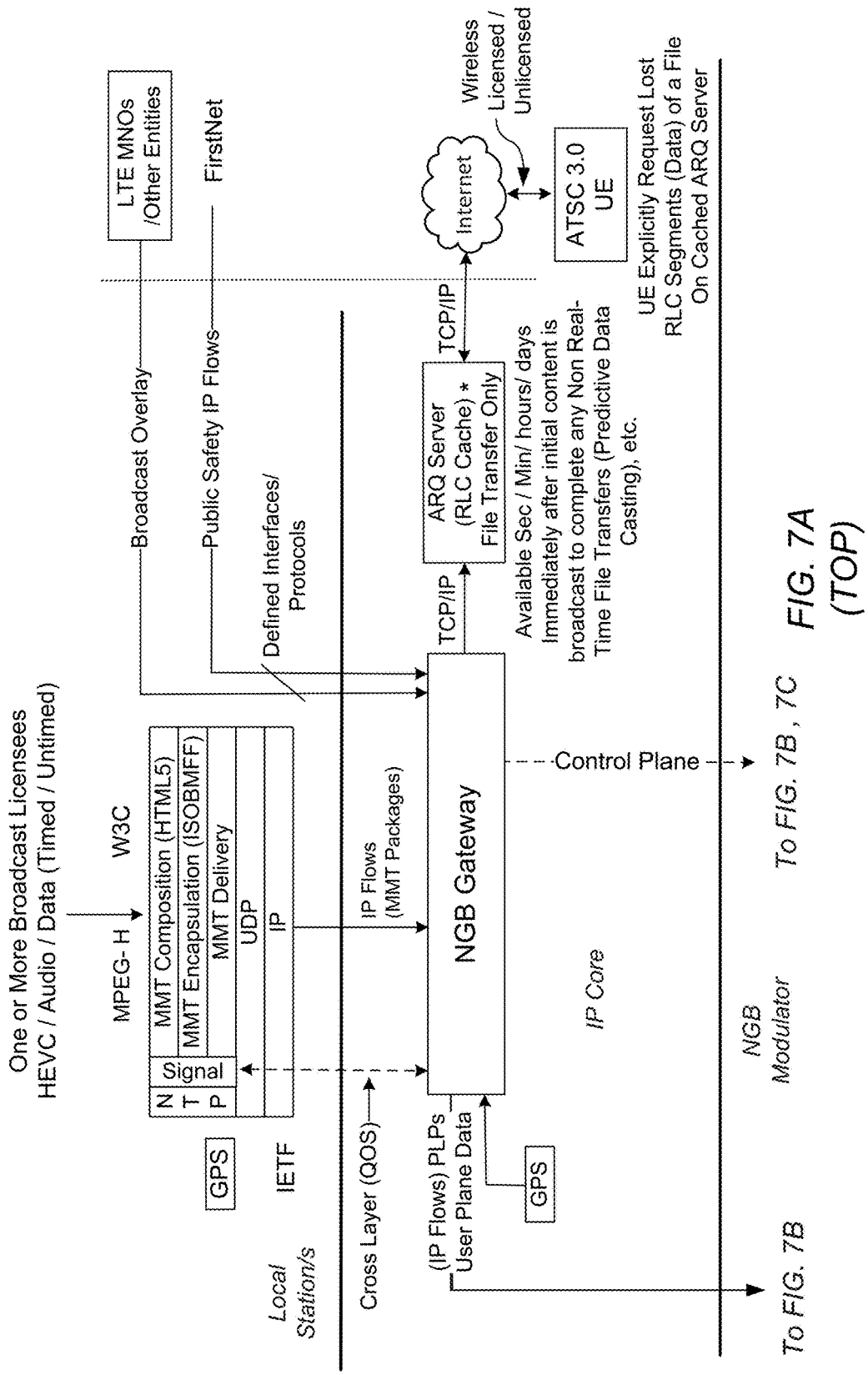
FIG. 7A (TOP)

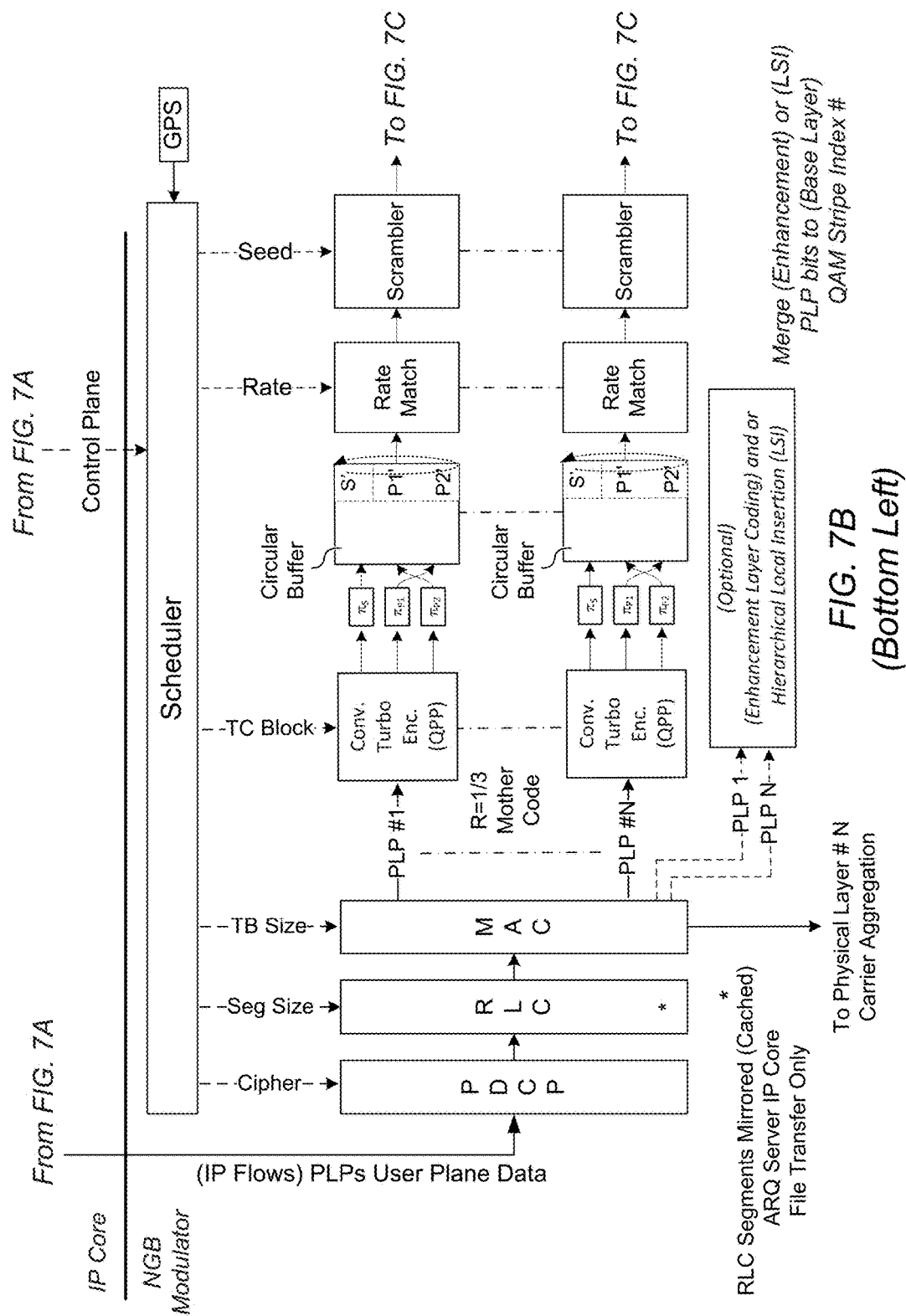
FIG. 7B (Bottom Left)

(Bottom Right)

| BW (MHz) | Sampling Freq (S) (MHz) | ΔF (kHz) | FFT | MPH | TU (μs) | TU=TxN Value N | CP (μs) | CP=TxN Value N | Guard Interval fraction % | # Payload Symbols 10ms Slot | # Payload Symbols 990ms (SF) |
|---|---|---|---|---|---|---|---|---|---|---|---|
| 5,6,10,12 | 12.288 | 2 | 6144 | 224 | 500 | 6144 | 55.58 | 682 | 10 | 18 | 1782 |
| 5,6,10,12 | 12.288 | 1.33 | 9216 | 149 | 750 | 9216 | 83.33 | 1024 | 10 | 12 | 1188 |
| 5,6,10,12 | 12.288 | 1 | 12288 | 112 | 1000 | 12288 | 111.16 | 1366 | 10 | 9 | 891 |
| 5,6,10,12 | 12.288 | .67 | 18432 | 75 | 1500 | 18432 | 166.66 | 2048 | 10 | 6 | 594 |

FIG. 22B

| BW (MHz) | Sampling Freq (MHz) | ΔF (kHz) | FFT | MPH | TU (µs) = (T) x FFT | TU = (T) x (N) Value (N) | CP 1ST Symbol (T) x (N) Value (N) | CP All other Symbols (T) x (N) Value (N) | # L2 Symbols (9ms) |
|---|---|---|---|---|---|---|---|---|---|
| 5,6,10,12 | 12.288 | 2 | 6144 | 224 | 500 | 6144 | 1614 | 1610 | 16 |
| 5,6,10,12 | 12.288 | 1.33 | 9216 | 149 | 750 | 9216 | 1024 | 1024 | 10 |
| 5,6,10,12 | 12.288 | 1 | 12288 | 112 | 1000 | 12288 | 3003 | 2997 | 8 |
| 5,6,10,12 | 12.288 | 0.67 | 18432 | 75 | 1500 | 18432 | 2048 | 2048 | 5 |

FIG. 23B (Blowup of Portion from Figure 31A)

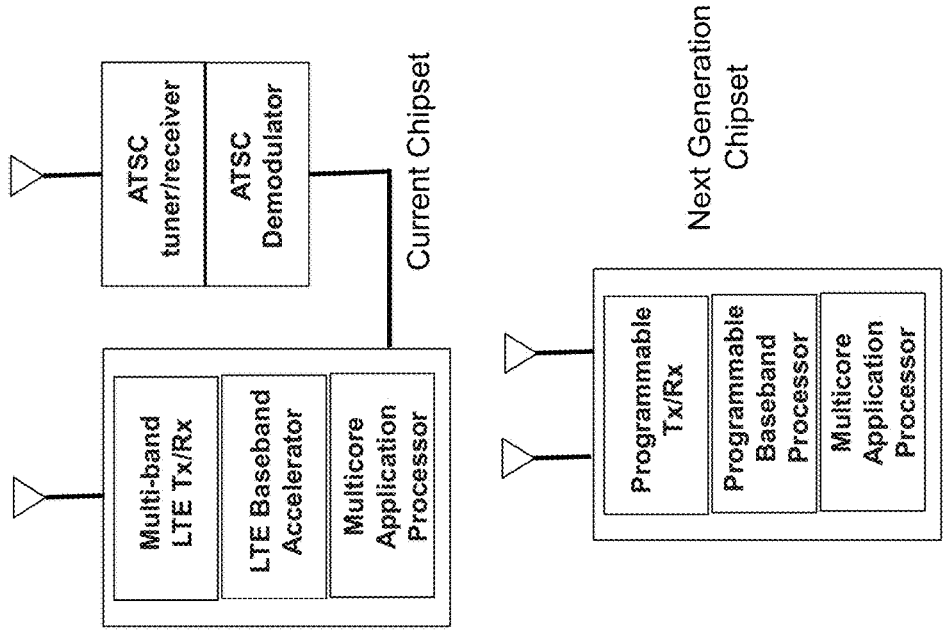

- Today's radio chipset
  o External ATSC tuner/receiver
    ▪ Added BOM cost, royalty, circuit board real estate, and power consumption
  o LTE RF support is limited to a few bands (out of 40+ 3GPP LTE bands)
  o Baseband processing is mostly hardwired circuitry with limited flexibility
  o Broadcast and broadband are separate functions

- New Generation radio chipset
  o Programmable baseband processor to support all waveforms
    ▪ For example, ATSC 3.0 and LTE at the same time
    ▪ Single chip solution, no separate ATSC chipset
  o Programmable RF to support all bands from VHF/UHF to a minimum of 5 GHz.
  o Cost/size/power neutral when compared to today's chipset
    ▪ No compromise while supporting more functionalities
  o SW stack to support broadcast/broadband convergence and off-load

FIG. 37

| Param | System Parameters | | | | Units | Description |
|---|---|---|---|---|---|---|
| $B_{ch}$ | 6 | 6 | 6 | 6 | MHz | Channel Bandwidth |
| $B_{sig}$ | 5.4 | 5.4 | 5.4 | 5.4 | MHz | Signal Bandwidth |
| $f_s$ | 12.288 | 12.288 | 12.288 | 12.288 | MS/s | Sampling rate |
| NFFT | 6144 | 9216 | 12288 | 18432 | | FFT dimension |
| NSC | 2700 | 4050 | 5400 | 8100 | | Number of used subcarriers |
| $\Delta f$ | 2.00 | 1.33 | 1.00 | 0.67 | kHz | subcarrier spacing |
| TFFT | 500 | 750 | 1000 | 1500 | µs | |
| CP | 11% | 11% | 11% | 11% | % | Cyclic Prefix |
| GI | 55.56 | 83.33 | 111.11 | 166.67 | µs | GI Duration |
| TSYM | 555.56 | 833.33 | 1111.11 | 1666.67 | µs | Symbol duration |
| R | 16.66 | 24.098 | 33.31 | 49.97 | km | range |
| $v_D$ | 223.54 | 149.03 | 111.77 | 74.51 | MPH | Max Doppler speed at 600MHz |
| CC | 16200 | 24300 | 32400 | 48600 | bits | OFDM symbol Carrying Capacity |
| Spec. Eff. | 5.4 | 5.4 | 5.4 | 5.4 | bps/Hz | Spectral Efficiency |
| Bitrate | 29.16 | 29.16 | 29.16 | 29.16 | Mbps | System Throughput |

FIG. 40

NEXT GENERATION BROADCAST SYSTEM AND METHOD

PRIORITY CLAIM INFORMATION

The present application claims the benefit of priority to each the following Provisional Applications:

U.S. Provisional Application No. 61/883,168, filed Sep. 26, 2013, titled "Next Generation Broadcast System", invented by Kevin A. Shelby and Michael J. Simon;

U.S. Provisional Application No. 61/883,749, filed Sep. 27, 2013, titled "Next Generation Broadcast System", invented by Kevin A. Shelby and Michael J. Simon; and U.S. Provisional Application No. 61/890,709, filed Oct. 14, 2013, titled "Next Generation Broadcast System", invented by Kevin A. Shelby and Michael J. Simon.

All of the above-identified Provisional Applications are hereby incorporated by reference in their entireties as though fully and completely set forth herein.

TECHNICAL FIELD

This application relates to the field of telecommunication, and more particularly, to mechanisms for terrestrial wireless television broadcast.

DESCRIPTION OF THE RELATED ART

There exists a need for new mechanisms for terrestrial broadcasting, i.e., mechanisms that would be compatible with IP-based networks.

SUMMARY

Within the context of a next generation broadcasting (NGB) system proposal, we disclose a next generation broadcast system architecture for receiving multiple streams of digital content from the Internet and processing them for broadcast over the air for reception by fixed or mobile user equipment (UE). On the broadcasting side of the air interface there are two parts, a new Modulator architecture, and a new Gateway architecture. The Modulator takes in multiple data streams and processes them into a robust transport stream composed of Super Frames issued at a constant rate. The transport stream may be efficiently broadcast, and efficiently received and decoded at a UE to pick out one or more individual data streams. The Gateway has a broadband interface with the Internet, provides services, takes in multiple data streams in internet protocol (IP), and streams the data out to one or more Modulators along with control signals. A Gateway may coordinate multiple Modulators, one for each transmitter, to achieve a single frequency network (SFN) of multiple transmitters. In one set of embodiments, a method for operating a server (to facilitate the transfer of a data file to a user equipment device) may include the following operations. The server is part of an IP network.

The method includes receiving segments of a data file from a broadcast gateway, wherein a broadcast transmission system also receives the segments from the broadcast gateway and transmits them into space as part of an RF signal. The UE device is configured to receive the RF signal and generate one or more missing segment indications identifying one or more segments that it is not able to successfully recover from the RF signal, wherein the UE device is further configured to transmit the one or more missing segment indications to the server through the IP network (e.g., using an WiFi connection to a WiFi access point, which couples to the IP network, or using a wireless connection to an LTE eNodeB, which couples to the IP network).

The method includes receiving the one or more missing segment indications from the UE device.

The method includes sending the one or more segments identified by the missing segment indications to the UE device through the IP network (e.g., through the same WiFi connection or LTE connection).

In one set of embodiments, a method for operating a user equipment device (to facilitate the transfer of a data file to the user equipment) may include the following operations.

The method includes receiving a noise-perturbed version of an RF signal that is wirelessly transmitted by a broadcast transmission system, wherein the broadcast transmission system transmits segments of a data file in the RF signal.

The method includes operating on the noise-perturbed version (e.g., by conventional means such as down conversion to baseband, analog-to-digital conversion, symbol estimation and data decoding) to recover estimates of the segments.

The method includes analyzing the estimates to determine which of the segments are not successfully received (e.g., by analyzing an error detection code such as CRC).

The method includes transmitting one or more missing segment indications to a server via an IP network, wherein each of the missing segment indications identifies a corresponding one of the segments (e.g., by its sequence number and/or reception time stamp) that has not been successfully received.

In one set of embodiments, a multi-stream modulator may be configured to apply channel encoding with dynamically-variable coding rate to one or more data streams to be transmitted by a broadcast transmission system. At least one of the one or more data streams is a variable rate stream (i.e., including a variable number of information bits per unit time), wherein the broadcast transmission system is configured to transmit data with a constant physical transport rate. The multi-stream modulator may include a channel encoding unit, a rate matching unit (RMU) and a control unit.

The channel encoding unit is configured to applying channel coding with fixed coding rate to the one or more data streams to obtain respectively one or more coded streams.

The rate matching unit (RMU) is configured to modify the one or more coded streams in order to obtain one or more respective modified streams, wherein the RMU is configured to modify the one or more coded streams by injecting null values into the one or more coded streams and/or by puncturing (i.e., discarding) selected values of the one or more coded streams.

The control unit is configured to receive information indicating a number of information bits per unit time in each of the one or more data streams. The control unit is further configured to vary the number of injected null values per unit time and/or the number of punctured values per unit time so that an aggregate bitrate of the one or more modified streams matches (i.e., is close to, and not greater than) the constant physical transport rate, wherein said varying is performed based on the one or more numbers of information bits per unit time in the one or more respective data streams.

In one set of embodiments, a method for operating a multi-stream modulator may include the following operations. The method applies channel encoding with dynamically-variable coding rate to one or more data streams to be transmitted by a broadcast transmission system. At least one of the one or more data streams is a variable rate stream (i.e., including a variable number of information bits per unit time), wherein the broadcast transmission system is configured to transmit data with a constant physical transport rate.

The method includes receiving information indicating a number of information bits per unit time in each of the one or more data streams.

The method includes applying channel encoding with fixed coding rate to the one or more data streams to respectively obtain one or more coded streams.

The method includes modifying the one or more coded streams in order to obtain one or more respective modified streams, wherein said modifying the one or more coded streams includes injecting null values into the one or more coded streams and/or by puncturing (i.e., discarding) selected values of the one or more coded streams. The number of injected null values per unit time and/or the number of punctured values per unit time is varied so that an aggregate bitrate of the one or more modified streams matches the constant physical transport rate, wherein said varying is performed based on the one or more numbers of information bits per unit time in the one or more respective data streams. The one or more modified streams are supplied to the broadcast transmission system for transmission through a wireless channel.

BRIEF DESCRIPTION OF THE DRAWINGS

FIG. 3B (i.e., Table 2) presents a table of DVB-NGH OFDM parameters, according to one embodiment.

FIG. 3C (i.e., Table 4) presents a table of proposed OFDM parameters, according to one embodiment.

FIG. 5B (i.e., Table 5) presents a summary of proposed OFDM parameters, according to one embodiment.

FIGS. 7A, 7B and 7C present a system block diagram, according to one embodiment.

FIG. 22B (i.e., Table 13) is a table showing Super Frame Payload OFDM Parameters for nomadic waveform, according to one embodiment.

FIG. 23B (Table 14) illustrates L2 OFDM symbol parameters, according to one embodiment.

FIG. 37 illustrates Today's radio chipset and one embodiment of a New Generation Chipset.

FIG. 40 (i.e., Table 17) illustrates System Parameters for 6 MHz Signal Bandwidth, according to one embodiment.

FIG. 42A shows coded transport (in bytes) versus symbol index. FIG. 42B shows rate-matched transport (in bytes) versus symbol index.

Figure 1A:
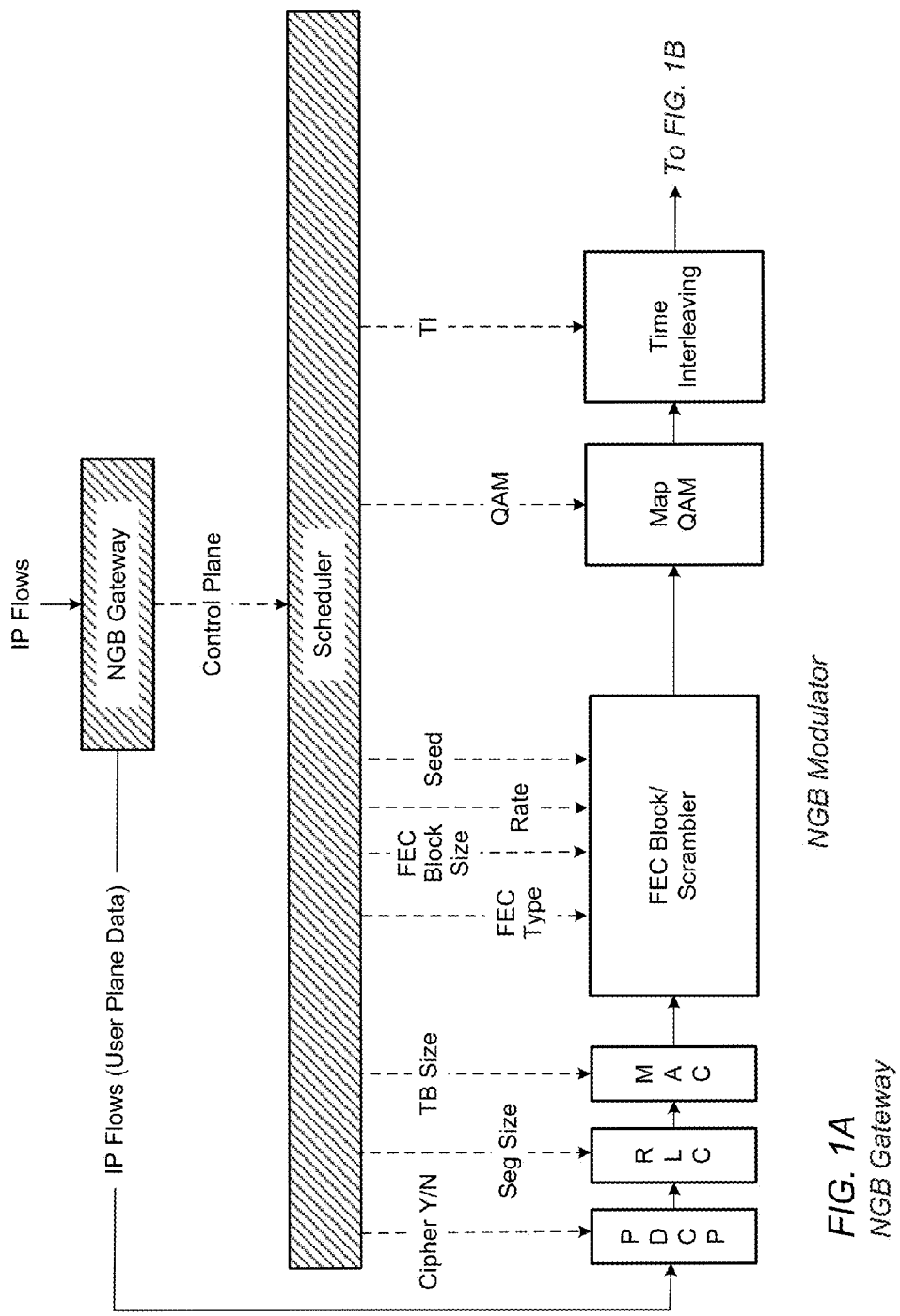
FIGS. 1A and 1B illustrate one embodiment of a Next Generation Broadcast (NGB) Gateway.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Flowchart diagrams are provided to illustrate exemplary embodiments, and are not intended to limit the disclosure to the particular steps illustrated. In various embodiments, some of the method elements shown may be performed concurrently, performed in a different order than shown, or omitted. Additional method elements may also be performed as desired.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

List of Acronyms Used in the Present Patent

ARQ: Automatic Repeat-reQuest
CA: Carrier Aggregation
CLX: Coherent Logix, Inc.
CRC: Cyclic Redundancy Check
CP: Cyclic Prepare
DTX: Discontinuous Transmission
DVB: Digital Video Broadcasting
EM Wave: ElectroMagnetic Wave
EPC: Evolved Packet Core
ETSI: European Telecommunications Standards Institute
FEC: Forward Error Correction
FFT: Fast Fourier Transform
GI: Guard Interval
HEVC: High Efficiency Video Coding
H-LSI: Hierarchical Local Service Insertion
IEEE: Institute of Electrical and Electronics Engineers
IETF: Internet Engineering Task Force
IFFT: Inverse Fast Fourier Transform
IP: Internet Protocol
LDPC: Low Density Parity Check
LTE: Long Term Evolution
LTE-A: LTE Advanced
MMT: MPEG Media Transport
MPH: Miles Per Hour
NGBP: Next Generation Broadcast Platform
NGH: Next Generation Handheld Specification
OFDM: Orthogonal Frequency-Division Multiple Access
OFDMA: OFDM
PA: Power Amplifier
QOS: Quality of Service
RAN: Radio Access Network
RLC: Radio Link Control
ROHC: Robust Header Compression
SBG: Sinclair Broadcast Group, Inc.
SFN: Single Frequency Network
TIA: Telecommunications Industry Association
UE: User Equipment
UTC: Coordinated Universal Time
VBR: Variable Bit Rate
W3C: World Wide Web Consortium Terminology Used in the Present Patent Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System—any of various types of computing or processing systems, including a personal computer system (PC), mainframe computer system, workstation, network appliance, internet appliance, personal digital assistant (PDA), grid computing system, cloud server or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Next Generation Broadcast Platform

We propose herein new technologies for terrestrial broadcasting in the internet age. These technologies (or a subset thereof) may be incorporated in the next generation broadcast television standard (known as ATSC 3.0). These technologies may provide improvements in performance, functionality and efficiency that are significant enough to warrant the creation of a new broadcast ecosystem—a "Next Generation Broadcast Platform" (NGBP), which we disclose herein.

The "Scope of Work" identified in the ATSC call for proposals (CFP), references service requirements and specifies a robustness of service that should exceed " . . . current ATSC systems and that of cell phones and other devices enabling services similar to ATSC". This broad scope identifies not only the need to provide physical layer performance enhancements to the existing ATSC systems, but begs the need for a complimentary network topology and unifying communication architecture never before deployed in the broadcast television environment. In this disclosure, we include a section ("The Platform") that introduces and addresses that fundamental need, and develops the notion of a "Broadcast Market Exchange" (BMX) which brings intelligence to the network.

The laws of physics necessarily dictate a wide array of system level requirements and technical constraints, uniquely different to specific portions of the US television broadcast bands (CH 2-51). Inferred but not fully identified in the CFP, the uniquely different attributes of spectrum demand a level of agility in technological capability not before possible. We introduce and identify in this disclosure ways to mitigate aspects of spectrum 'unfungibility' with unique variables in the physical layer, and in an abstract way through the virtualization possible with the notion of a BMX. (Unfungibility: The nature of being non-exchangeable or replaceable, in whole or in part, for another of like nature or kind; e.g., the nature of spectrum in Lo-VHF, Hi-VHF and UHF spectrum.)

It is important to layout this broader system vision, encompassing both a proper understanding of "The Platform" with its general functions and the relationship to the underlying physical layer this CFP is meant to specifically address. It should be noted that the presently disclosed physical layer could stand on its own as a viable (but isolated) layer in a broadcast protocol stack. However, by taking a synergistic system view of the physical layer as one of the foundational elements in a complete system, we believe the true potential will be revealed.

Lastly, the notion of an evolvable standard will be spoken to in the very nature of "Parameterized Waveforms". The ability to plot a direction for the industry that allows an evolvable standard addresses today's global market demand for global solutions.

Adaptation and Evolution in Dynamic Worldwide Market

This disclosure considers a wider view of broadcast than just the physical layer. This disclosure addresses the ability of the Television Broadcast Wireless Carrier (Broadcaster) to adapt and evolve their business and applications in a rapidly changing and dynamic worldwide market.

FOBTV Support: We believe the concepts provided within this disclosure should not only serve the U.S. Market, but support requirements that can be harmonized with the Future of Broadcast Television (FoBTV) activities. We should be very clear that we believe the strength of FoBTV is not to exist on one unified worldwide standard, but to exist on a software-defined architecture that supports global needs. The architecture of the FOBTV system must allow for system requirements that will be driven by significantly diverse worldwide government policies that realistically will not converge on one single "hammered in stone" broadcast standard. It is possible with today's software-defined technologies to build systems that will adapt to these diverse emerging requirements.

ATSC 1.0 to 3.0 Transition: The present disclosure allows for a non-deterministic time transition from ATSC 1.0 to 3.0. We propose a solution that would allow broadcasters to move autonomously and on their own schedules. The software architectures in both the broadcaster's infrastructure and in consumer user equipment can be designed to support dynamic configuration for different transmission and reception compatibility requirements.

First Responder Network Authority (FirstNet): This disclosure will support the FCC (Federal Communications Commission of the U.S.) intent to further the advanced interoperability of first responders. The first responder public safety mobile broadband networks require the use of a common air interface such as LTE.

Parameterized Waveforms: This disclosure provides an in-depth look at parameterized waveforms. This feature allows different radio waveforms to be programmed and utilized to optimize performance in different operating environments.

Software Defined Applications: One of the strengths of this proposal is its ability to adapt to an ever-changing dynamic market for both technical and business opportunities. The software architecture provides access for all vendors to create solutions. This stimulates competition and provides a clear path for innovation in technological advancements as well as business applications.

Broadcast Market Exchange (BMX): This concept allows broadcasters to provide a diversity of services and enter an open market environment that provides access to appropriate frequencies and bandwidth for those services. It provides a means to understand and associate real value to each and every bit served by the most effective resources available. It allows the creation of business and related mechanisms to define various value propositions and more effectively schedule using resources of associated importance. It also allows a Broadcaster to more effectively define, offer and support QoS offerings.

Overview of Proposal

Various embodiments described herein, including embodiments conforming to the broad vision of the section titled "The Platform", rely on mature technologies and communications platforms being deployed today. For example, in some embodiments, the BMX relies the technologies and capabilities deployed today in the telecommunications industry, e.g., in the EPC (Evolved Packet Core) of LTE and LTE-A. Differences may reside in the business and regulatory rules that govern conduct and exchange within the spectrum resources being leveraged. But clearly the base technology may be fully commercialized technology. Within that same vision, platform elements may leverage fundamentals of W3C (such as HTML5) and MPEG (such as MMT), moving rapidly from prototype to commercial applications.

With respect to the fundamentals of the present physical layer proposal, the proposal may, in some embodiments, leverage OFDM and OFDMA techniques that straddle and reach across the DVB family of techniques surrounding DVB-T2 and NGH (ETSI) through to and including new detailed extensions of LTE (3GPP). The proposal may also utilize components of IEEE, IETF and TIA.

If one fully comprehends the operational variability offered with the level of parameterization envisioned and defined herein, we believe it would be proper to say that at one end (broadcast) of the proposed system capability, it is possible to rely on current DVB OFDM instantiations to be a representative 'proxy' of that end of performance. Equally, the other end of performance (Wireless Broadband) can be extrapolated from implementations and the continuing evolution of 3GPP LTE. It is possible to effect, through the parameterization capabilities herein disclosed, a configuration closely approximating various OFDM waveforms and operation modes.

Parameterization techniques which have access to the various 'handles' (elements) that define a specific waveform allow a nearly infinite set of capabilities to be devised. Some of the 'handles' that are available to define waveforms include: Cyclic Prefix (Guard Interval), FFT, L1/L2 signaling, Time Interleaving, QAM mapping, forward error correction (FEC).

Given the body of work that is being drawn upon, a performance and complexity assessment would find this proposal lies well inside of the norms of standards and technologies implemented and commercialized today in a wide variety of consumer devices deployed in tens of millions of units.

In addition to the broad top-level description given above, we include (among other things) the following:

(1) Functional Requirements and Physical Layer Model Definition.

(2) The trade-offs of parameters that impact robustness versus payload throughput.

(3) Possible new broadcasting services that can be implemented with a parameterized system.

(4) Compatibility with global standards from many organizations such as: 3GPP, ETSI, MPEG, IEEE, IETF, W3C, TIA.

The Platform

When we speak of 'The Platform' we are taking a forward looking, integrated (or "holistic") approach beyond the physical layer, beyond its incorporation within a standard inclusive of the transport and applications layer. We are looking at the end-to-end systemic needs of all broadcasters independent of where in the broadcast band the FCC (or other regulatory authority) has authorized operation. Considering the world in which television broadcasting exists today, we attempt to provide context for broadcasting in the interconnected (wired/wireless) world where opportunities exist to closely integrate television broadcast with IP network delivery, harmonizing objectives concerning ease of consumer access to content on devices over a terrestrial broadcast and/or other IP networks (wireless/wired) in a seamless way.

Within this platform, we define a unifying "virtualized" IP Core element. This underlying IP Core infrastructure of tomorrow's broadcaster can be driven by an intelligent IP Core entity, and governed by software that defines rules, procedures and other requirements with open authentication and charging mechanisms—business and regulatory in nature. We will refer to this IP Core entity/sub-system as the "BMX" (Broadcast Market Exchange). The capability and functionality of this all IP Core network will largely reflect similar functionalities (albeit executing on differing parameters) that exist within other wireless sectors as the EPC (Evolved Packet Core). This proven EPC technology is driving the worldwide mobile broadband revolution today. The EPC is now considered a commodity item in the wireless market and may be leveraged in the presently-disclosed NGBP as a critical component to enable effective management of the broadcast spectrum asset in a market driven manner, including interoperating with other IP networks when it makes business sense.

Robustness of service can be accomplished in multiple ways. In the design of the system envisioned, at a system and architecture level, techniques envisioned for providing robust service within a broadcast (one-way) network may include one or more of the following:
(a) Parameterized radio waveform for operating in multiple wireless environments;
(b) Providing for robust low threshold C/N performance modes (with signaling, detection and synchronization below the noise-floor) for services envisioned in CFP;
(c) High spectral efficiency and data rate modes for services envisioned in CFP;
(d) Greater data rates (function of all scheduled BMX resources) for new future services (market driven) not possible today in terms of a conventional TV channel mindset;
(e) 'Tools' to easily provide for uniformly high signal levels (SFN, DTX, etc.);
(f) Alternate transport across multiple bearer layers (IP transport assumed).
C/N is an acronym for carrier-to-noise ratio.
Next Generation Broadcast Platform (NGBP)

Figure 1B:
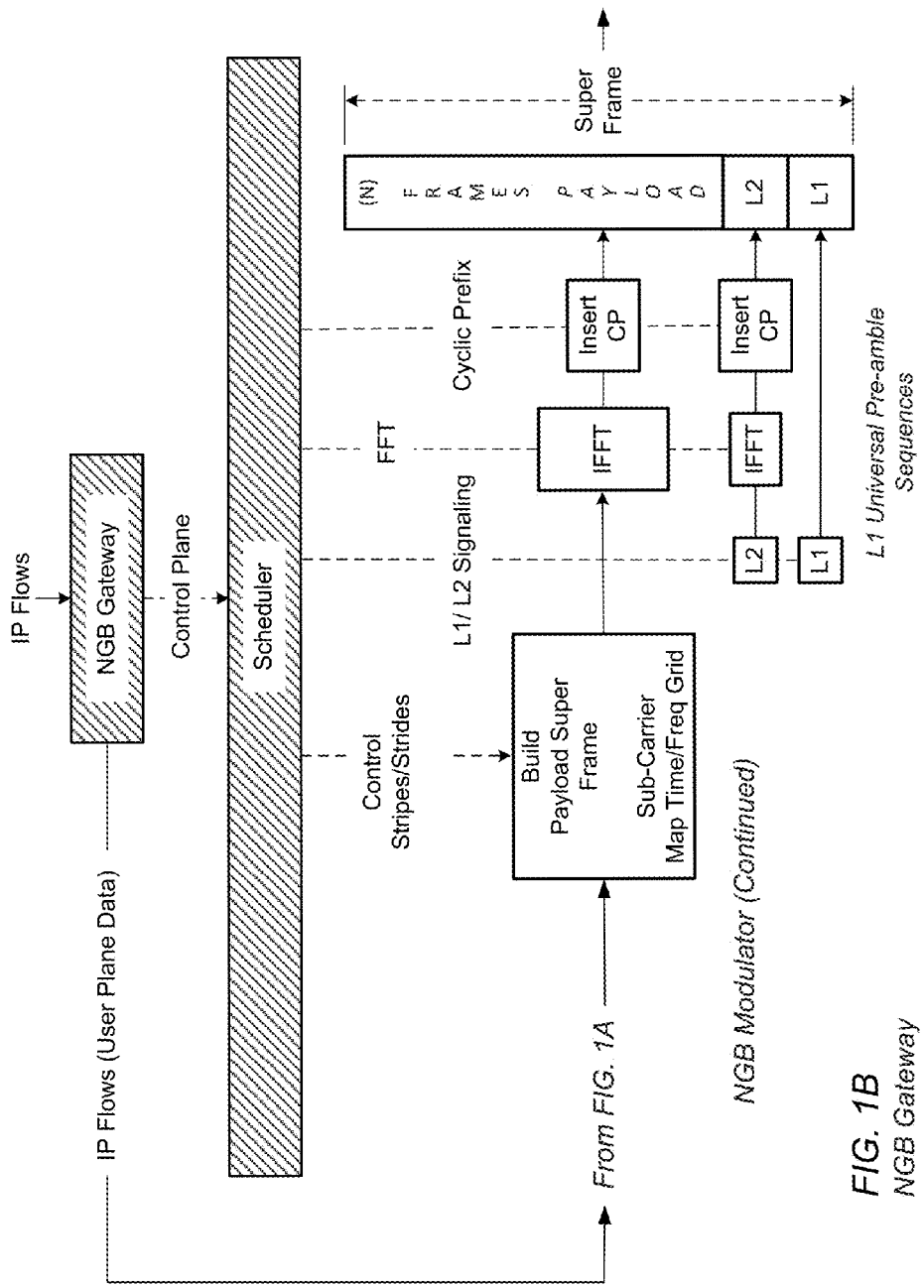
Figure 2:
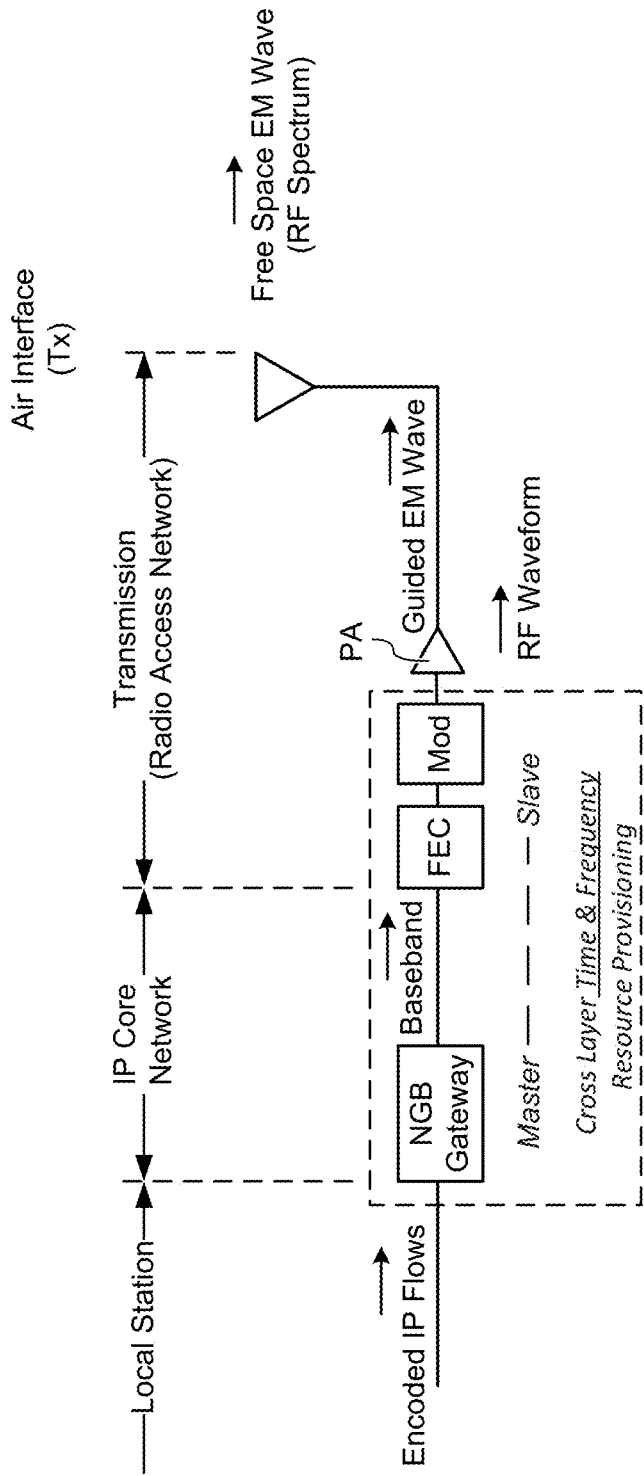
FIG. 2 is a block diagram for the Next Generation Broadcast Platform (NGBP), according to one embodiment.

Referring now to FIGS. 1A, 1B and 2, the local station produces and/or encodes content (essence) into IP Flows that are sent across an interface into the IP Core network, where an independent entity, i.e., a Next Gen Broadcast (NGB) gateway, pre-processes the IP Flows and provides a baseband IP signal output to a defined modulator interface, the input to transmission (Radio Access Network), e.g., as shown in FIG. 2. (FIG. 2 is a block diagram of the Next Generation Broadcast Platform.) The baseband signal also contains control plane signaling that enables autonomous configuration control at the NGB gateway over the modulator/s in constructing a NGB frame via cross-layer control. (The expression "thing/s" denotes "thing or things".)

Referencing the high-level block diagram of the new NGBP as shown in FIG. 2, the OFDM physical layer resources are assigned in the NGB gateway and logical baseband frames are constructed in the gateway and output as IP flows which map directly into reserved physical layer resource elements that transport the virtual physical layer pipe (PLP) structure/s, each with flexibility in selection of Channel Coding, Constellation, Interleaving (CCI) to enable a unique robustness and/or spectrum efficiency under the control of the Broadcaster. These PLPs are then mapped onto OFDM sub-carriers and the NGB frame is converted to a RF waveform that is amplified and carried as a guided wave to the air interface of the antenna.

The real take away here is a unique Master/Slave (Cross Layer) relationship that puts the control of all physical layer resources into the NGB gateway, generally located miles away from the NGB modulator/s (transmitter site/s) in the IP Core network. Note: a type of cross layer functionality can also be found in DVB-T2 and the ATSC A/153 standards.

At the air interface of the antenna system, the guided RF wave enters the broadcast spectrum (today CH 2-51, where CH is an acronym for Channel). The laws of physics dictate that the broadcast spectrum isn't fungible. Some parts of the broadcast band are more efficient and practical for nomadic, tablet/handheld type service and others at fixed/mobile service.

Without a Broadcast Market Exchange (BMX) mechanism, broadcasters are mainly limited by physics and/or economics to the type of services they could bring to market. Spectrum is most valuable if used for the type of uniquely suited services dictated by the RF physics in the frequency band. There is no one single part of the broadcast band that supports all service types equally well. Although some broadcast systems allow the provisioning of both fixed and nomadic services in the same band using either time or frequency division multiplexing techniques or other schemes, this is usually a sub-optimal solution because the under-lying RF physics imposes constraints which are formidable engineering challenges to overcome while preserving both spectrum efficiency and economics.

Figure 3A:
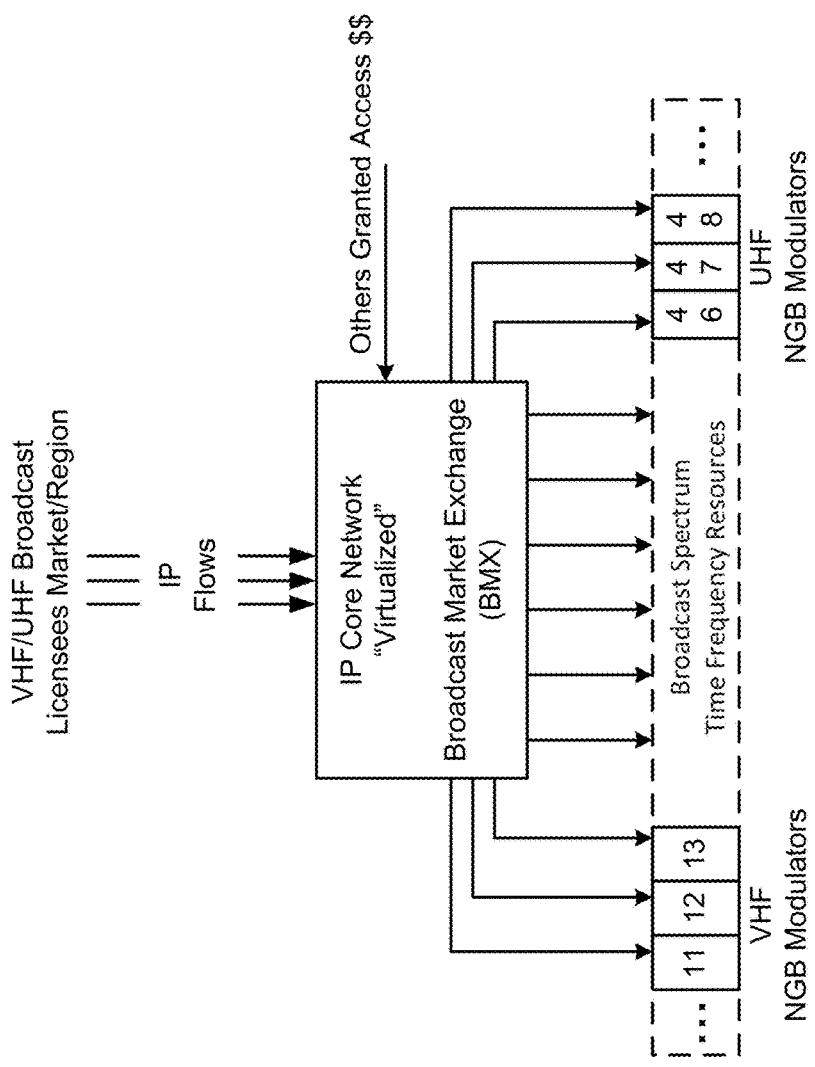
FIG. 3A illustrates IP Core Network BMX concepts, according to one embodiment. (BMX is an acronym for "Broadcast Market Exchange".)

The paradigm shift introduced by BMX is that a participating broadcast licensee is no longer constrained simply by physics but has the opportunity to enter an open market environment that provides access to appropriate frequencies and bandwidth. In a nutshell, this would enable market driven use of spectrum resources and diversity of service types for all participating broadcasters. FIG. 3A shows a high level view of the IP Core and BMX concept. The encoded content IP flows from (VHF/UHF) licensees are shown entering the IP core network, which has several NGB gateways controlling all resources of either VHF NGB modulators or UHF NGB modulators. The IP Core network handles the provisioning and scheduling of resources and ensures the updating of signaling (metadata) to ensure the user equipment (UE) can discover any content of interest in the emitted waveform, even if dynamically assigned and or shifted in spectrum position slightly under a BMX spectrum pool. At the UE, the content is then received, decoded and presented natively, e.g., as HTML5 elements of a web browser under total broadcaster control. The BMX entity is specialized software running in the IP Core that serves as the framework to offer participating broadcasters an option to select service types via an open process with defined rules, procedures and open authentication mechanisms. The BMX can also be a dynamic process. Spectrum assets can be traded, or wholesale service level agreements (SLA) can be established among broadcasters or other entities now or in the future (scheduled). This functionality is well within the scope of known technology today.

In the new broadcast model, the IP core at the center of the broadband communications system architecture facilitates the integration of the full web experience with content viewing. The Internet return channel provides intelligence data on the viewing audience, to enable new business models traditionally outside the reach of broadcasters. Current activities underway within IEEE (i.e., IEEE 802 Omni-RAN EC Study Group) may provide broadcasters with useful tools to manage IEEE 802 (WiFi and other) wireless access links as virtual extensions of their network environment.

Working together to create a next generation broadcast platform and ecosystem, tremendous value can be created and broadcasting can recreate itself in the Internet age.

In view of the present disclosure, what also becomes obvious is that true convergence of broadcast and unicast networks, in which broadcast and unicast share broadcast spectrum in a dynamic way, is a realizable possibility. A vision of this possibility and some of the specifics of a "Broadcast/Broadband Convergence Network" are presented later in this patent, in the section of the same title.

Introduction to Physical Layer Framework Design

First, a brief comment to compare and contrast our broadcast physical layer proposal with respect to the adaptive parameterized OFDMA (unicast) waveform used in 3GPP LTE-A, from which many elements of this proposal are based. Within LTE, the eNodeB or base station is the master entity that focuses into the Radio Access Network (RAN) with the objective to optimize the QOS independently of each user equipment (UE) in a given location (RF environment) for an interval of time. The eNodeB uses dynamic/adaptive physical layer parameterization with feedback reporting from each UE. An OFDMA (unicast) system and an OFDM (broadcast) system can have many technical elements in common. However, being real world wireless systems, they are usually each optimized with diverse system objectives in mind.

Our ATSC 3.0 proposal of an OFDM (broadcast) physical layer also applies adaptive techniques, but with a different system objective. The Next Gen Broadcast (NGB) Gateway (to be discussed) is the master entity that looks not into the RAN (LTE), but back into the IP Core network at all input IP Flows (traffic) instantaneously competing for broadcast physical layer resources. A cross layer algorithm in the NGB Gateway then dynamically adapts both the protocol layers and parameterization of the physical layer resources in the nomadic waveform for a large cell SFN topology which can also serve as a foundational element of a Next Gen Broadcast Platform (NGBP).

Now, some basic OFDM parameters and frame structures of LTE and DVB-NGH within the present proposal are briefly examined to give insight into the proposed system architecture.

Detailed Overview of Technical Proposal—Basic Assumptions

Generally speaking, having maximum selection of the OFDM parameters (thousands of possible combination and permutations) without having a network aware framing structure and timing is of little value in terms of a NGBP. (Today broadcast terrestrial standards are architected as standalone islands emitting separate RF waveforms with no thought given of the internet or interworking with other IP Networks. While this is an option, the interlinking possible within the framework of a "BMX" provides the basis to leverage the resources of multiple broadcasters and function as a coherent industry, as a virtualized entity.) Broadly speaking, there are currently two types of terrestrial broadcast system designs on the table for comparison: those that envision interworking with other IP networks (network aware); and those that are traditional standalone broadcast islands. The LTE system and the presently disclosed system adhere to the spirit of a being network aware, and the DVB-T2/NGH systems with roots in legacy DVB-T, that of a broadcast island.

Today, many wireless system architectures use a global timing reference such as GPS and a physical layer framing structure requirement of an integer number of OFDM symbols per frame. This structured physical layer framing may be essential in a network aware design. Structure also brings flexibility and simplicity.

TABLE 1

LTE OFDM Parameters

| | | | | | | |
|---|---|---|---|---|---|---|
| Bandwidth | 1.4 MHz | 3 MHz | 5 MHz | 10 MHz | 15 MHz | 20 MHz |
| Sub-Frame | | | | 1 ms | | |
| Sub-Carrier Spacing | | | | 15000 Hz | | |
| Sampling Frequency | 1.92 MHz | 3.84 MHz | 7.68 MHz | 15.36 MHz | 23.04 MHz | 32.72 MHz |
| FFT Size/ Cyclic Prefix μs/ Doppler 600 MHz (MPH) | 128/ 4.7-5.2/ 1667 | 256/ 4.7-5.2/ 1667 | 512/ 4.7-5.2/ 1667 | 1024/ 4.7-5.2/ 1667 | 1536/ 4.7-5.2/ 1667 | 2048/ 4.7-5.2/ 1667 |
| Used Subcarriers | 76 | 181 | 301 | 601 | 901 | 1201 |
| OFDM Symbols 1 ms Sub-Frame | | | | 14 | | |
| Resource Element (RE) | | | | 1 Sub-Carrier | | |
| Resources Frequency Domain | | | | 180 kHz = 12 Sub-Carriers | | |
| Resource Block (RB) Time/Frequency Grid | | | | 14 Symbols × 12 Sub-Carriers = 168 RE (Sub-Carriers) | | |
| # RB 1 ms Sub-Frame | 6 | 15 | 25 | 50 | 75 | 100 |

NGB Modulator (slave). To ensure good turbo coding gain, adequate time and frequency diversity is applied at physical layer for each physical layer pipe (PLP), which may also have an independent Coding Rate/QAM. This is achieved in the design while still ensuring opportunities for both excellent power savings (UE) and consistently fast channel change times using a 1000 ms (one second) Super Frame structure.

To achieve these objectives, the present proposal leverages technology and concepts from 3GPP LTE-A and ETSI DVB-NGH synergistically, to enable a parameterized Table 1 shows the basic LTE OFDM parameters. (There is also an extended Cyclic Prefix at both 15 kHz and 7.5 kHz sub-carrier spacing modes. But only the normal cyclic prefix mode is shown in Table 1, for simplicity.) In LTE there is a 1 ms sub-frame (composed of two 0.5 ms slots) defined that has an integer number of symbols (14) shown in Table 1. (A symbol is composed of a useful part of duration $T_u$ plus a cyclic prefix CP. In LTE, normal structure for a slot has 7 symbols, but for the present comparison, we use units of sub-frames (i.e., 1 ms subframes).) This will equate to an integer number of symbols per LTE frame (10 ms), and intuitively, an integer number of symbols in 1 second. LTE is designed to have a constant 15000 Hz sub-carrier spacing (ΔF) independent of bandwidth. (LTE covers 700 MHz up to 3 GHz. The decision on 15000 (ΔF) provided adequate Doppler over this range but also results in 1167 MPH Doppler at 600 MHz. This has led some to argue for trading Doppler for longer CP for broadcasting in 600 MHz band.) For LTE the baseline parameter is 20 MHz bandwidth with the sampling frequency of 30.72 MHz and the FFT size of 2048, resulting in 15000 Hz (ΔF). For each bandwidth down from 20 MHz shown in Table 1, the Sampling Frequency and FFT size is scaled down to result in a constant 15000 Hz (ΔF). Another important attribute is that the LTE standard assigns physical layer resources directly to a user known at the physical layer. Hence, a given receiver (UE) only needs to perform a partial FFT and demodulate only sub-carriers of the OFDM symbol that carry data it wants to receive that was assigned by eNodeB. This also enables power savings on the UE.

Note: The CLX/SBG proposal (i.e., the presently-disclosed proposal) may also adopt the requirement of integer number symbols in a sub-frame (10 ms) in its OFDM framework and the assignment of physical layer resources to a PLP to enable a nomadic (UE) receiver to be designed to ensure good power savings.

Next, before briefly discussing the OFDM framing of DVB-NGH, it should be mentioned that this comparison in no way detracts from the performance potential of the NGH system which is based on LDPC/BCH coding. We believe that the laws of physics dictate that the television broadcast spectrum is non-fungible. Some parts of the broadcast band are more efficient and practical for nomadic, tablet/handheld type services and others more effective at providing for fixed services. When studying LTE (Turbo Codes) and DVB-NGH (LDPC/BCH), the better performance of turbo codes at low code rates and moreover their native flexibility were decided as important attributes for nomadic service and may be leveraged to create the parameterized nomadic waveform proposed herein. LDPC has good performance at higher code rates and low error floors, and these are attributes that may be leveraged in creating of a parameterized fixed waveform. We also believe the NGBP with IP Core (BMX) can provision for a unifying architecture that can deliver different parameterized waveforms targeted at service types (Nomadic/Fixed) or other special constraints brought on by the RF physics in specific environments within a portion of the television broadcast band, etc.

Table 2 (i.e., FIG. 3B) shows the general DVB-NGH OFDM parameters based on the fundamental decision of a sampling frequency made some 20 years ago for the DVB-T architecture and carried forward as a legacy constraint. Within DVB, the sampling frequency varies for each bandwidth as does the sub-carrier spacing for the FFT sizes resulting in a non-integer number of symbols in a frame. There is a lack of a native (network aware) temporal structure in this framing. This would be fine if the vision for Broadcasters remained one of 1,700 independent, isolated islands, but uninviting if the notion is to advance the industry.

The CLX/SBG proposal provides an opportunity to use important foundational elements of other proponents (i.e. LDPC). This would provide an opportunity to bring other component pieces into an interconnected and network responsive environment. The opportunity afforded in a newly created non-backwardly compatible standard (ATSC 3.0) inside of the CLX/SBG framework would provide a place for such essential building blocks to construct a fixed reception, parameterized waveform. This would enable a high data capacity, high spectral efficiency mode of operation. In some embodiments, our primary focus is on LTE (Turbo codes, Flexibility) for the parameterized nomadic waveform as a foundational element of the NGBP.

Table 3 below (for reference) shows some basic system parameters for the 6 MHz and 8 MHz bandwidths supported by DVB-NGH. We will build on these to develop a fuller understanding of system concepts.

TABLE 3

Some DVB-NGH OFDM Parameters for 6 MHz and 8 MHz

|  |  | 2K FFT | 4K FFT | 8K FFT | 16K FFT |
|---|---|---|---|---|---|
| (6 MHz) | TU μs | 299 | 597 | 1195 | 2389 |
|  | Sub-Carrier Spacing (Hz) | 3348 | 1674 | 837 | 419 |
|  | Doppler @ 600 MHz (MPH) | 377 | 188 | 95 | 47 |
| (8 MHz) | TU μs | 224 | 448 | 896 | 1792 |
|  | Sub-Carrier Spacing (Hz) | 4464 | 2232 | 1116 | 558 |
|  | Doppler @ 600 MHz (MPH) | 502 | 251 | 126 | 63 |

Table 4 shows a subset of the OFDM parameters (just one possible set) of the nomadic waveform being proposed.

In some embodiments, we use a common 12.288 MHz sampling frequency across all supported bandwidths. (The 12.288 MHz is derived by 2×3.84 MHz (WCDMA Chip rate)×8/5=12.288 MHz. For reference, LTE sampling frequencies are also based on the same 3.84 MHz. Regarding the supported bandwidths, the bandwidths initially chosen may be limited to those of most interest in North America (USA). Carrier aggregation (CA) is supported and any number of bandwidths combinations are possible under control of a NGB Gateway.) There are (4) FFT sizes and cyclic prefix (CP) selected to always ensure an integer number of OFDM symbols in a 10 ms sub-frame and a determined reasonable number of useful SFN cell sizes and corresponding useful Doppler spread. However before discussing more details, the use of Table 4 in a system design is briefly discussed to give more insight by example (Values in BOLD).

First, a SFN size (CP) and the Doppler performance is selected. For example, let's assume that a CP (111 μs) and a Doppler of (112 MPH) is selected for nomadic service. The FFT size will be 12,288 and the sub-carrier spacing is 1000 Hz. This is always independent of the bandwidth chosen and only the number of used sub-carriers (FFT) change as a function of the bandwidth. Let's assume a single 6 MHz bandwidth which results in 5700 used sub-carriers and nine (9) OFDM symbols per sub-frame 10 ms.

Note: holding the sampling frequency (12.288 MHz) constant provides synergy to the use of carrier aggregation (CA) in a network aware design to increase a channels capacity (bps) by increasing the bandwidth. This was the result of a conscious effort in our NGBP design to hedge against an unknown future and during an era in the USA when the FCC is experimenting with the concept of voluntary incentive auctions. The Sinclair Broadcast Group believes given a new standard and granted flexible spectrum use, broadcasters could use their spectrum more efficiently and serve the public interest better in the 21st century to mention but a few benefits to public.

Also, an important concept to bring forward is that known physical layer resources (sub-carriers) can be assigned a virtual 'channel' referred to as a physical layer pipe (PLP), which is directly identifiable at the physical layer (enabling power savings in UE design).

Returning to the 6 MHz example, the total number of used sub-carriers is 5700 and these are then partitioned in the frequency domain into 10 stripes, each composed of 570 sub-carriers evenly spaced. (The 5700 used subcarriers excludes the center DC and edge sub-carriers, and represents only the useful sub-carriers that can carry data or reference pilots for channel estimation.) A PLP with independent (Code/QAM) is mapped to every 10th physical layer sub-carrier spaced evenly across the total bandwidth. The PLP sub-carrier # assignment is swept in the frequency domain to ensure maximum frequency diversity and time interleaving (physical layer) across one super frame (1000 ms) which provides time diversity, helping to mitigate slow fades at pedestrian speeds<3 km/hr. The coherence time=0.423/Fd at 600 MHz and at a speed of 3 km/hour is ~2 Hz which equates to a coherence time ~200 ms. The proposal supports a time interleaving of ~990 ms.

Given the overall nature of this RFQ it is assumed that SIMO operating mode is normative. Implementations with SFN transmitter diversity should further help mitigate the impact of fading and or shadowing in the nomadic environment. (Single Frequency Network mode is a straight forward native function of the system, as will be explained.)

Figure 4:
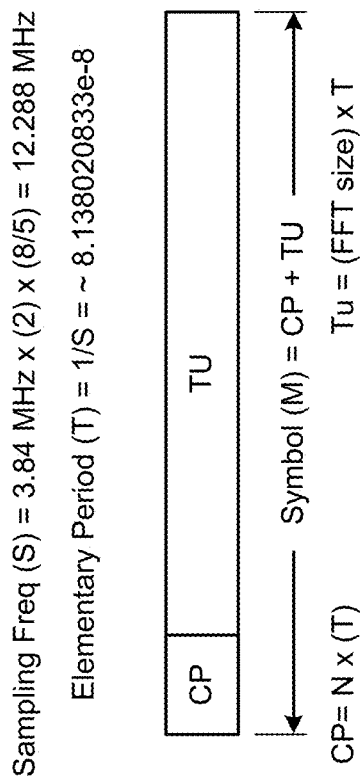
FIG. 4 illustrates one embodiment of an OFDM symbol, including a cyclic prefix CP and an IFFT-bearing portion (of duration TU).

FIG. 4 presents the basic OFDM symbol as a function of elementary period (T). (The elementary period may also be referred to as the sample period, which is the inverse of the sample rate.) This always results in an integer number of symbols per sub-frame (10 ms) for the four example FFT sizes in Table 4, i.e., the FFT sizes 6144, 9216, 12288 and 18432. FFT sizes from 6144 to 18432 are used for nomadic modes of operation while larger FFT sizes are used for fixed modes of operation. (In Table 4, the row labeled "FFT Size/Sub-Carrier Δ Hz/Cyclic Prefix μs/Doppler 600 MHz (MPH)" includes four constructs of the form A/B/C/D for each value of bandwidth. For example, the first column, corresponding to 5 MHz bandwidth, includes the construct 6144/2000/56/224. The first element 6144 is the FFT size, the second element 2000 is the sub-carrier spacing Δ, the third element 56 is the cyclic prefix size, and the fourth element 224 is the Doppler value.) A new, highly structured framework leads to great flexibility, simplicity and efficiency in broadcast system operations. The very nature of this structuring actually makes the engineering problem easier to manage.

Figure 5A:
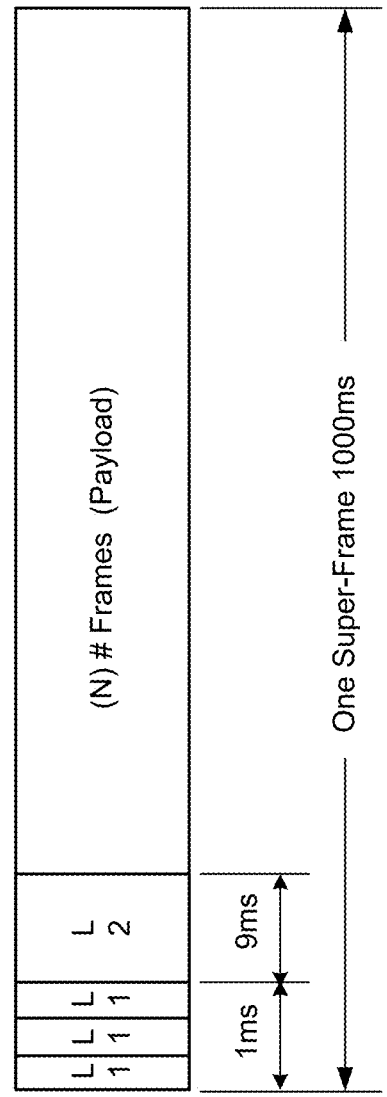
FIG. 5A illustrates the structure of a superframe, according to one embodiment.

FIG. 5A shows the proposed Super Frame (SF) structure (1000 ms) duration, according to one embodiment. It is composed of a universal L1 preamble section (1 ms) and L2 symbol section (9 ms) followed by a payload section (990 ms).

Table 5 (i.e., FIG. 5B) is a summary of the main proposed OFDM parameters (other bandwidths being possible and presumed). The design also envisions normalizing the Guard Interval Fraction (GIF) at ~10% (1/10) as a simplification. This provides a reasonable overhead for nomadic service supporting large SFN range spacing up to 50 km while meeting the overall system design constraints. However, fixed service can use longer symbols and corresponding closer spaced sub-carriers (lower Doppler) and are classically more efficient. A new parameterized fixed waveform adhering to these system design constraints would be more efficient since the Doppler spread is traded for a longer symbol time (TU).

Figure 6:
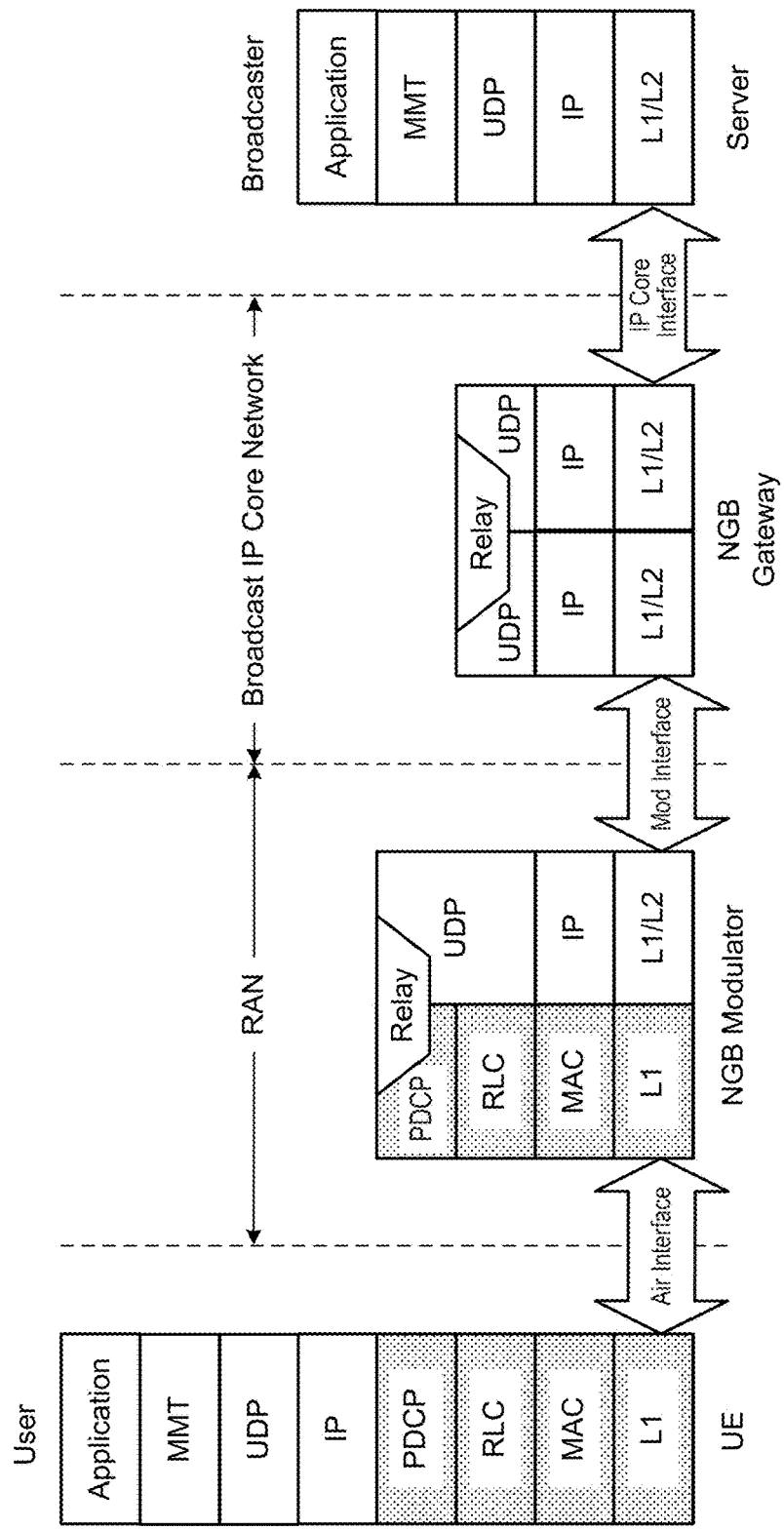
FIG. 6 illustrates protocol layers at the UE, the NGB modulator, the NGB gateway and the server, according to one embodiment.

Before introducing the physical layer block diagram in detail, FIG. 6 shows the existing 3GPP LTE-A protocols (with gray background) that are re-used (with modifications) in our broadcast proposal.

Next, the system block diagram, FIG. 7, is presented in conjunction with a system walk-through of (high-lighted) blocks in the system diagram to give some introductory insight into this non-backwardly compatible ATSC 3.0 proposal.

System Walkthrough

In some embodiments, the system is required to support both fixed and nomadic user equipment operating in the television broadcast frequency band—all day, everyday, across a wide variety of terrestrial landscapes and waterways. The propagation of radio and television signals across the terrestrial surface varies with the weather, day/night effects in the atmosphere and ionosphere, and user motion (users tend to be moving at higher speeds during commuting hours). These variations suggest a flexible solution that may adapt to the current conditions automatically. Therefore, an adaptive parameterized nomadic waveform is at the center of the proposed CLX/SBG system. It should be noted that this physical layer can stand on its own as a viable (but isolated) layer in a broadcast protocol stack, but we contend that such isolation provides for a less effective platform utilization. Only by taking a synergistic system view of the physical layer as one of the foundational elements in a complete NGBP, will the true potential (as an integrated platform) be revealed. Therefore our discussion of the physical layer will not be in strict isolation, but at times will be broadened to that of the physical layer as one of the synergistic elements within a NGBP.

Figure 7C:
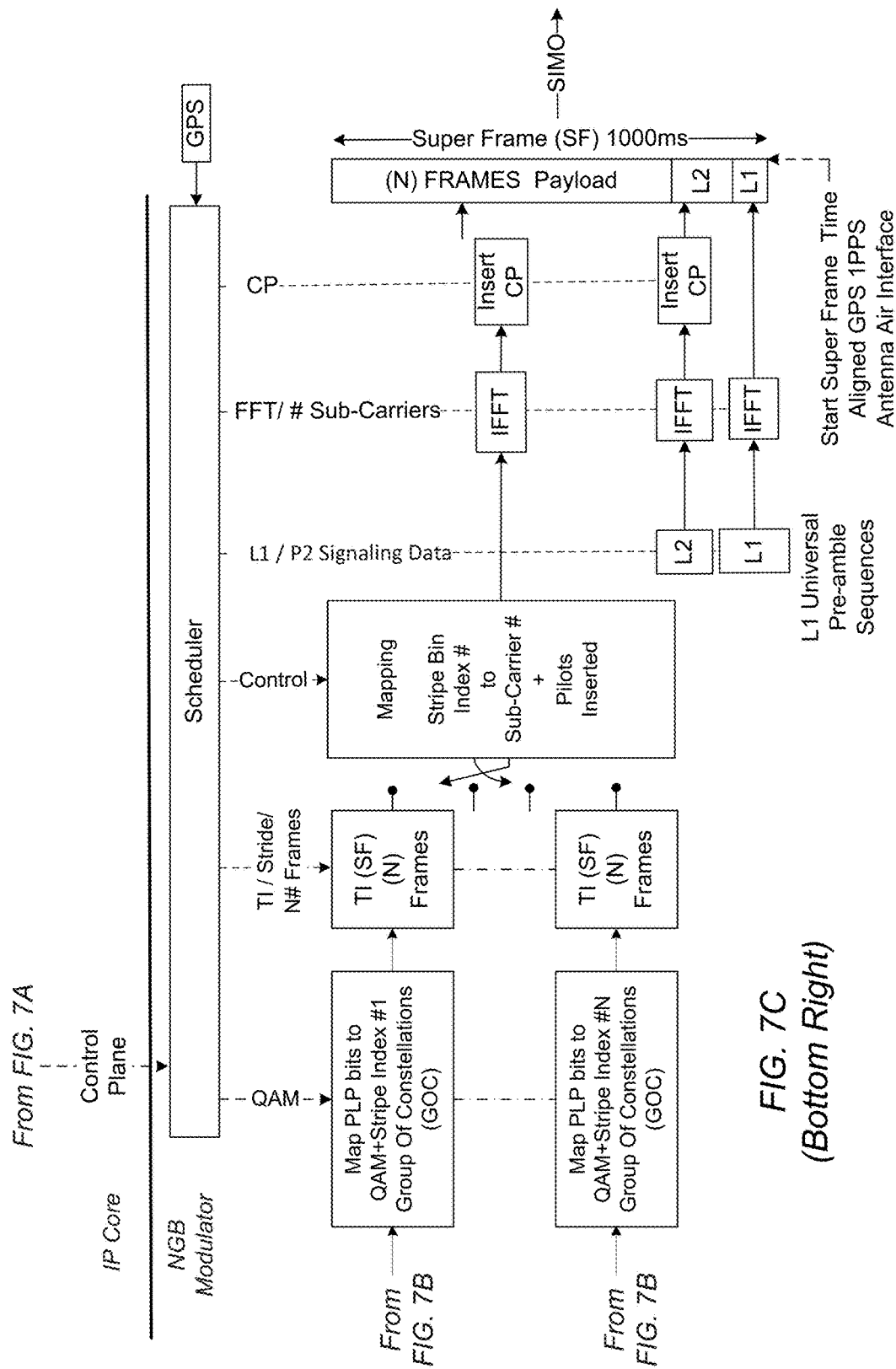

FIGS. 7A-7C present a system level block diagram that will be discussed (broken into detailed sections by protocol layer at times) below.

Returning to FIG. 6, the four protocol layers that are needed in this proposal to produce a nomadic waveform at the air interface are the Packet Data Convergence Protocol (PDCP), Radio Link Control (RLC), Media Access Control (MAC) and the Physical Layer (L1). (See 3GPP TS 36.323 v10.0.0 (PDCP); 3GPP TS 36.322 v10.0.0 (RLC); 3GPP TS 36.321 v10.0.0 (MAC); 3GPP TS 36.201 v10.0.0 (Phy).) The first three protocols are shown at the bottom left of FIG. 7B. All the remaining blocks to the right of the MAC layer are parts of the Physical Layer. These four layers exist in the widely known 3GPP LTE-A (OFDMA) eNodeB cellular base station architecture; and therefore, when appropriate, the naming conventions used there are carried over to this broadcast proposal.

Figure 8:
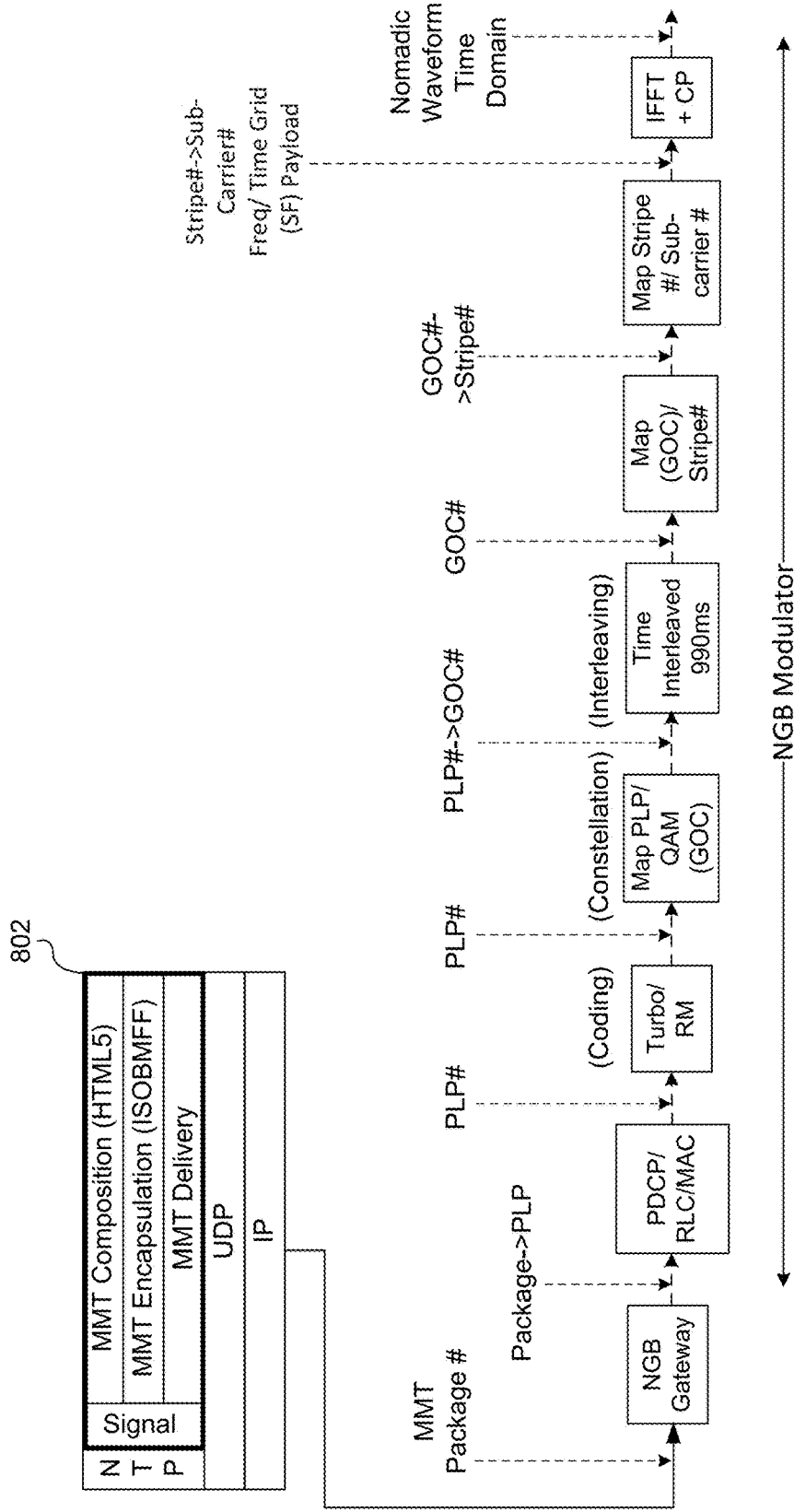
FIG. 8 illustrates one embodiment of user plane signal flow.

FIG. 8 shows a simplified signal flow diagram of the NGP Gateway and the NGP Modulator. An example MMT stream in internet protocol (shown in the heavy outlined box 802 of FIG. 8) feeds the NGB Gateway at the left of FIG. 8. After multiple stages of processing, the MMT data emerges at the right as part of a nomadic waveform in the time domain, suited to broadcast transmission. The term "MMT Package" is used in MPEG-H Part 1 to describe a collection of assets (Video/Audio/Data Objects) that are all treated as native elements under HTML5 and describe a "View". This is the spatial/temporal layout that is to be rendered by an HTML5 browser engine and presented with respect to a presentation time line (UTC wall Clock) described by the MMT extensions proposed to HTML5 (W3C). (The quick establishment of a reliable UTC clock in the broadcast client may be essential for the MPEG-H MMT paradigm to work. However, the MMT specification is silent on how a UTC clock is established in the broadcast nomadic client. The present proposal may address this by serving time over the proposed air interface which is constrained to emit the start of a Super Frame in line with the GPS 1PPS tick. Therefore this proposal carries a sample of UTC time in the L2 signaling which enables establishment of a UE UTC clock within the accuracy that is needed for the Video/Audio presentation timeline in MMT.) For the sake of this discussion, the MMT Packages are produced in one second chunks and are shown entering the NGB Gateway as IP Flows. The Packages are mapped to virtual physical layer pipes (PLP) in the NGB Gateway as part of the cross layer preprocessing and are sent to the NGB modulator. The (PDCP, RLC, MAC) receives the PLP IP Flows. Each individual PLP is Turbo Coded and Mapped to a QAM constellation in the next two blocks. The group of constellation symbols (GOC) then enters the time Interleaving Block which ensures adequate physical layer time diversity for nomadic service. The GOC is then mapped in the frequency domain into Stripes. The PLP is then generally mapped onto 1 of 10 stripes that sweep in a pattern across all OFDM sub-carriers in a symbol (frequency diversity). Next, the Stripes are then spread out in time domain over the payload area (990 ms) of a Super Frame. The IFFT+CP converts signal to the desired time domain digital waveform. This digital waveform may feed a digital to analog converter, followed by analog up-conversion to RF, power amplification, and antenna feed for transmission over the air (not shown).

Figure 9:
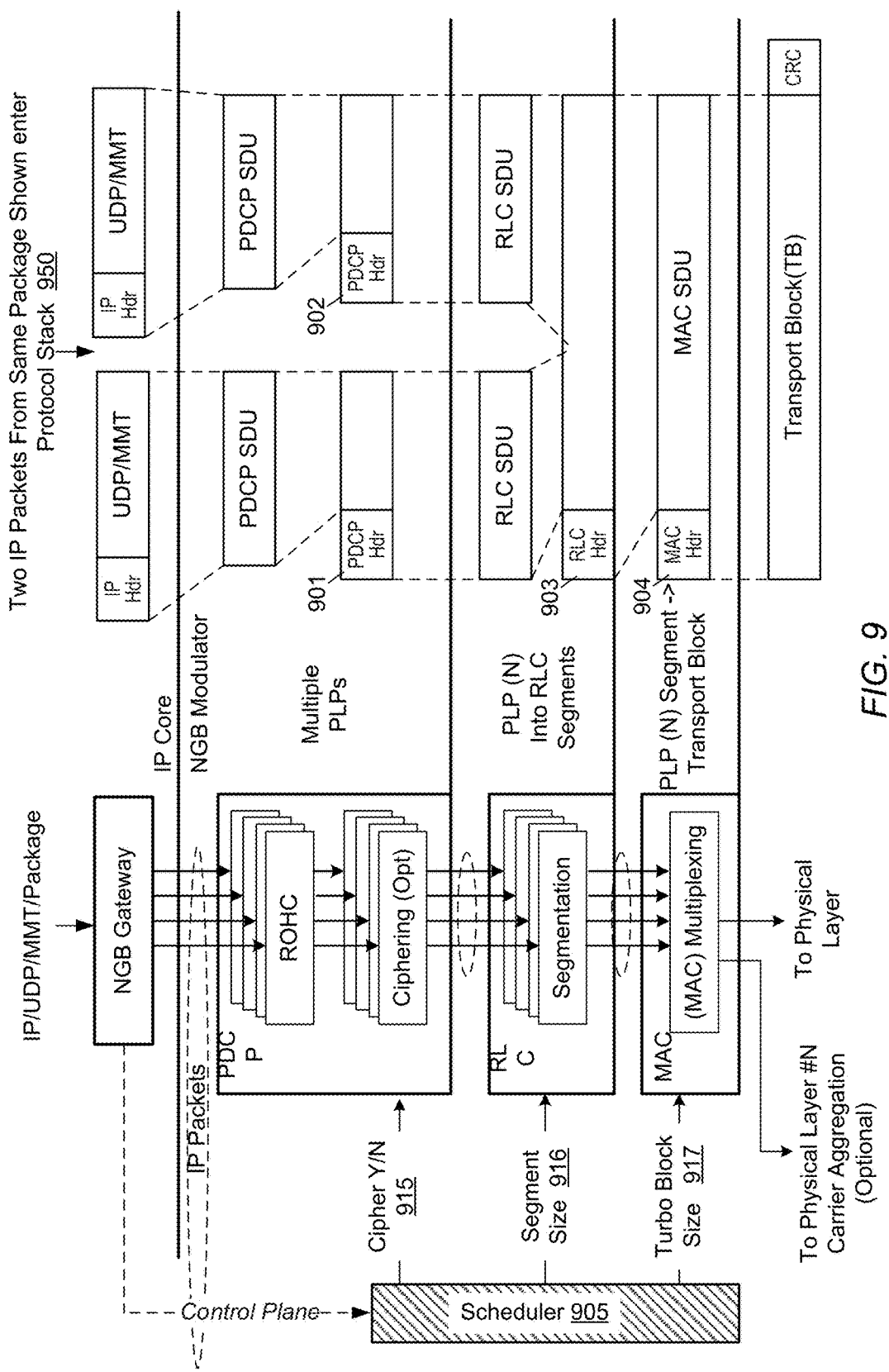
FIG. 9 illustrates one embodiment of PDCP, RLC and MAC Protocol Layers.

FIG. 9 shows that the PDCP, RLC, and MAC blocks add some header information at 901, 902, 903 and 904.

First, a brief discussion of the functionality (retained or modified) from 3GPP LTE-A blocks in FIG. 9. The NGB Gateway is the master entity responsible for assignment of all physical layer resources in the NGB modulator. The control plane communicates all allocation decisions made by the Gateway to the Scheduler (905), which carries them out via adaptation control signals (915-917). (The details of the adaptive controls 915-917 from the scheduler 905 will be discussed holistically in the section on the adaptive parameterized nomadic waveform functionality later in this document.) This central control node (the NGB Gateway) also ensures that the same parameter values are used in each NGB modulator in a single frequency network (SFN) of multiple transmitters (as is required for proper operation).

The user data plane from the gateway transports all IP Flows (PLPs) to the PDCP layer. In the PDCP ROHC is used to compress all IP headers on incoming packets. Then, optional encryption can be applied on a PLP basis. (The present proposal also envisions supporting and/or augmenting the LTE Unicast First NET with IP Flows for broadcast service either to the general public or geo-targeted in times of emergency. Also, (private) first responder traffic can be encrypted by a (First Net crypto unit) in PDCP as another example. This may be coordinated under a service level agreement between Broadcasters and First Net, and be reflected in the policy running in the NGBP (BMX) IP Core.) The multiple PLPs are then separated and encapsulated into common segments in the RLC layer. (The LTE RLC protocol inserts an incremented segment count into the RLC segment header.)

In LTE, the UE would detect any gaps in the segment count (header) request (ARQ) the lost segment/s be removed from cache (RLC) and re-transmitted. The RLC segment counter (to be explained later) is also used in this broadcast proposal (change in protocol) to request lost segments from (RLC Data Segment Cache in the IP Core) when a broadcast receiver (UE) has a means to request and receive natively (i.e. LTE radio), enters into a Wi-Fi zone (or other network), or has other (wired or wireless) means for connectivity. This new ARQ function is designed to increase the QOS on non-real time media or data file transfers only and is but one example of a broadcast platform service.

Each segmented PLP (RLC) is then encapsulated in a MAC layer packet with CRC which is then sent to the extended 3GPP Turbo encoder. (The CRC is used in conjunction with turbo decoding in receiver.) The MAC layer is the anchor point for carrier aggregation (CA) and this is shown as the option to send a scheduled transport block to another physical layer. The support for broadcast CA is also covered in a separate section. On the top right at 950 are shown two packets belonging to from same (MMT) package or PLP being encapsulated by PDCP/RLC layers into a single Transport Block in the Mac layer which is then forward to the extended 3GPP Turbo encoder in our proposal.

Forward Error Correction Coding

For mobile system configurations, Forward Error Correction (FEC) applied to each PLP is recommended in the form of Turbo Coding. LDPC may be used for fixed reception given its unbounded error floor compared to Turbo Codes and moderately improved bit error performance for increasingly long block sizes.

Figure 10:
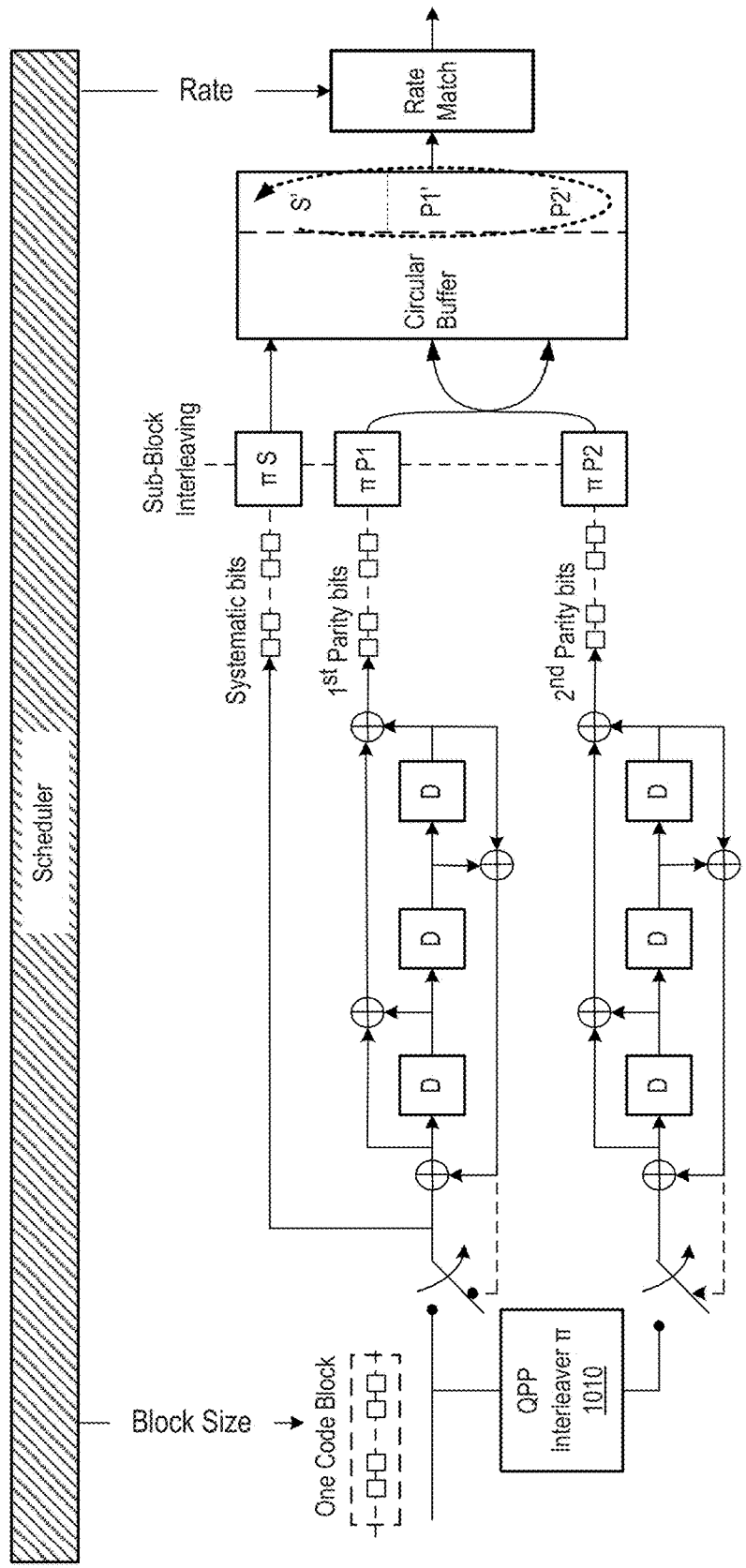
FIG. 10 illustrates one embodiment of a 3GPP LTE Turbo Encoder and rate matcher.

The turbo encoder may include an identical pair of Parallel Concatenated Convolutional Code (PCCC) 8-state constituent encoders, the inputs to which are separated by an internal interleaver 1010, as illustrated in FIG. 10. In some embodiments, the turbo encoder coding rate is R=1/3.

The transfer function of the 8-state constituent code for the PCCC is:

$$G(D) = \left[1, \frac{g_1(d)}{g_0(D)}\right].$$

where $$g_0(D) = 1 + D^2 + D^3,$$

$$g_1(D) = 1 + D + D^3.$$

The initial value of the shift registers for each constituent encoder shall be all zeros at the start of encoding each block of input bits.

The output from the turbo encoder is given as $$d_k^{(0)} = x_k$$

$$d_k^{(1)} = z_k$$

$$d_k^{(2)} = z'_k$$

for k=0, 1, 2, . . . , K−1, where K is the input block size.

The bits input to the turbo encoder are denoted by $c_0, c_1, c_2, c_3, \ldots, c_{K-1}$, and the bits output from the first and second 8-state constituent encoders are denoted by and $z'_0, z'_1, z'_2, z'_3, \ldots, z'_{K-1}$, respectively. The bits output from internal interleaver are denoted by $c'_0, c'_1, \ldots, c'_{K-1}$, providing input to the second 8-state constituent encoder.

Rate Matching

After channel coding it is possible to add or drop a small percentage of symbols from the stream without inducing errors into the data payload. In FIG. 10, we see that turbo coded blocks are delivered to the Rate Matcher 1100 in blocks of $D_r$ bits, denoted by $d_{r0}^{(i)}, d_{r1}^{(i)}, d_{r2}^{(i)}, d_{r3}^{(i)}, \ldots, d_{r(D_r-1)}^{(i)}$, with i=0, 1 and 2, for code block number r, and coded stream index i.

Figure 11:
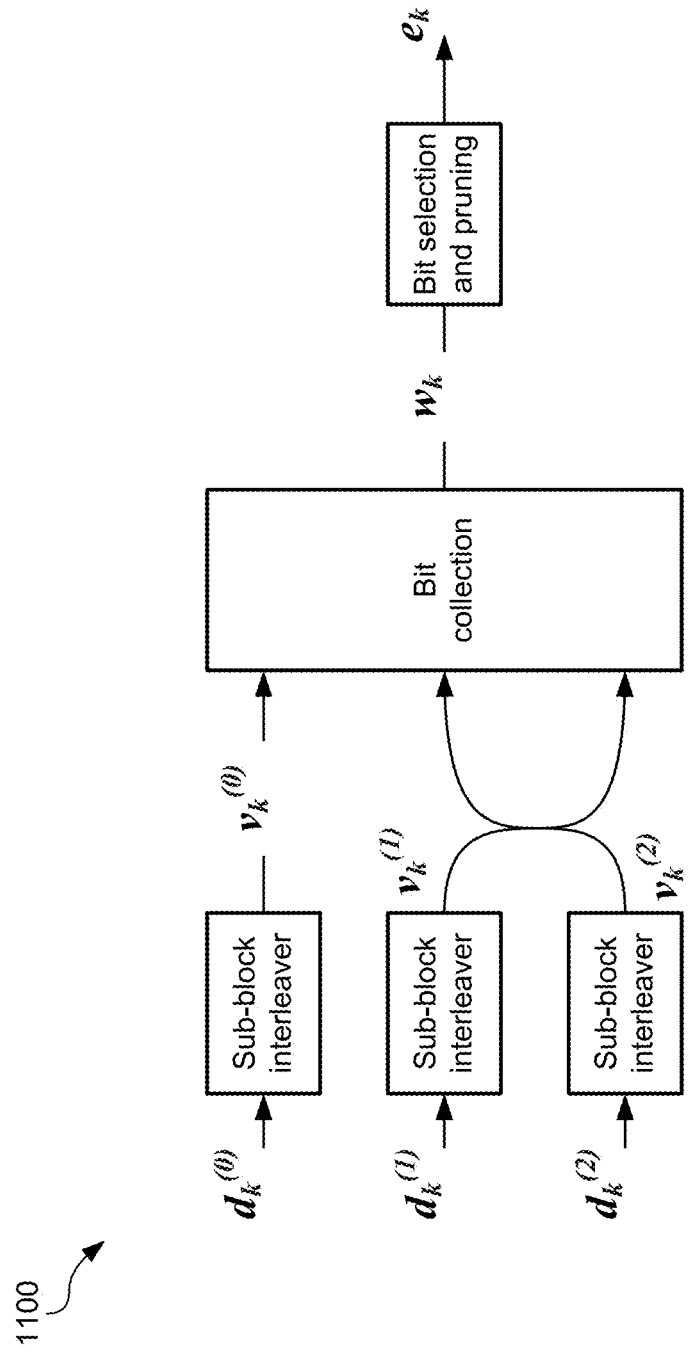
FIG. 11 illustrates one embodiment of a rate matching unit.

Defined per coded block, rate matching consists of interleaving the three information bit streams $d_k^{(0)}$, $d_k^{(1)}$ and $d_k^{(2)}$, followed by the collection of bits and the generation of a circular buffer as depicted in FIG. 11.

The circular buffer of length $K_w=3K_\Pi$ for the rth coded block is generated as follows:

$w_k=v_k^{(0)}$ for $k=0, \ldots, K_\Pi-1$ $w_{K_\Pi+2k}=v_k^{(1)}$ for $k=0, \ldots, K_\Pi-1$ $w_{K_\Pi+2k+1}=v_k^{(2)}$ for $k=0, \ldots, K_\Pi-1$ After bit selection and pruning, the rate matcher delivers a stream of $E_r$ bits denoted by $e_{r0}, e_{r1}, e_{r2}, e_{r3}, \ldots, e_{r(E_r-1)}$, for coded block number r, to accommodate a fixed capacity transport frame with a total number of bits available, G, such that $G=N_L \cdot N_{SC} \cdot Q_m$, where $N_L$ denotes the number of transmission layers, $N_{SC}$ denotes the number of subcarriers available per stripe, and $Q_m$ is equal to 2 for QPSK, 4 for 16QAM, 6 for 64QAM, and 8 for 64QAM. That capacity is divided amongst multiple IP flows, each of which carries audio, video, and/or data associated with a multitude of broadcast service offerings. This contrasts with LTE rate-matching which responds to a multitude of data requests from subscribers' (UE).

Data Scrambling

Each block of bits, $b^{(q)}(0), \ldots, b^{(q)}(M_{bit}^{(q)}-1)$, transmitted in code word q on the physical channel, shall be scrambled prior to modulation, resulting in a block of scrambled bits $\tilde{b}^{(q)}(0), \ldots, \tilde{b}^{(q)}(M_{bit}^{(q)}-1)$ according to $\tilde{b}^q(i)=(b^q(i)+c^q(i))\mod 2$.

Figure 12:
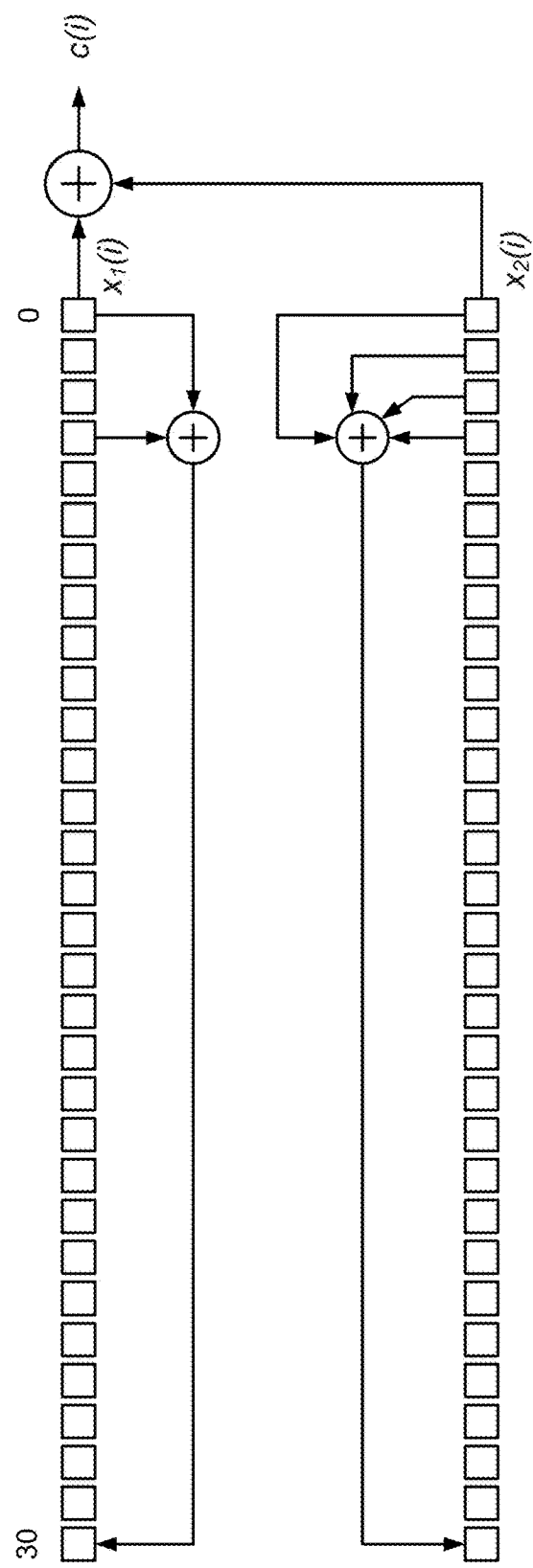
FIG. 12 illustrates one embodiment of a scrambler sequence generation unit.

Referring now to FIG. 12, the scrambling sequence generator may be initialized at the start of each subframe, where the initialization value of $c_{init}$ for sub-frame number $n_s$ depends on the transport channel type according to $c_{init}=n_{RNTI} \cdot 2^{14}+q \cdot 2^{13}+\lfloor n_s/2 \rfloor \cdot 2^9+N_{ID}^{cell}$ where $n_{RNTI}$ corresponds to the RNTI associated with the PLP.

Up to two code words can be transmitted in a single sub-frame, i.e., $q\gamma\{0,1\}$ corresponding to single layer transmission for q equal to zero and two-layer transmission for q equal to one.

Pseudo-random sequences used by the scrambler are defined by a length-31 Gold sequence. See FIG. 12. The output sequence c(n) of length $M_{PN}$, where $n=0, 1, \ldots, M_{PN}-1$, is defined by $c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ where $N_C=1600$ and the first m-sequence shall be initialized with $x_1(0)=1$, $x_1(n)=0$, $n=1, 2, \ldots, 30$. The initialization of the second m-sequence is denoted by $c_{init}=\lfloor n_s/2 \rfloor \cdot 2^9+N_{ID}^{CELL}$. In the case of SFN, $N_{ID}^{SFN}=N_{ID}^{CELL}$.

Figure 13:
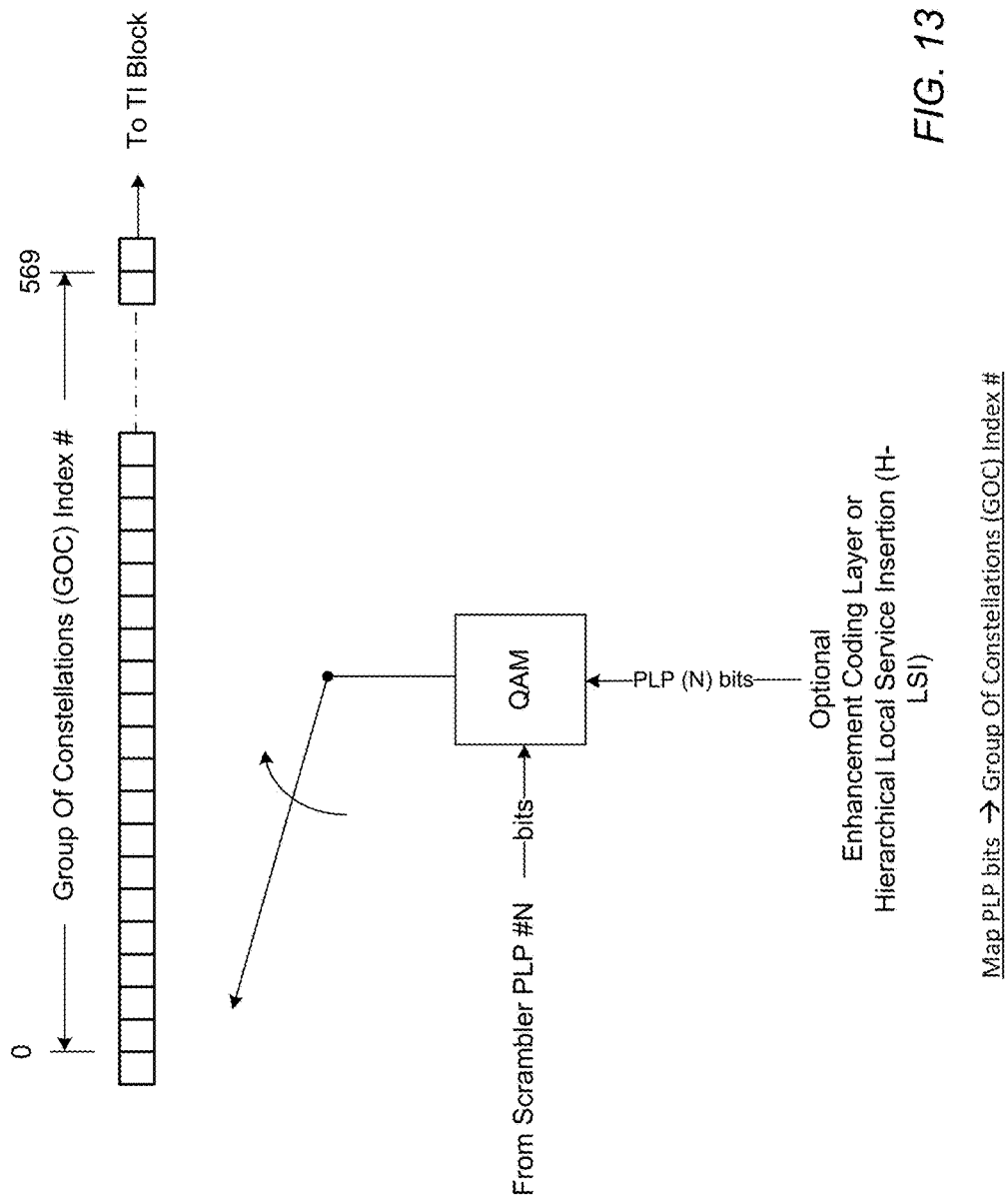
FIG. 13 illustrates one embodiment of a quadrature amplitude modulation (QAM) mapping.

FIG. 13 represents the mapping of PLP #N bits from Scrambler onto a QAM constellation mode the Broadcaster has provisioned. The typical nomadic QAM modes are QPSK, 16 QAM, and 64 QAM. A 256 QAM mode is also supported for special use cases to be discussed. (Higher order QAM modes may be used for higher data rates.) The output is a group of constellation (GOC) symbols that is sent to the next block, the time interleaver. FIG. 13 also shows support for optional Enhancement Layer Coding and Modulation and or Hierarchical Local Service Insertion in a SFN. (DVB-NGH also supports H-LSI. MPEG-H Part 2 (HEVC) is developing layered tools for base and enhancement layer coding.) H-LSI is supported for hyper-local insertion special targeted content at major venues or small densely populated areas in the SFN coverage area. (A deterministically positioned low power SFN NGB transmitter (antenna pattern) would uniquely insert the H-LSI content into target areas seamlessly under control of IP core in NGBP.)

Figure 14:
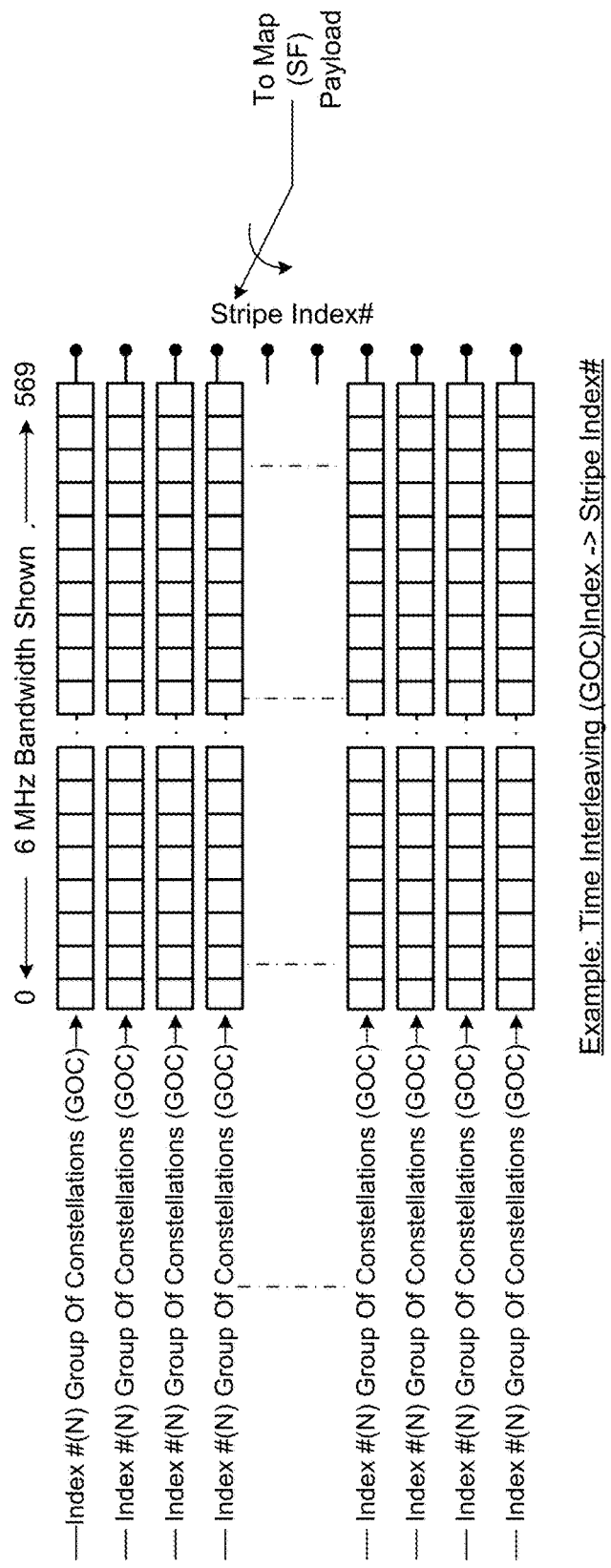
FIG. 14 illustrates one embodiment of a time interleaving from GOC Index Number to Stripe Index Number. GOC is an acronym for Group of Constellation.

FIG. 14 shows all the (GOC) with common index # that represents all the PLP content that will be transported in one super frame (1000 ms). All common Index # (GOC) input into a block interleaver row by row and then read out column by column under the control of the SF payload mapper as a Stripe Index # in the next block. When the Stripe Index # is distributed across by mapper ~990 ms of physical layer time interleaving (time diversity) is realized. This design attribute of this proposal is especially useful at low nomadic pedestrian speeds (3 km/h) because the time coherence of channel at 600 MHz is ~200 ms.

Figure 15:
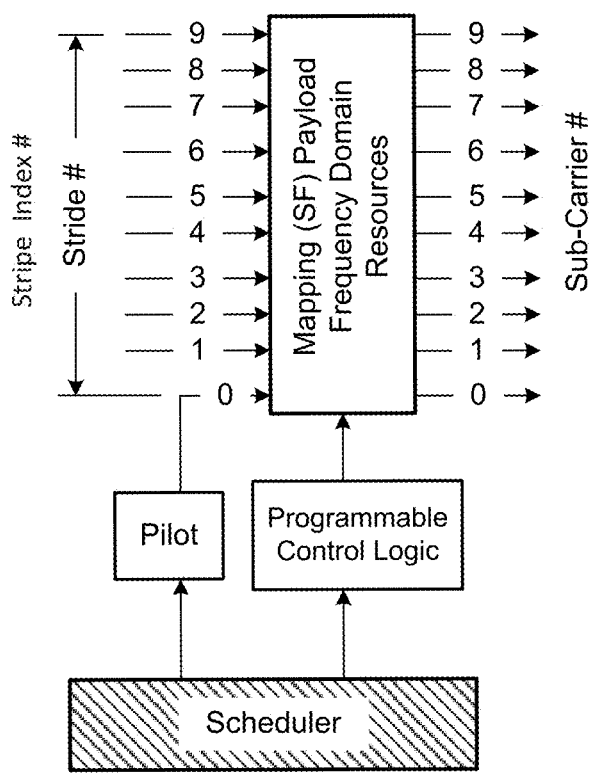
FIG. 15 illustrates one embodiment of a mapping from Stripe Index Number to Sub-carrier Number.
Figure 16:
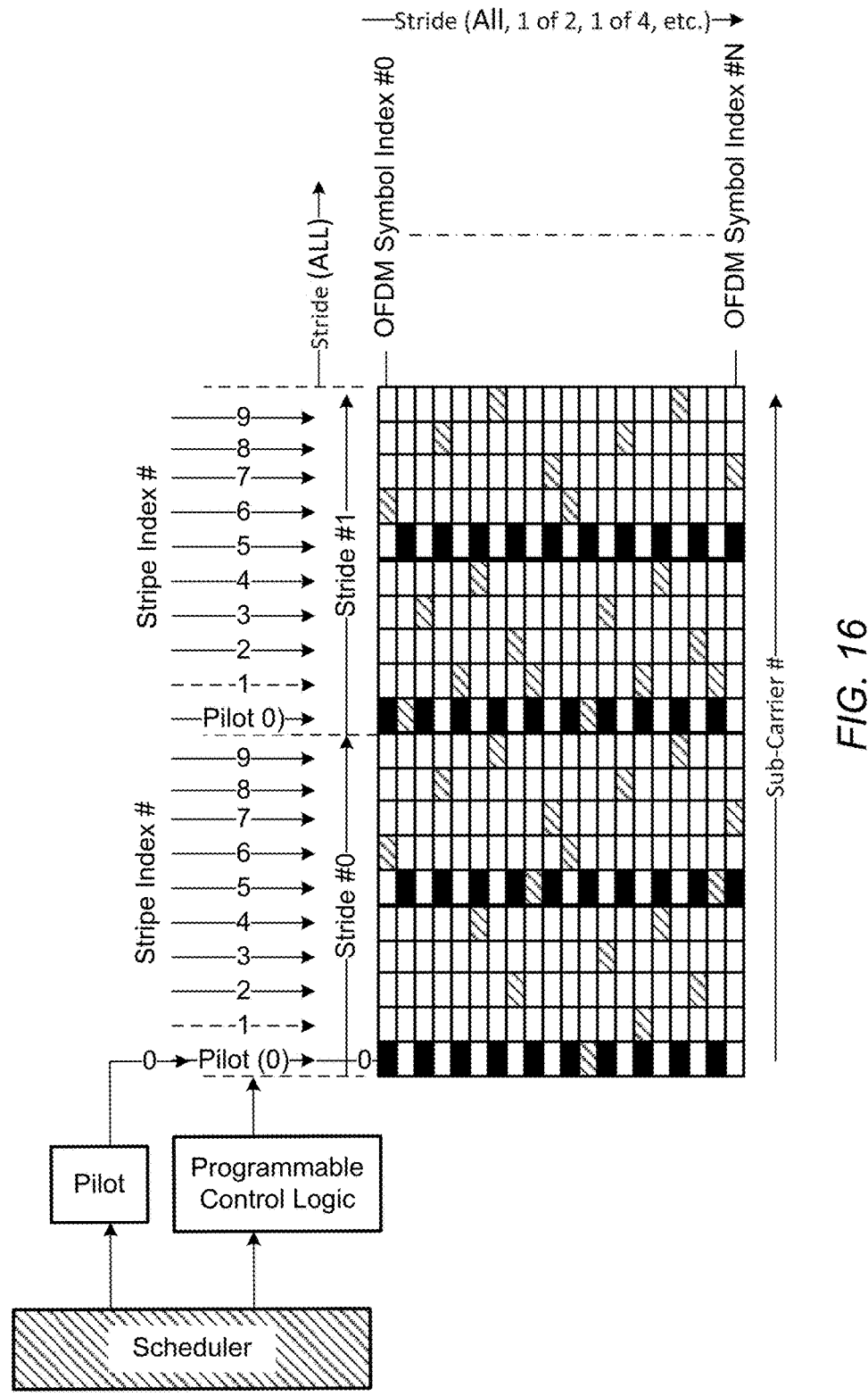
FIG. 16 illustrates additional concepts related to mapping, according to one embodiment.

Before discussing the next block (the SF Mapper), a couple of conceptual illustrations in the form of FIG. 15 and FIG. 16 are presented to introduce the key concepts before looking at a couple of examples of the (SF) payload mapping in FIG. 17 and FIG. 18 to help increase the readers understanding on a first pass.

From Table 5 summary, a super frame payload area is composed of an integer number of OFDM symbols (1782, 1188, 891 or 594) which is a function of the FFT size. The Stripe Index # (GOC) is mapped (frequency domain) to OFDM sub-carriers evenly spaced across the total useful bandwidth. The spacing between is determined by the number of stripes provisioned. For a 6 MHz bandwidth there are 10 stripes that are deterministically mapped (known a priori to receiver) across 5700 sub-carriers.

The distance before a given Stripe # repeats across sub-carriers of the same symbol is termed a Stride.

FIG. 16 shows the time/frequency grid (sub-carriers) that the mapper (programmable control logic) assigns to input Stripes (10 is shown for 6 MHz). For reference, time is shown on the vertical axis (OFDM Symbols) and frequency on the horizontal axis. Stripe Index #0 is reserved to insert pilot patterns (black) on sub-carriers for use in channel estimation. The other 9 stripes (1-9) can be assigned to carry PLP payload, Stripe #1 (dotted and crosshatched) will be used for this conceptual example. Two of the 570 Strides are shown (6 MHz) and starting from OFDM Index #0 a known pattern of Pilots and PLP data (Stripe #1) appears. The input parameters the control logic uses to perform mapping are:
  (1) Stripe # and in how many strides (1 of 2, 1 of 4, etc.) or as in this example (All) shall be mapped;
  (2) Starting Symbol Index # (this example #0) and Stride (1 of 2, 1 of 4) or as in this example (ALL);
  (3) Pilot patterns to support Doppler spread.

The take away is that this sweeping of Stripe # (PLP) across the total bandwidth is designed to offer maximum frequency diversity and also some protection from frequency selective fading. As will be seen later, these patterns of Stripes (PLP) are announced to the receiver in the L2 signaling and can enable power saving receiver designs that perform (partial FFT) and demodulate only the desire PLP # or Stripe # using the structured framework of this physical layer proposal.

Figure 17A:
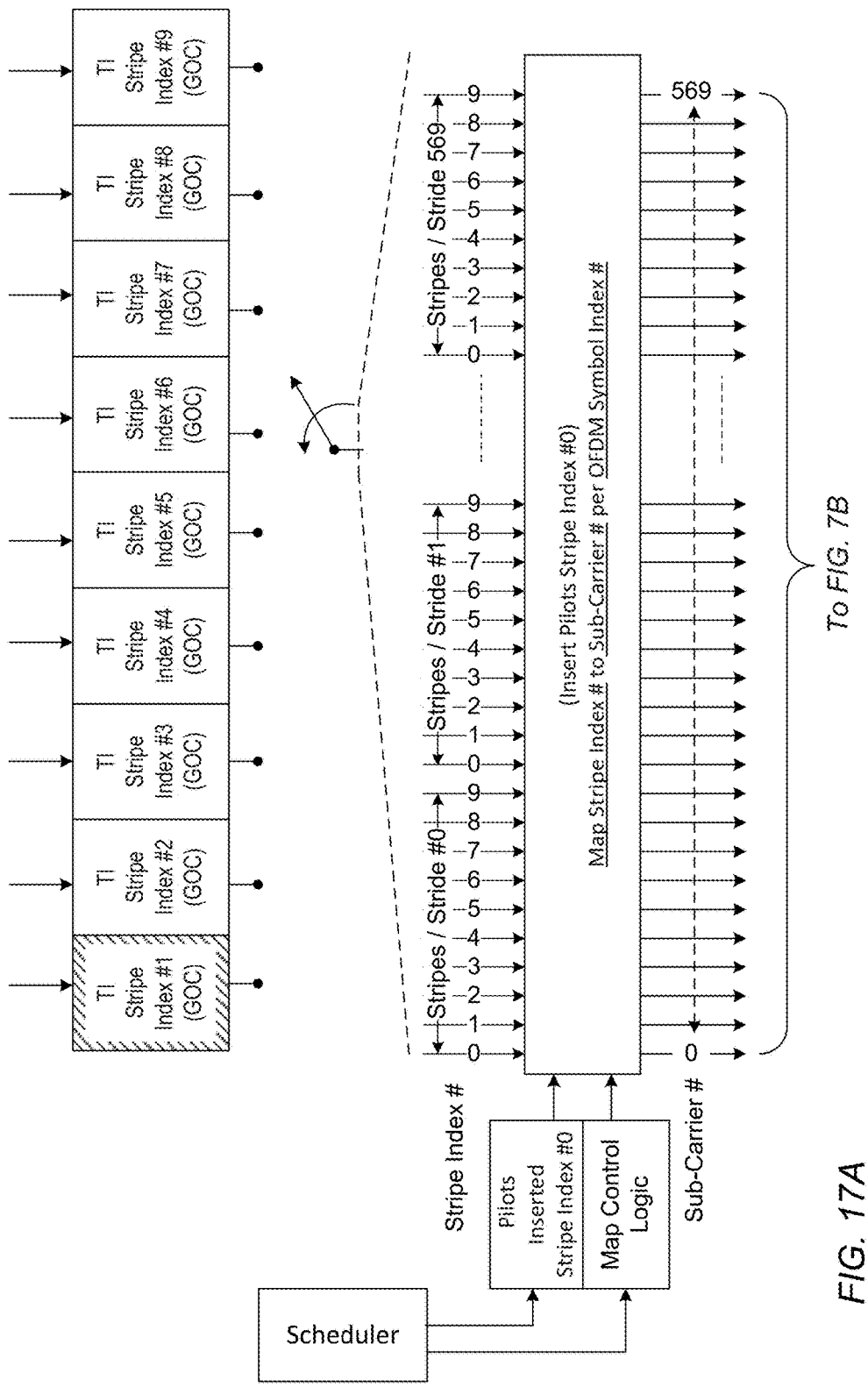
FIGS. 17A and 17B illustrate an example of Stripe Index #1 to Sub-Carrier Mapping.
Figure 17B:
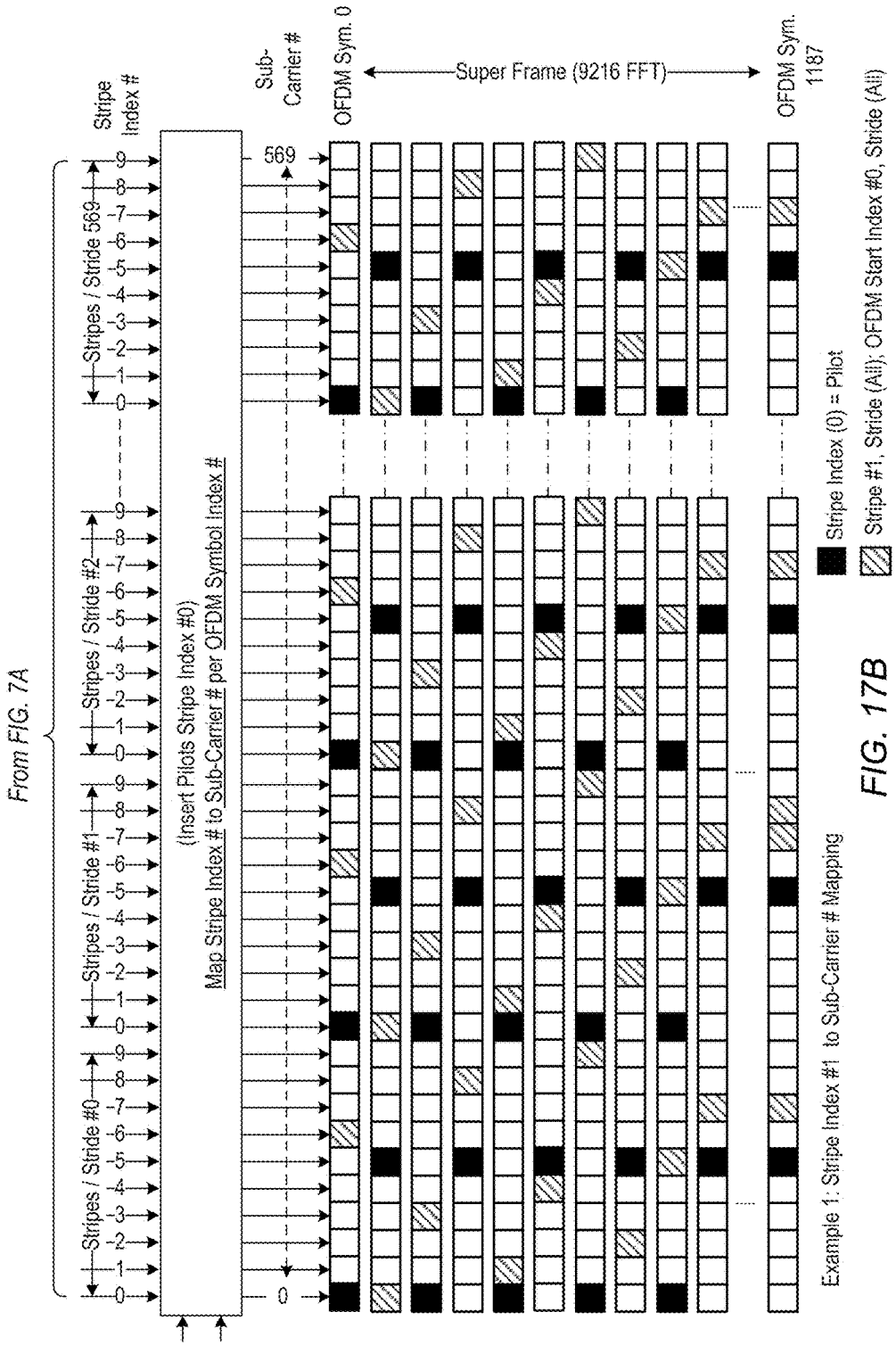

FIGS. 17A and 17B illustrate the same conceptual example for 6 MHz, expanded to show all 5700 sub-carriers and 1187 OFDM symbols for the 990 ms payload of one Super Frame. The design has excellent physical layer frequency diversity and time diversity at the physical layer, and incorporates specific tradeoffs to conform to the attributes that match the needs for a well-designed nomadic waveform.

Figure 18A:
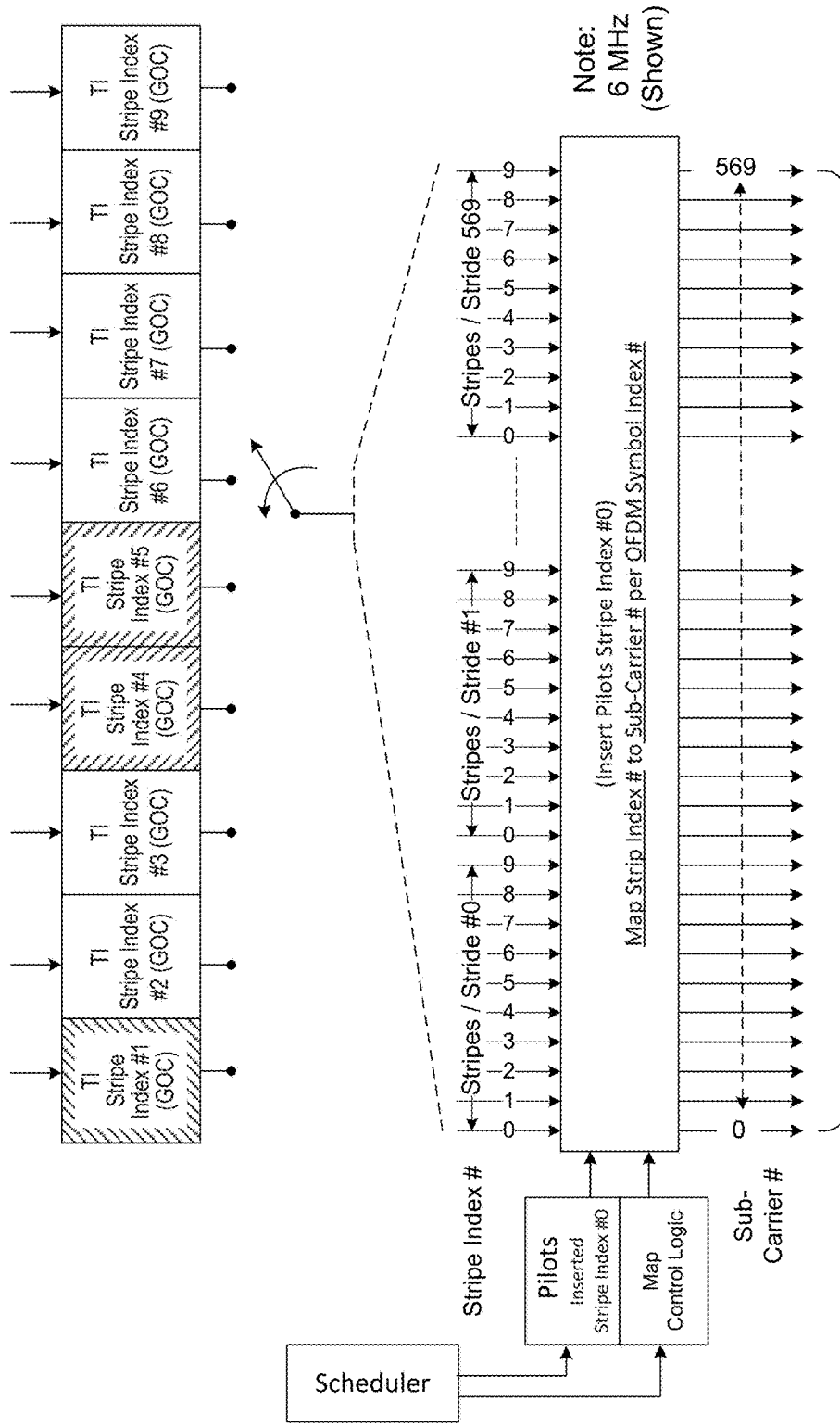
FIGS. 18A and 18B illustrate another mapping method, to scale bandwidth by using Stripe #5 with Strides of (1 of 2) in both frequency and time.
Figure 18B:
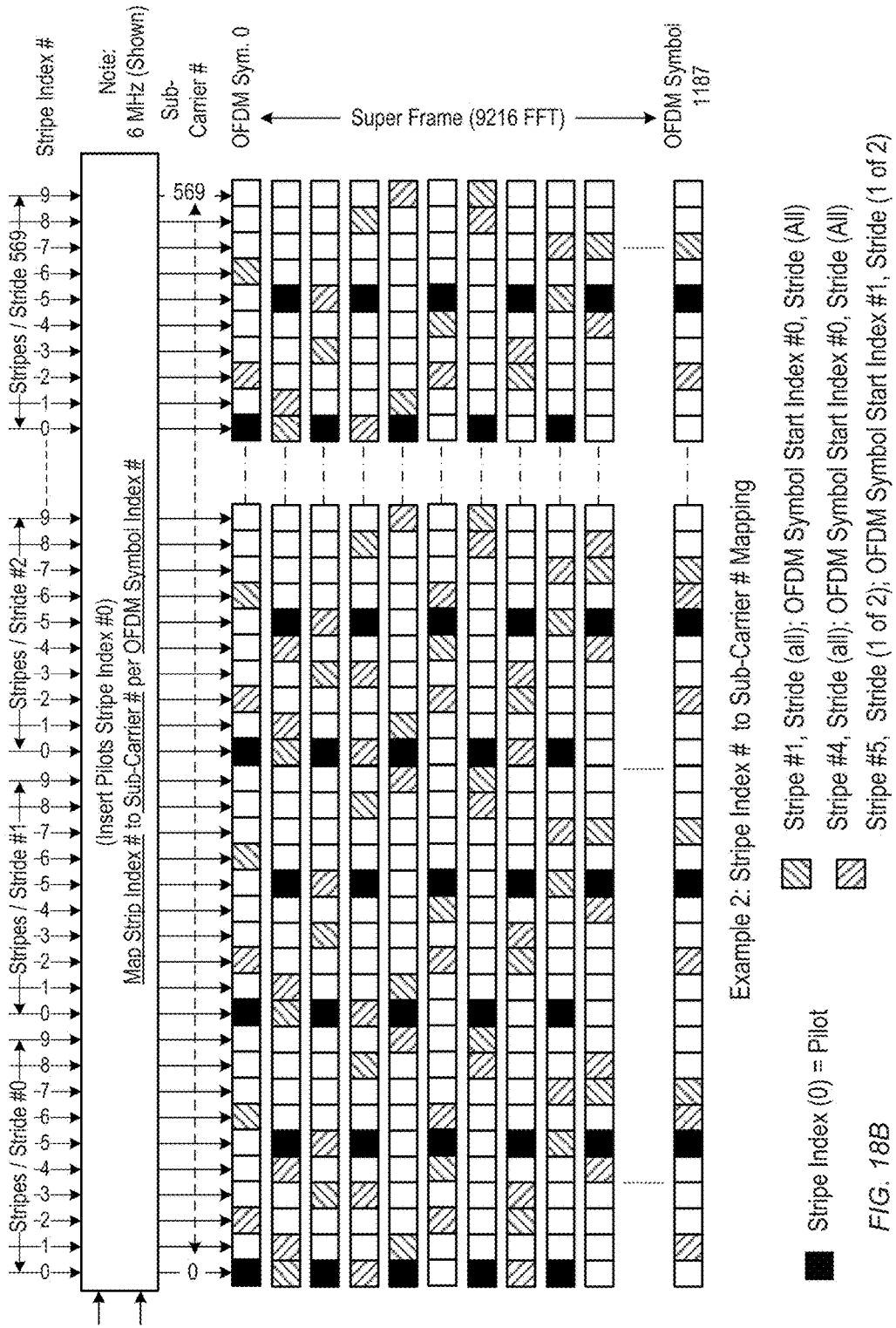

FIGS. 18A and 18B show another mapping method to scale bandwidth by using Stripe #5 with Strides of (1 of 2) in both frequency and time. Many combinations are possible and when used with the adaptive control of protocol layers (RLC/MAC) and physical layer parameterization discussed later brings great flexibility in system operation and efficiencies.

L1 Preamble Symbol and Signaling

The discussion below references the ETSI EN 303 105 V1.1.1, (1012-11) Digital Video Broadcasting (DVB); physical layer specification (DVB-NGH), DVB Document A160; section 8.1.1: P1 Signaling Data; section 11.7: P1 Symbol Insertion.

The text and figures in this section are presented to explain the differences in the design with respect to DVB P1 and the native signaling capacity. Some basic syntax and semantics are defined to enable a walk-through of the proposal. The L1 coding and modulation may be identical to DVB P1, and only the minor adaptations in sampling frequency and bandwidth and architecture will be noted below.

A concatenated (3) L1 preamble symbols is used. This enables fast initial channel scan (first powering up of a UE device or when a user powers up a nomadic UE device after airplane travel). A new universal L1 discovery mechanism is also designed to enable a UE to quickly detect how some portion of the spectrum/bandwidth is provisioned and which defined parameterized OFDM waveform is in use for a type of service and or environment. The (3) concatenated L1 symbols (TU+CP=333.333 μs) result in exactly 1 ms concatenated symbol sequence that begin at start of a Super Frame (SF) 1000 ms. Table 6 below shows the L1 parameters. The sampling frequency (S) is 6.144 MHz [3.84 MHz×(8/5)] and $(T)=1/S=\sim 1.6276041666e\text{-}7$, and results in exactly three L1 symbols in 1 ms.

TABLE 6

L1 Parameters

| (L1) Sampling Frequency (MHz) | ΔF (kHz) | FFT | TU (μs) | L1 (TU) + CP Duration (μs) |
|---|---|---|---|---|
| 6.144 | 6.0 | 1024 | 166.666 | 333.333 |

The parameters in Table 6 are designed to support the smallest bandwidth anticipated in this embodiment of the proposal (5 MHz). The L1 Symbol is termed "Universal" because they provide a universal entry point and discovery process to signal any bandwidth and configuration, including carrier aggregation modes. There are 7 bits of robust L1 signaling data and with (3) concatenated L1 symbols, a total 21 bits of L1 signaling results. For example, these bits could also be used to announce such things as network configuration, FFT and CP used in this SF. There is adequate low level signaling capability (21 bits) to support future extensibility under a parameterized waveform paradigm.

Figure 19:
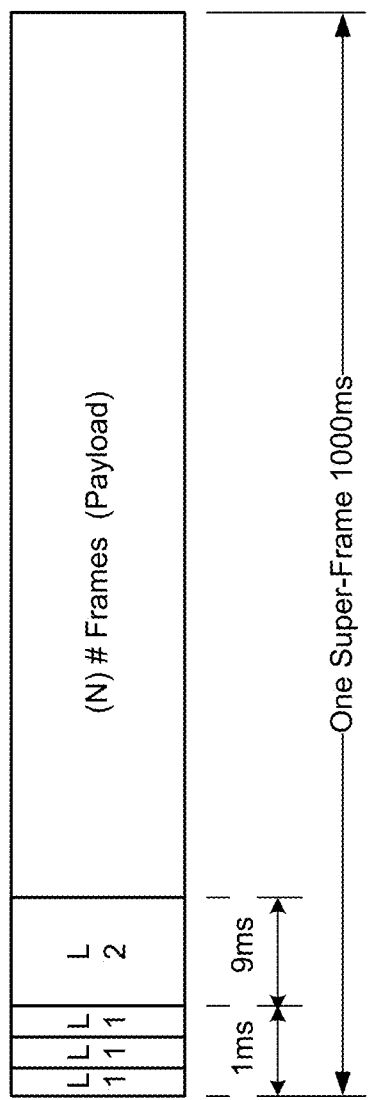
FIG. 19 shows the structure of a superframe, according to one embodiment.

FIG. 19 shows the basic physical layer super frame structure which starts with (3) concatenated L1 sequence (1 ms). This is followed by the L2 signaling symbols (9 ms) which are also part of a super frame 1000 ms. The concatenated L1 symbols will be called L1a, L1b and L1c respectively. Note: L2 symbols carry the signaling data for UE to locate the PLP of interest at the physical layer on each OFDM symbol in super frame the PLP content is mapped. The UE can then selectively (FFT) and demodulate and decode just the PLP content of interest (identified at physical layer) and enable power savings on nomadic device.

Figure 20:
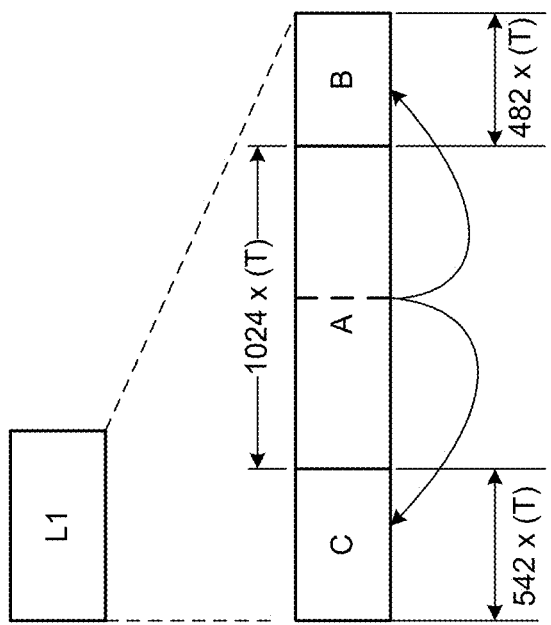
FIG. 20 shows an L1 symbol structure, according to one embodiment.

FIG. 20 shows the L1 symbol structure using the value of (T) sampling period used in this proposal. These are the only changes to DVB P1 format. The duration of one L1 symbol is ~333.33 μs.

Figure 21:
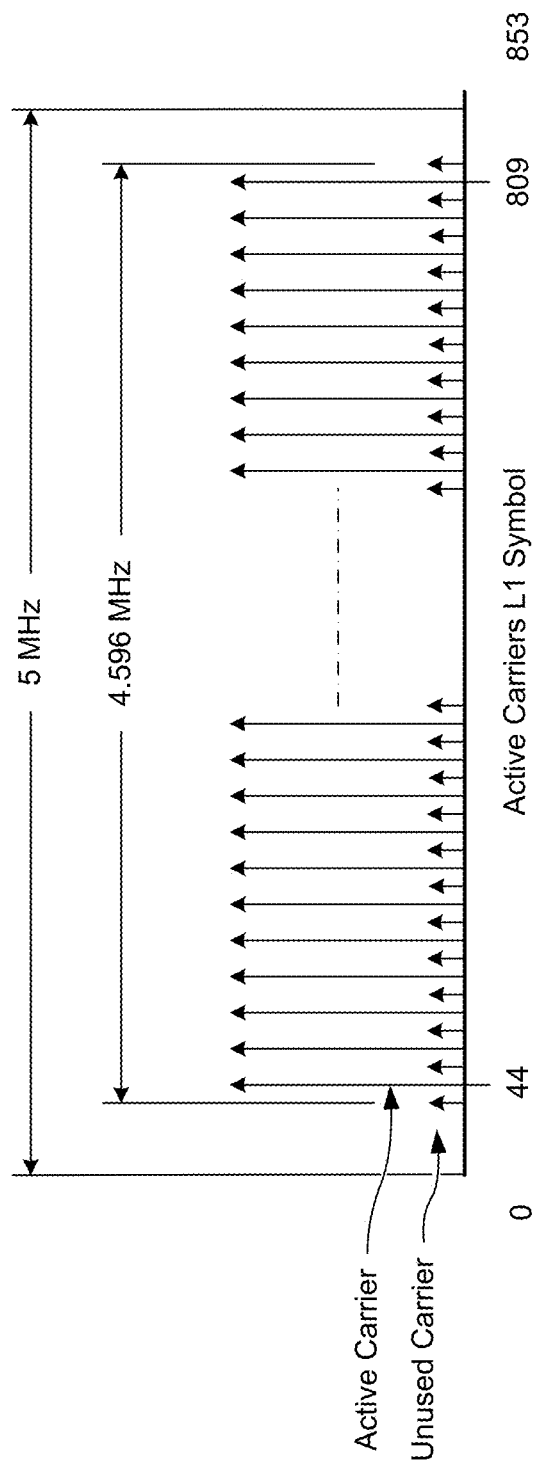
FIG. 21 shows active subcarriers and bandwidth L1 symbol, according to one embodiment.

FIG. 21 shows the resulting power spectrum in the frequency domain, where the first active carrier is at 44 and the last at 809. This is the same spectrum as for DVB P1 except that the bandwidth allocation is increased.

Figure 22:
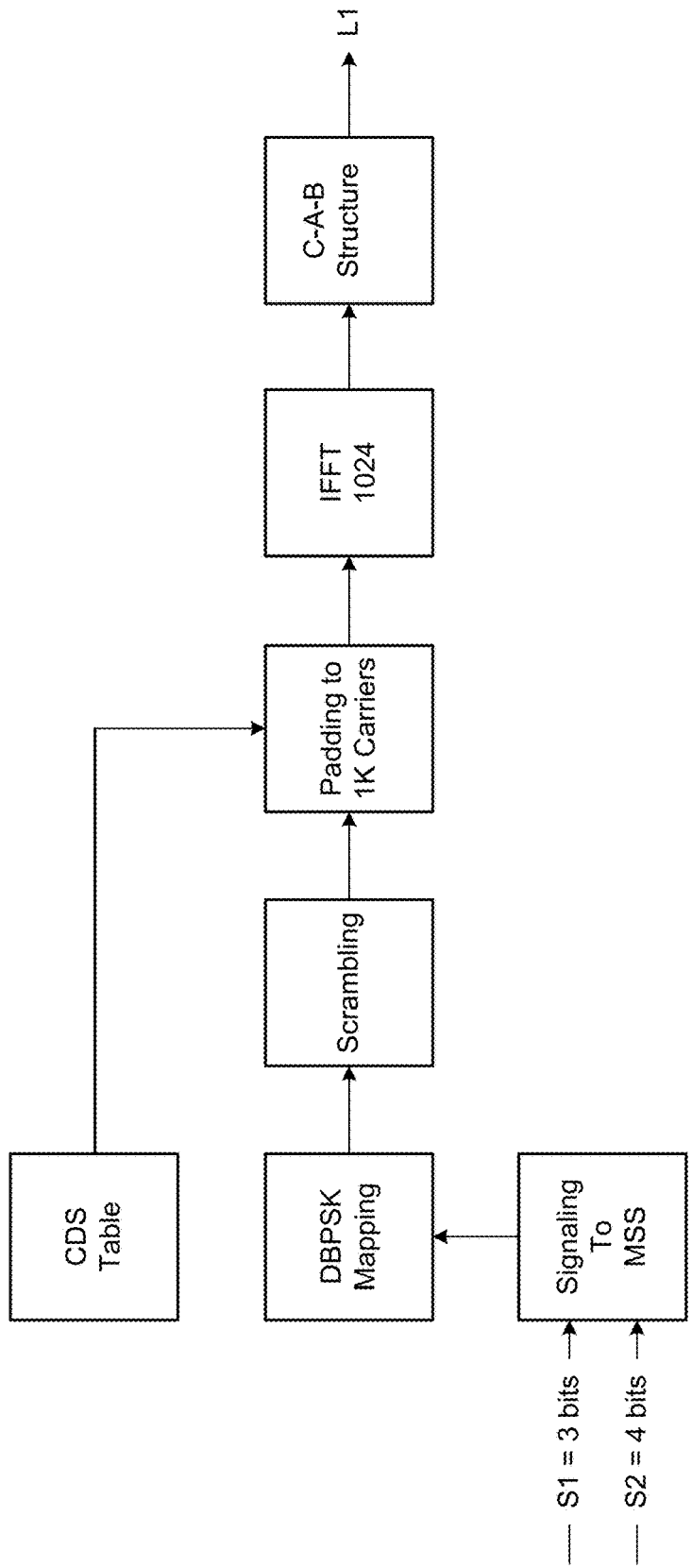
FIG. 22 is block diagram illustrating L1 Symbol Generation, according to one embodiment.

FIG. 22 is a block diagram of L1 symbol generation, shown for reference and is the same as for DVB P1.

There are minor differences between L1a, L1b, L1c, the details of which will be described later, but mainly involve slight differences between L1 Symbols with respect to: (1) Scrambling sequences; (2) Frequency shift of A, B, C structure; and (3) Length of CP parts C, B.

L1 Signaling Syntax and Semantics

We have defined some basic L1 signaling syntax and semantics to enable the goal of a detailed system signal flow walk-through as an introduction to the physical layer proposal. (First Net example assumes NGBP (BMX) management of broadcast spectrum and traffic can be carried on a PLP by PLP basis in Nomadic waveform to general public or as Private (Crypto at Application/RLC layers) as part of public service of Broadcasters to keep public safe in times of emergency. The private SDL (Crypto) can also be managed seamlessly by BMX (Market Driven).) Each L1 Symbol has a total of 7 signaling bits as depicted in FIG. 22. Specifically there is a S1 field=3 bits and S2 field=4 bits in each of the L1 symbols ($L1_a$, $L1_b$, $L1_c$).

TABLE 7

$L1_a$ S1 Field
$L1_c$ S1 Field

| S1 | Semantics | Description |
|---|---|---|
| 000 | Nomadic Waveform | The parameterized waveform this proposal |
| 001 | Fixed Waveform | Future Fixed parameterized waveform |
| 010 | Fixed Waveform VHF | Future Fixed parameterized waveform VHF band |
| 011 | Mobile Waveform | Future Mobile (Vehicle, Bus, Train) parameterized waveform |
| 100 | First Net Nomadic Waveform | Future private dedicated to public safety in times of emergency |
| 101 | Reserved | |
| 110 | Reserved | |
| 111 | Reserved | |

TABLE 8

$L1_a$ S2 Field
$L1_c$ S2 Field

| S2 | Semantics | Description |
|---|---|---|
| 0000 | 5 MHz bandwidth | Super Frame is 5 MHz Bandwidth |
| 0001 | 6 MHz bandwidth | Super Frame is 6 MHz Bandwidth |
| 0010 | 10 MHz bandwidth | Super Frame is 10 MHz Bandwidth |
| 0011 | 12 MHz bandwidth | Super Frame is 12 MHz Bandwidth |
| 0100 | Reserved | |
| 0101 | Reserved | |
| 0110 | Reserved | |
| 0111 | 5 MHz bandwidth (CA) | 5 MHz Bandwidth w/ Carrier Aggregation scheme active |
| 1000 | 5 MHz bandwidth (CA) | 5 MHz Private First Net Supplemental Download (SDL) Unpaired w/ LTE |
| 1001 | 6 MHz bandwidth (CA) | 6 MHz Bandwidth w/ Carrier Aggregation scheme active |

TABLE 8-continued

L1$_a$ S2 Field
L1$_a$ S2 Field

| S2 | Semantics | Description |
|---|---|---|
| 1010 | 10 MHz bandwidth (CA) | 10 MHz Bandwidth w/ Carrier Aggregation scheme active |
| 1011 | 12 MHz bandwidth (CA) | 12 MHz Bandwidth w/ Carrier Aggregation scheme active |
| 1100 | Reserved | |
| 1101 | Reserved | |
| 1110 | Reserved | |
| 1111 | Reserved | |

TABLE 9

L1$_b$ S1 Field
L1$_b$ S1 Field

| S1 | Semantics | Description |
|---|---|---|
| 000 | 6144 FFT | Nomadic Waveform |
| 001 | 9216 FFT | Nomadic Waveform |
| 010 | 12288 FFT | Nomadic Waveform |
| 011 | 18432 FFT | Nomadic Waveform |
| 100 | Reserved | |
| 101 | Reserved | |
| 110 | Reserved | |
| 111 | Reserved | |

TABLE 10

L1$_b$ S1 Field
L1$_b$ S2 Field

| S2 | Semantics | Description |
|---|---|---|
| 0000 | Reserved | |
| 0001 | Reserved | |
| 0010 | Reserved | |
| 0011 | Reserved | |
| 0100 | Reserved | |
| 0101 | Reserved | |
| 0110 | Reserved | |
| 0111 | Reserved | |
| 1000 | Reserved | |
| 1001 | Reserved | |
| 1010 | Reserved | |
| 1011 | Reserved | |
| 1100 | Reserved | |
| 1101 | Reserved | |
| 1110 | Reserved | |
| 1111 | Reserved | |

TABLE 11

L1$_c$ S1 Field
L1$_c$ S1 Field

| S1 | Semantics | Description |
|---|---|---|
| 000 | Reserved | |
| 001 | Reserved | |
| 010 | Reserved | |
| 011 | Reserved | |
| 100 | Reserved | |
| 101 | Reserved | |
| 110 | Reserved | |
| 111 | Another L1 to Follow | Mechanism to signal additional L1 symbols in the Future |

TABLE 12

L1$_c$ S2 Field
L1$_c$ S2 Field

| S2 | Semantics | Description |
|---|---|---|
| 0000 | Reserved | |
| 0001 | Reserved | |
| 0010 | Reserved | |
| 0011 | Reserved | |
| 0100 | Reserved | |
| 0101 | Reserved | |
| 0110 | Reserved | |
| 0111 | Reserved | |
| 1000 | Reserved | |
| 1001 | Reserved | |
| 1010 | Reserved | |
| 1011 | Reserved | |
| 1100 | Reserved | |
| 1101 | Reserved | |
| 1110 | Reserved | |
| 1111 | Reserved | |

L2 Signaling Parameters Nomadic Waveform

Table 13 (i.e., FIG. 22B) shows the Super Frame (SF) payload OFDM parameters for nomadic waveform.

Figure 23:
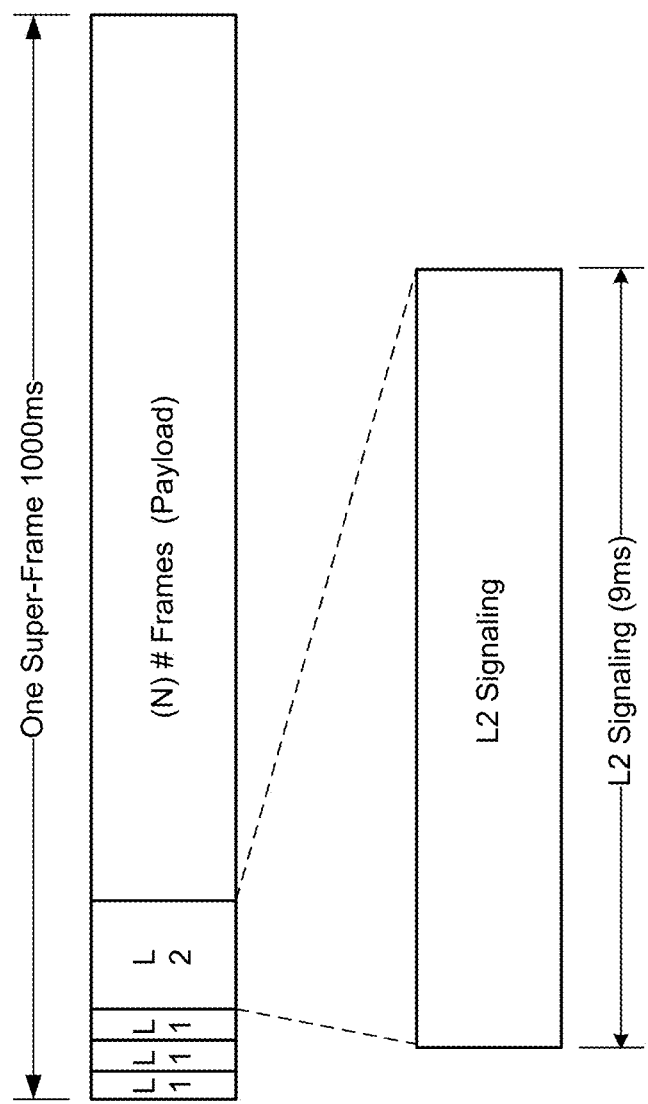
FIG. 23 illustrates the structure of a Super Frame with L2 Signal, according to one embodiment.
Figure 24:
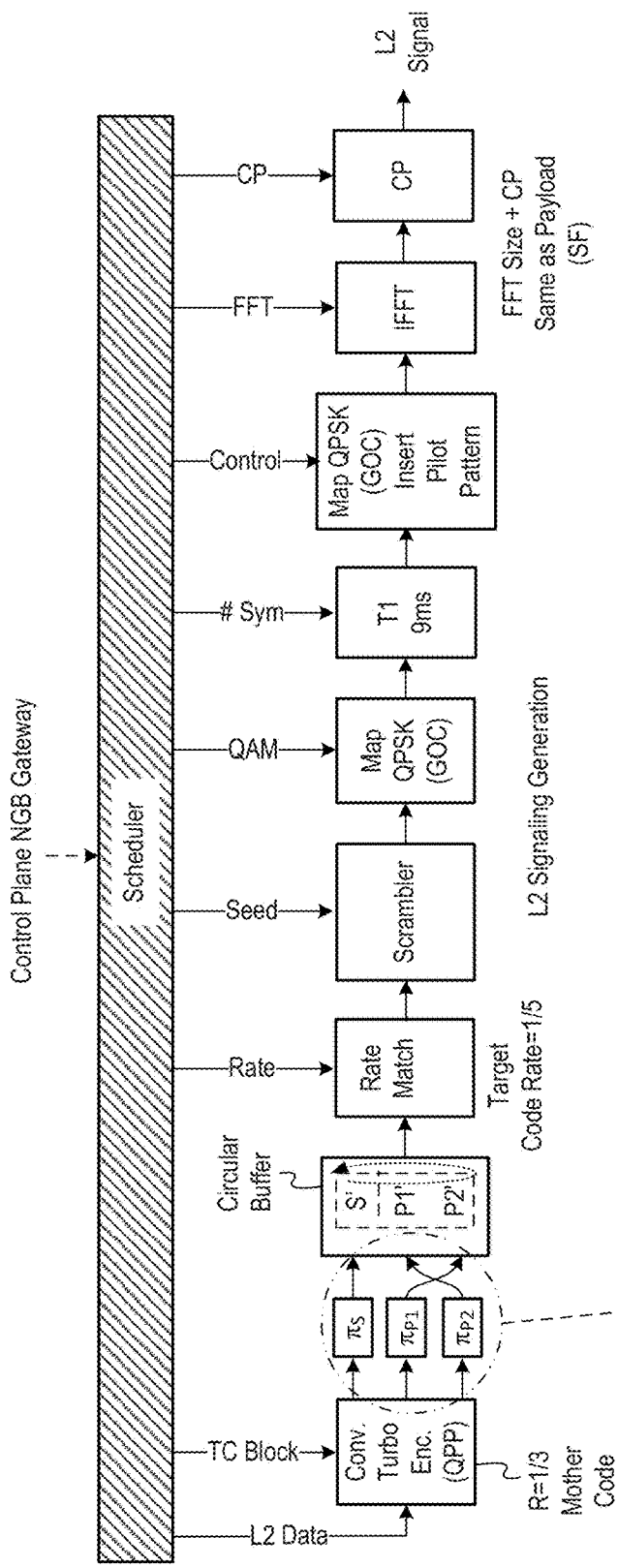
FIG. 24 illustrates L2 Symbol Signal Generation, according to one embodiment.

FIG. 23 shows the super frame (SF) temporal structure again, for reference. The L2 region is exactly (9 ms) in duration and is constructed with the OFDM parameters of Table 14 (FIG. 23B), using the L2 symbol generation diagram shown in FIG. 24. Given, the parameters chosen for the 6 MHz example of CP=112 μs, 12288 FFT, etc. and shown in BOLD in Table 4, Table 14 (FIG. 23B) indicates there are exactly (8) L2 symbols composing the L2 section of SF.

Table 14 (FIG. 23B) shows the L2 Signaling OFDM parameters for the (9 ms) L2 section of (SF). Note that Table 14 reflects the OFDM parameters for nomadic waveforms. In Table 13 the 6144 FFT, 12288 FFT does not exactly result in an integer # of symbols over total SF payload (990 ms). This is compensated for in Table 14 with the 1st L2 Symbol CP value=(N+4)

In Table 15, the L2 signaling data is TC=1/5, QPSK and time interleave over 9 ms block for robustness. (Table 15 estimate shows a conservative 20% overhead for reference pilots in L2 symbols.)

Table 15 indicates the L2 OFDM parameterization used. The (8) L2 symbols use a 1/5 code rate as shown on output of Turbo Code RM block in FIG. 21. This is then assigned QPSK and time interleaved over the (9 ms) by the TI block shown to increase robustness.

TABLE 16

Example L2 Signaling to Support Simple Signal Walk-Through

| Signaling | Bits | Explanation |
|---|---|---|
| UTC Time/Date | 64 | UTC Time Start Super Frame/Date/Etc. |
| FFT | 4 | 4 bit field indicates FFT Size All Payload Symbols |
| Pilot Pattern | 4 | 4 bit field indicates pilot pattern |
| # PLP per (SF) | 10 | Total number PLPs in Super-Frame (Function of Bandwidth) |
| (PLP Loop) | | |
| PLP # | 8 | PLP ID |
| TC Block Size | 10 | Turbo Code Block Size value from table |
| Code Rate (RM) | 10 | Adaptive Code Rate value from table |
| QAM | 3 | QAM value from table (QPSK, 16 QAM, 64 QAM, 256 QAM) |

TABLE 16-continued

Example L2 Signaling to Support Simple Signal Walk-Through

| Signaling | Bits | Explanation |
| --- | --- | --- |
| PDCP Cipher | 1 | PDCP Layer Cipher active |
| RLC Segment | 12 | RLC Layer Adaptive Segmentation Size (Bytes) |
| Transport Block | 12 | MAC Layer Adaptive Transport Block Size (Bytes) |
| Seed | 6 | Scrambler |
| GOC Index # | 6 | Group of Constellations ID |
| (PLP N) Stripe Index # | 6 | # 1-9 (5,6 MHz), # 2-20 (10,12 MHz) |
| Stripe Stride | 6 | All, (1 of 2), (1 of 4), (1 of 8), etc. |
| OFDM Symbol Start Index # | 6 | OFDM Symbol (Stripe #N) appears from first OFDM Symbol Index #0 |
| OFDM Symbol Stride | 6 | All, (1 of 2), (1 of 4), (1 of 8), etc. |
| Map Control | 4 | Algorithm table to map (Stripe Index# -> Sub-Carrier # per OFDM Symbol Index#) |
| Reserved | 18062 | |

The exemplary L2 syntax in Table 16 that enables a walk-through to the air interface for a given PLP (N). Also, the UTC Time/Date (64) bit field can be used by UE lacking a receiver for GPS signals, see section below on serving UTC Time to Client. Also, the 4 bit FFT field indicates FFT Size for All Payload Symbols. The 4 bit pilot pattern field selects the pilot parameterization algorithm. The other remaining adaptive parameters are listed. (See the outputs provided by the Scheduler in FIGS. 7B and 7C.) These L2 parameters can change on a 1000 ms super frame boundary by NGB (GW) in the IP core.

Serving UTC Time to Client

Figure 25:
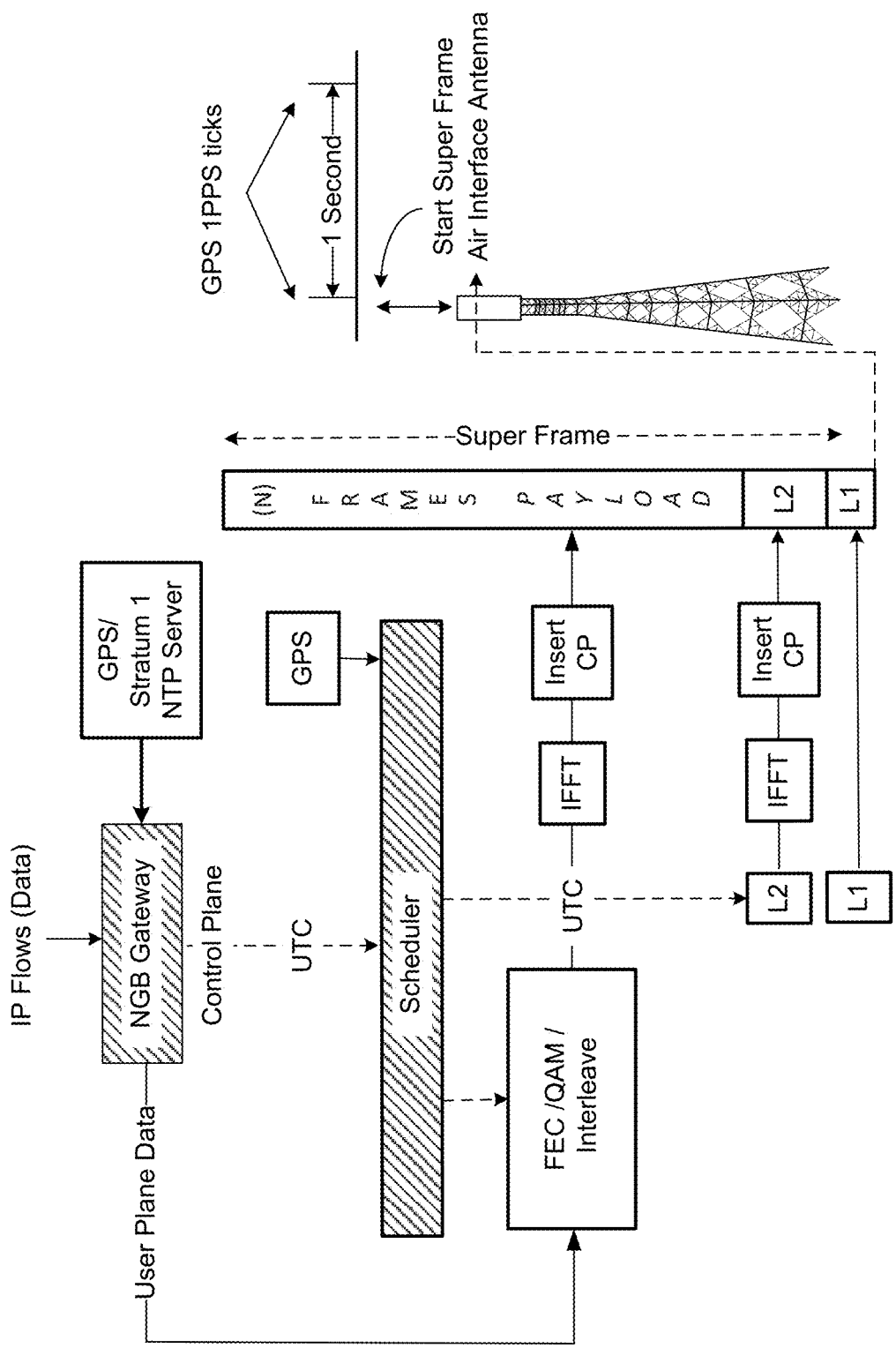
FIG. 25 illustrates the concept of Serving UTC from the Network Side, according to one embodiment.

In FIG. 25, MPEG-H Part 1 MMT (application transport) uses a UTC clock to generate the MMT transport timing and this requires a UTC clock at Client. The MMT specification is silent on how to achieve this. The Internet is one obvious way. However, in a Broadcast system there is no assumed Internet connectivity. The method solves this by serving UTC time to broadcast client using only broadcast channel.

The NGB Gateway/Scheduler begin each Super Frame in alignment with the rising edge of a GPS 1PPS tick at the Air Interface of Transmitter Antenna. (PPS is an acronym for pulse per second.) The NGB Gateway then sends valid UTC time stamp to Scheduler, to be inserted into L2 signaling of each Super Frame. Then Super Frame (N) is emitted from antenna on the GPS 1PPS Tick with UTC Timestamp in L2.

Figure 26:
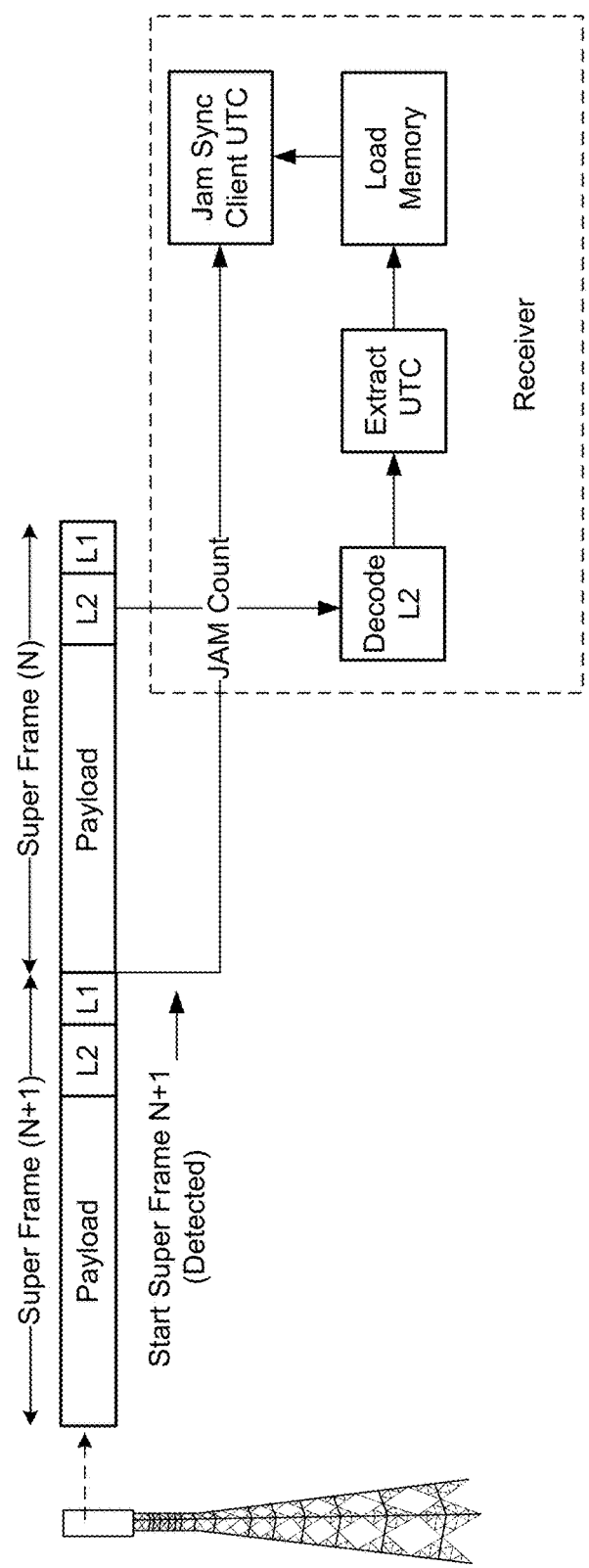
FIG. 26 illustrates receiving UTC time at the UE, according to one embodiment. (UTC is an acronym for Coordinated Universal Time, or Temps Universel Coordonné in French.)

The signal is then in free space flight to Receiver (c=speed of light). The receiver recovers and decodes L2 from Super Frame (N), e.g., as shown in FIG. 26. The UTC time stamp is extracted (incremented+1 second) loaded into receiver memory. The receiver then waits for super frame (N+1). The instant start of super frame (N+1) is detected the Client UTC Clock registers are Jam loaded from memory with UTC from super frame (N) and client clock is now in sync with UTC.

This method should be more accurate than can be achieved from a NTP time server on Internet, and is available anywhere in broadcast service area. There will be no flashing clock (VHS) time on this Nomadic data recorder.

Since, the LI/L2 symbols at start of every super frame (SF) include all the signaling a (UE) needs to identify (bind with some channel guide metadata delivered over IP/assumed not discussed) the Stripe/s of (PLP/s) and their sub-carrier mappings (exact locations) in the time/frequency resource grid of a (SF) payload can be located at physical layer and battery energy savings on a nomadic (UE) is possible.

Figure 27:
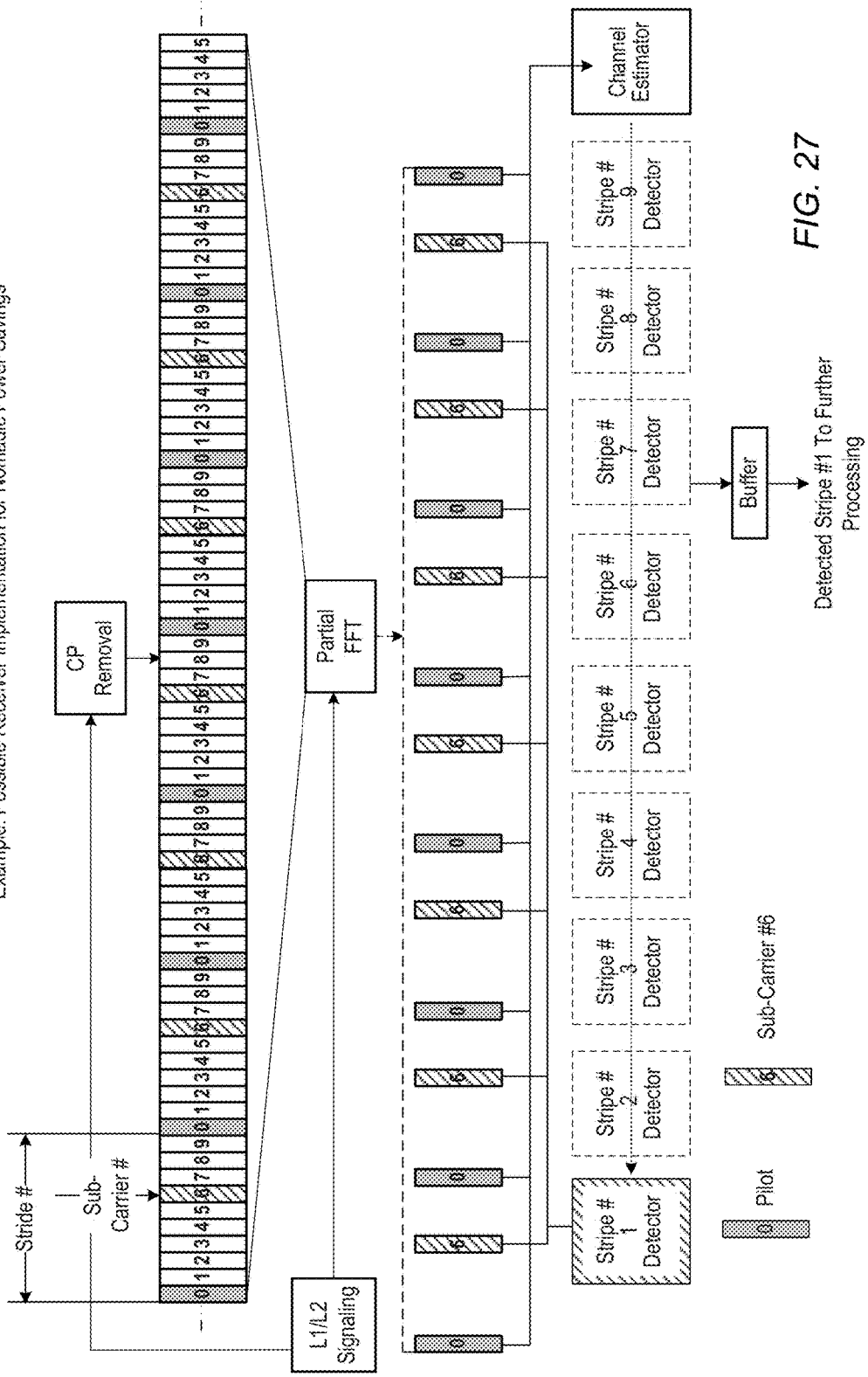
FIG. 27 gives an example of UE Detecting Stripe #1 (PLP) of one OFDM symbol in Super Frame payload, according to one embodiment.

FIG. 27 shows the concept similar to that used in LTE (OFDMA) were a UE selects only the resource elements (sub-carriers) of the resources block/s (time/frequency grid) assigned dynamically by eNodeB to each attached (UE) sharing the physical layer (spectrum resources) in a cell.

The Stripe #0 (overhead) was signaled as pilot pattern # (N) and this is used for channel estimation. In the example Stripe #1 has the PLP of interest and can be demodulated while ignoring all other (non-pilot) sub-carriers by using a partial FFT. Then only energy must be expended to process (decode) and pass up the stack the RLC segments associated with the PLP of interest. (By using a Start Symbol Index # and a large Stride (example 1 of 16) scaling in capacity bps and battery savings can be achieved while still benefiting from time diversity, this is but one attribute of the highly structure framework in this proposal.)

Figure 28:
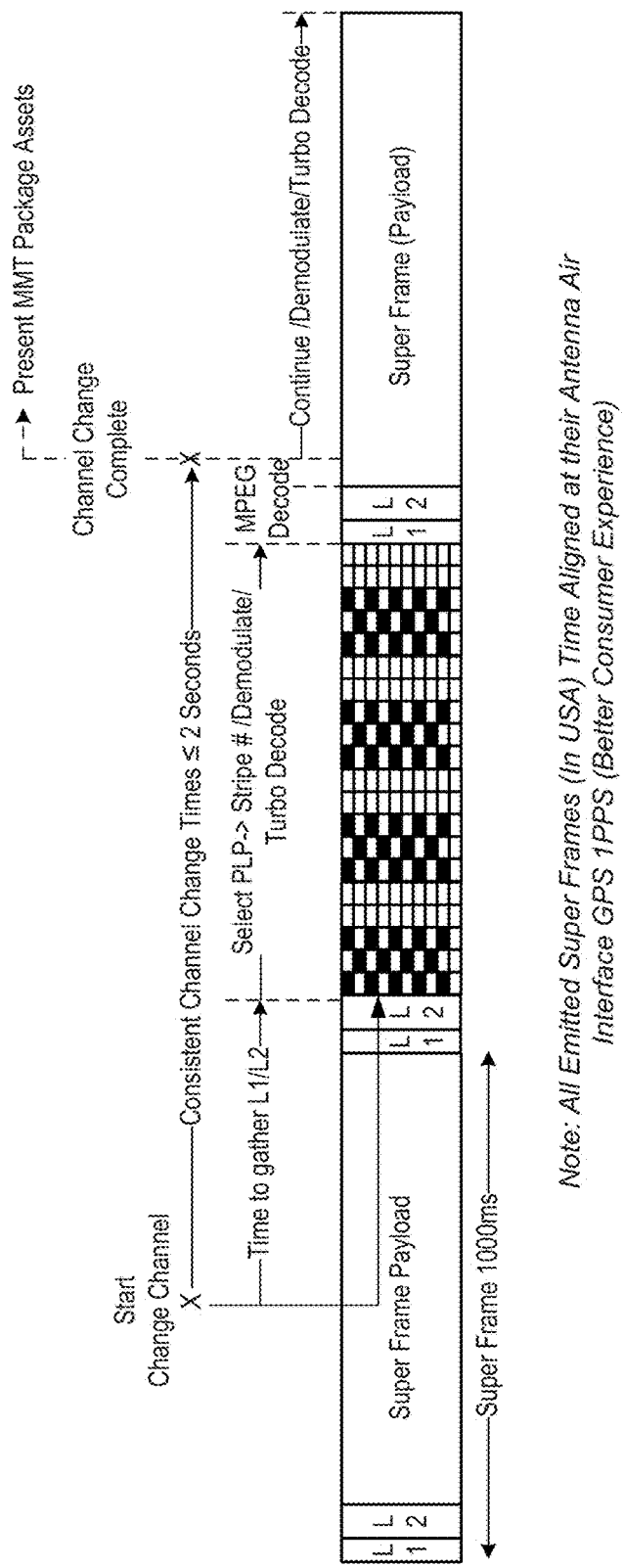
FIG. 28 illustrates UE expected channel change behavior, according to one embodiment.

FIG. 28 illustrates the expected channel change time behavior in a NGBP. The requirement of having all transmitting stations emitting the start of a Super Frame (SF) in alignment with a GPS 1PPS is recommended as 'network aware' practice and has several benefits.

(1) Achieves simplified and flexible SFN architecture.
(2) Serves time by having UTC time inserted in every L2 (supports application layer timing of MMT).
(3) SF boundaries aligned all transmitting station make channel change more deterministic in NGBP.

FIG. 28 illustrates a receiver (UE) has decided to select another channel on same or different carrier in the NGBP. The absolute worst case would seem to be to enter a new channel just after L1/L2, but shown is an average entry point somewhere in the middle of (SF). The UE must then wait for the next L1/L2, in this case ~500 ms. The L1/L2 is acquired and the PLP (Stripe #) is located in time/frequency grid of (SF) payload and demodulated and then turbo decoded at end of (SF). Next, some delay to MPEG decoding PLP content (this example MMT package) and then display. This channel change behavior is bounded between ~(1-2) seconds (best/worst case) without sacrificing time/frequency diversity and resulting in a good consumer experience.

Adaptive Parameterization

The present proposal uses adaptive parameterization to ensure efficiency, QOS and the market driven use of OFDM physical layer resources. A hypothetical NGBP broadcast IP Core (Market/Region) could, for example, have several VHF/UHF NGB Gateways managing physical layer resources. (The fact is the NGBP is the most cost efficient way (sharing both active and passive network components) to create a new broadcast eco-system for the future. By continuing to use the old 1960's broadcast (island) design even the best new broadcast physical layer technology will fall short. The winner has already been declared it is the internet and Broadcasters should consider embracing a new network aware NGBP.)

Figure 29:
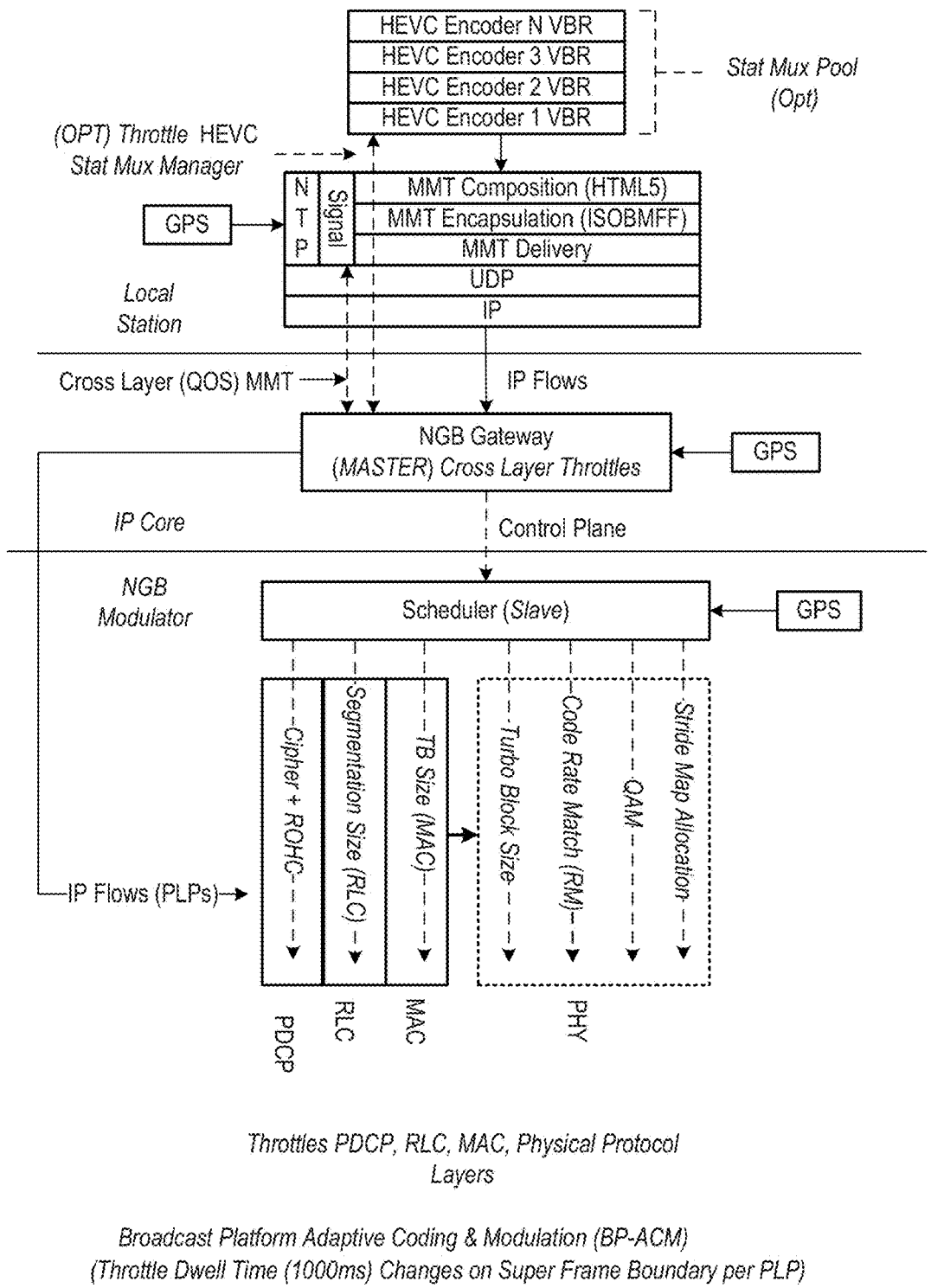
FIG. 29 illustrates Adaptive Parameterization at Various Layers, according to one embodiment.

FIG. 29 shows the adaptive controls or "throttles" of potential bit rate that the NGB GW has available for each one second interval for each super frame. The NGB GW has control plane interfaces at both the lower physical and optionally the upper application layer (MPEG-H Part 2 HEVC) for efficiency.

The possible adaptive controls (throttles) from scheduler in FIG. 29 are listed below.

1. RLC Layer—Segmentation Size.
2. MAC Layer—Transport Block (TB) size.
3. Extended 3GPP Turbo Encoder—Turbo Coder Block size (QPP).
4. 3GPP Turbo encoder 1/3 Mother Code—Rate Matching (RM).

5. QAM—QAM mode;
6. (SF) Payload mapper—# of Stripes per (PLP) and Strides in both frequency/time domain;
7. Application Layer—optional control HEVC Stat Mux manager (FIG. 29).

Given the benefit of a highly structure waveform (details in Table 4), the NGB GW already knows on the input interface what users are requesting physical layer resources for the next second, including the QOS (QAM/Code rate requests) for each PLP. The NGB gateway has bandwidth provisioned and controlled and this directly equates into an integer number of useful OFDM sub-carriers (SC) in the time/frequency grid of (SF) payload for the next one second. The algorithm (GW) then (given throttles at its disposal) proceeds to design the (SF) and instructs (via control plane) each NGB modulator to build. Each (SC) can support a given QAM constellation. The Turbo code RM throttle and Turbo Block Size throttles work synergistically with the chosen segment size (RLC) and transport block size (MAC) to ensure input (PLP) packet is encapsulated efficiently (no stuffing) and map to an integer number of OFDM symbols in (SF). These can be very dynamic parameter adjustments each one second interval.

Figure 30:
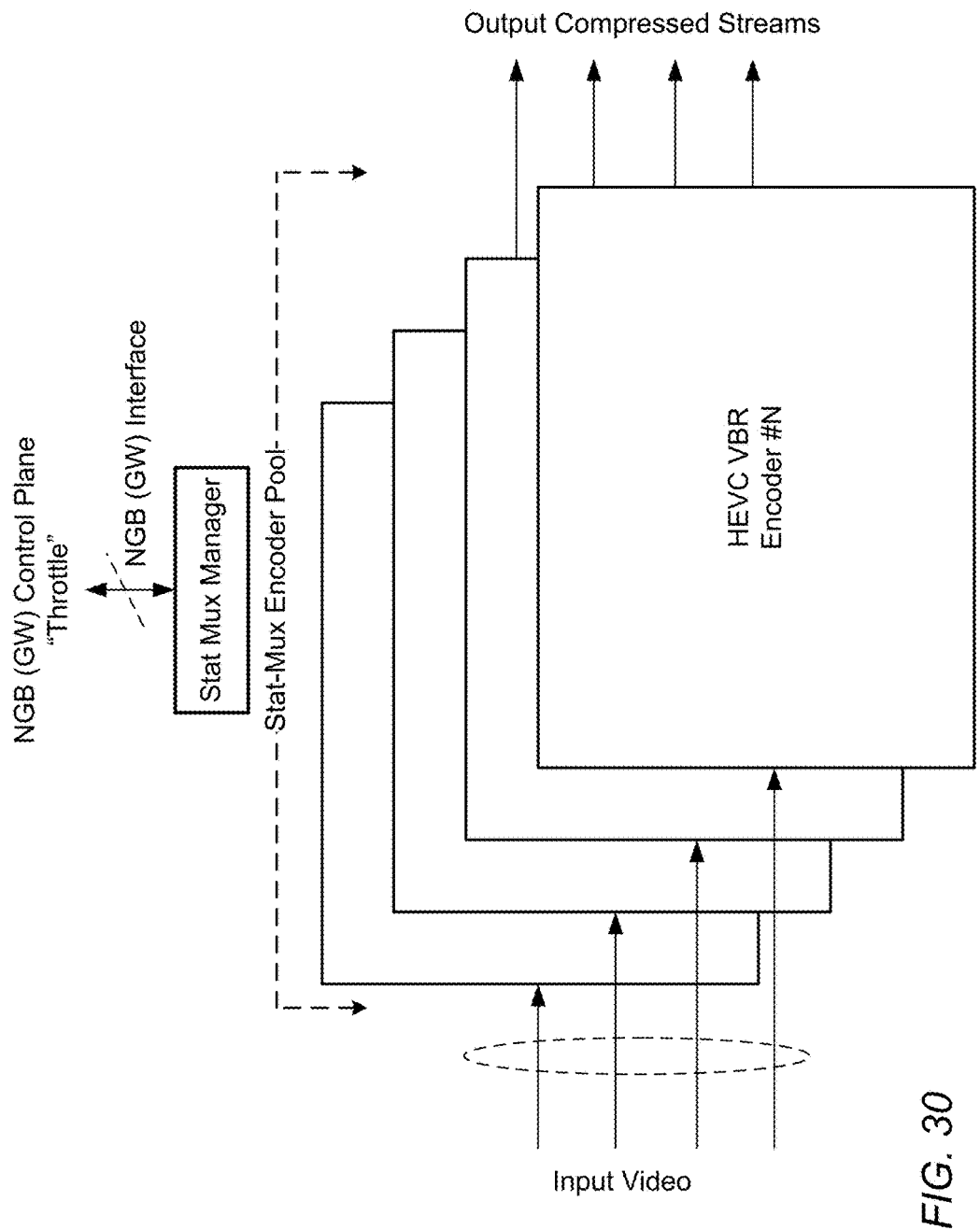
FIG. 30 illustrates HEVC Variable Bit Rate (Stat Mux) with NGB Gateway Throttling, according to one embodiment.
Figure 30B:
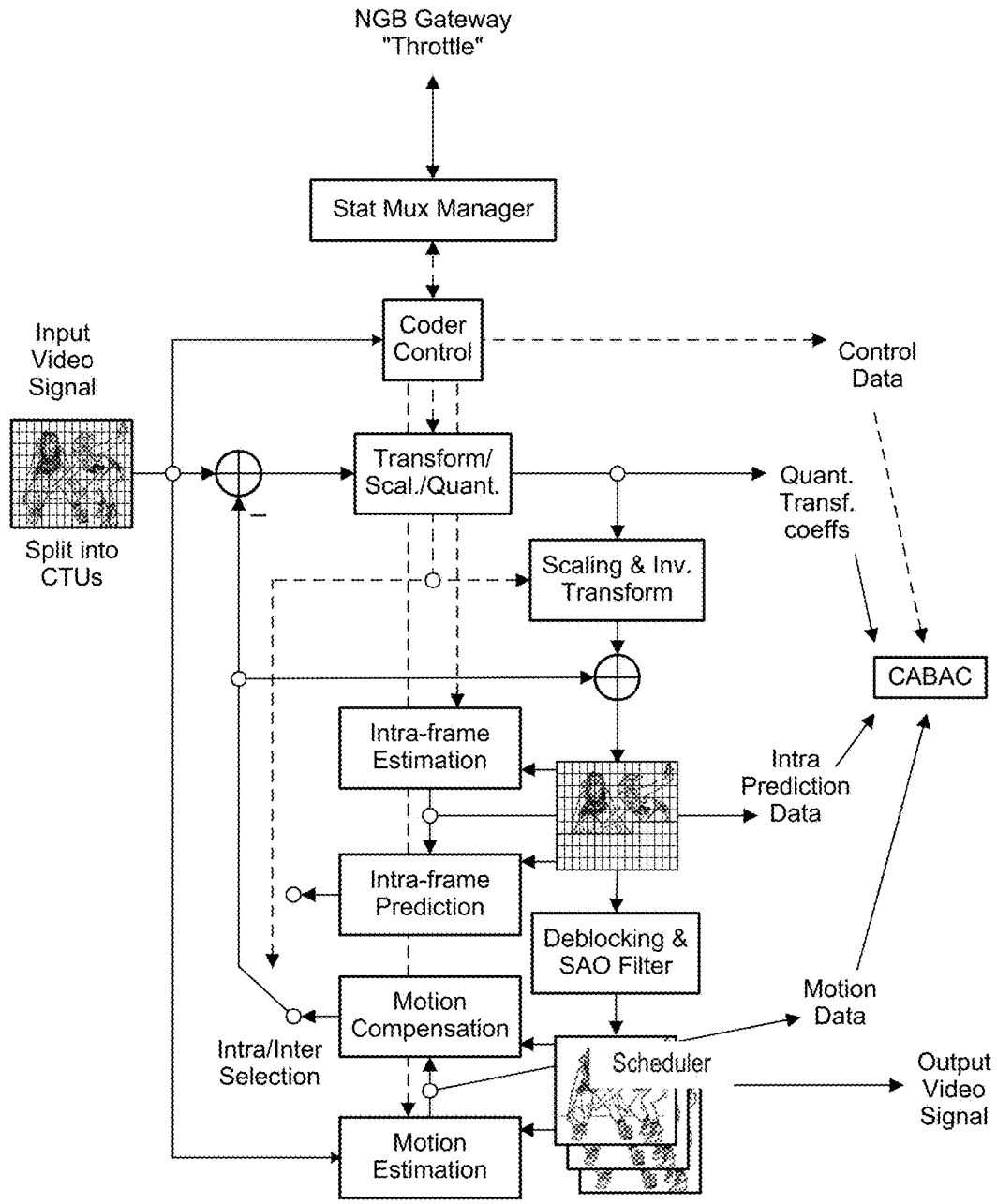
FIG. 30B illustrates an example of one of the HEVC Variable Bit Rate encoders of FIG. 30.

Additional control of video stream bit rates is possible using HEVC Variable Bit Rate (VBR) encoders and a statistical multiplexer. FIG. 30 shows one HEVC VBR encoder is used for each video stream to compress it, and then the statistical multiplexing combines the streams. FIG. 30B is an example of one of the HEVC Variable Bit Rate encoders of FIG. 30. Optional control at application layer and holistic system optimization should reap the most efficiency.

Exemplary Use Cases with Synergy of NGBP

This section presents concepts of several use cases of a network aware NGBP:
1. Bringing reception indoors while saving $$ (link budget) NGBP (Capex/Opex).
2. Increase QOS for non-real time File Transfer services by using new ARQ mechanism.
3. Increasing capacity (bps) and functionality by Carrier Aggregation (CA).
4. Serving the Public by supporting/augmenting the FirstNet LTE network service types.
5. Carrier Aggregation for Mobile Off-load.

1. Bringing Reception Indoors while Saving $$ (Link Budget) NGBP (Capex/Opex)

Figure 31A:
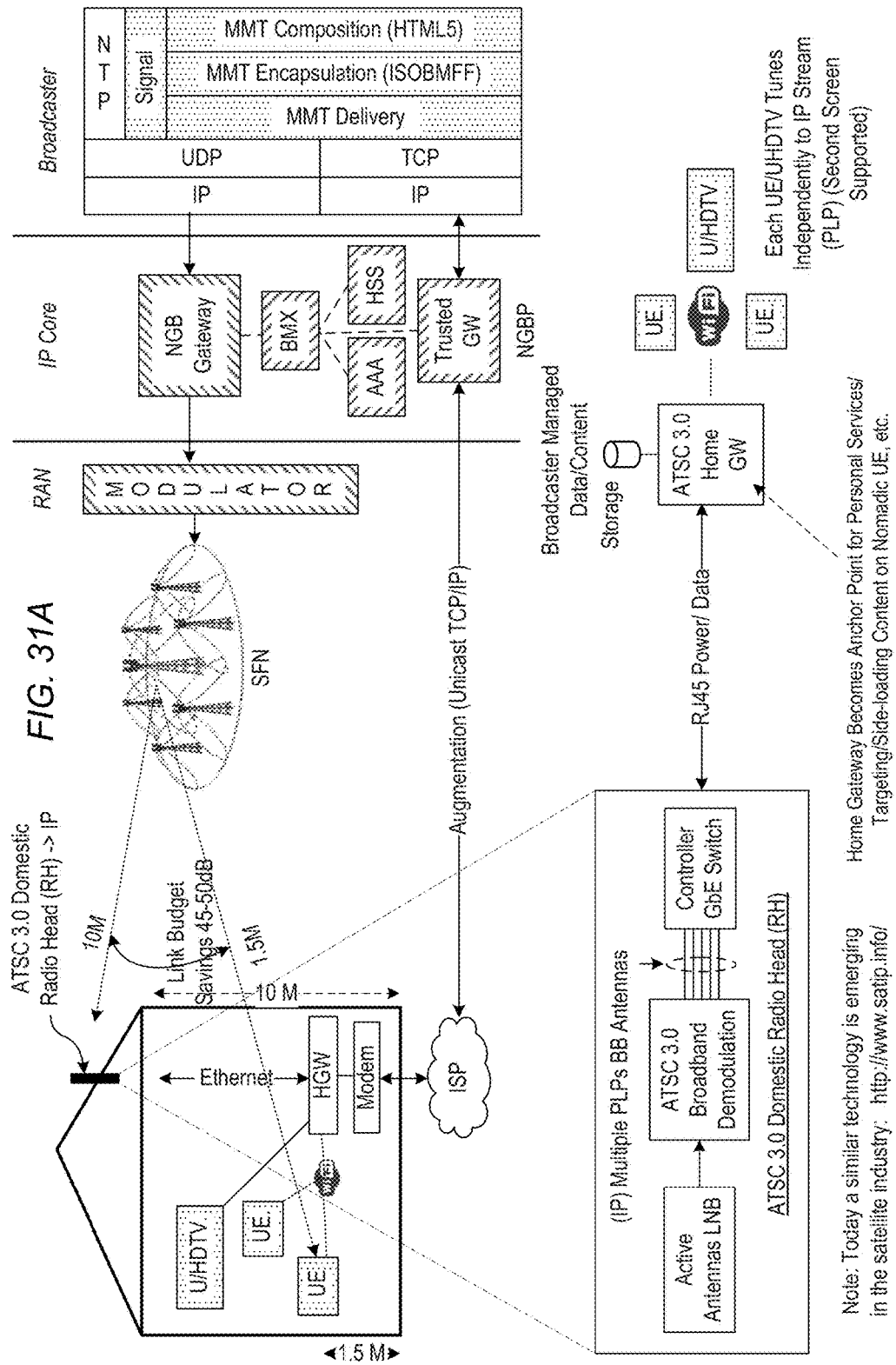
FIG. 31A illustrates one embodiment of a Domestic Radio Head and NGB Home Gateway, according to one embodiment.
Figure 31B:
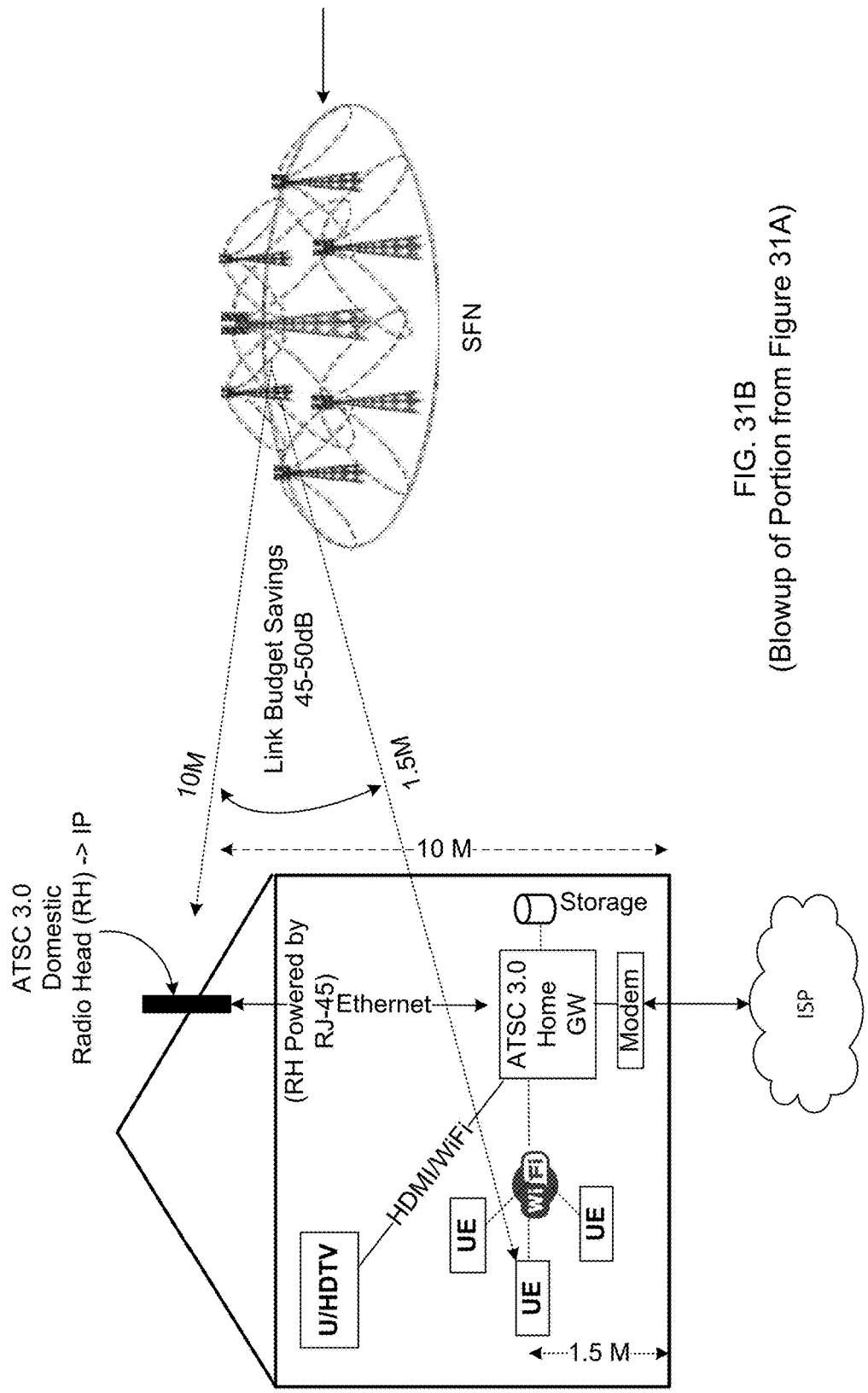
FIG. 31B illustrates a blowup of a selected portion from FIG. 31A.

The general public spends a lot of time indoors at home. FIGS. 31A and 31B shows a concept to save 45-50 dB on the link budget and establish a Broadcaster controlled anchor point in the home to offer personalized services/targeting/side loading content, in other words, the things broadcasters need to start doing to remain relevant in the internet age. To the left is depicted a home with a domestic Radio Head (RH) that has broadband active antennas and a LNB, etc. shown. (LNB is an acronym for low noise block.) The RH selectively demodulates Stripes of IP packets (PLP) a consumer has selected on a device (UE) in the home via a Wi-Fi interface to an ATSC 3.0 Home Gateway (GW). One GW interface is connected to an ISP, another via a single RJ-45 up to power and receive PLP data from the RH via an IP connection. The IP data is then received and translated to Wi-Fi in Home GW (or cached on storage) and the consumer experience is delivered. The consumer doesn't care how it works as long as it is reliable, reasonably priced and keeps pace with the internet of things. In this example, there is ~45-50 dB savings in link budget to serve an outdoor RH at 10M with LNB than to overcome (physics with brute force/power) the building penetration losses and deliver service to an embedded NGB antenna on UE at 1.5 M inside the home. To the right is shown the IP core network (NGBP) delivering augmentation services (TCP/IP) to support a Broadcasters business model that are cached (Home GW) and synced to UE for personalization etc. (MMT standard also supports unicast (TCP/IP). Also MMT Protocol has been extended to support broadcast/multicast delivery of DASH segments without using HTTP by introducing "Generic Mode.") This option is available in a non-backwardly compatible ATSC 3.0 standard and can enable broadcasting to remain as an important medium in the internet age though convergence. When the (UE) either enters or leaves the home a seamless handover from or to the terrestrial NGBP occurs.

Also, for additional IP connectivity outside the home, the Broadcaster can benefit from managed Wi-Fi access work just now starting, called IEEE OMNIRAN. There is already a use case defined for 3GPP Trusted WLAN Access to EPC in OMNIRAN. This CLX/SBG "network aware" proposal (IP Core) aligns very well with this work.

Figure 32:
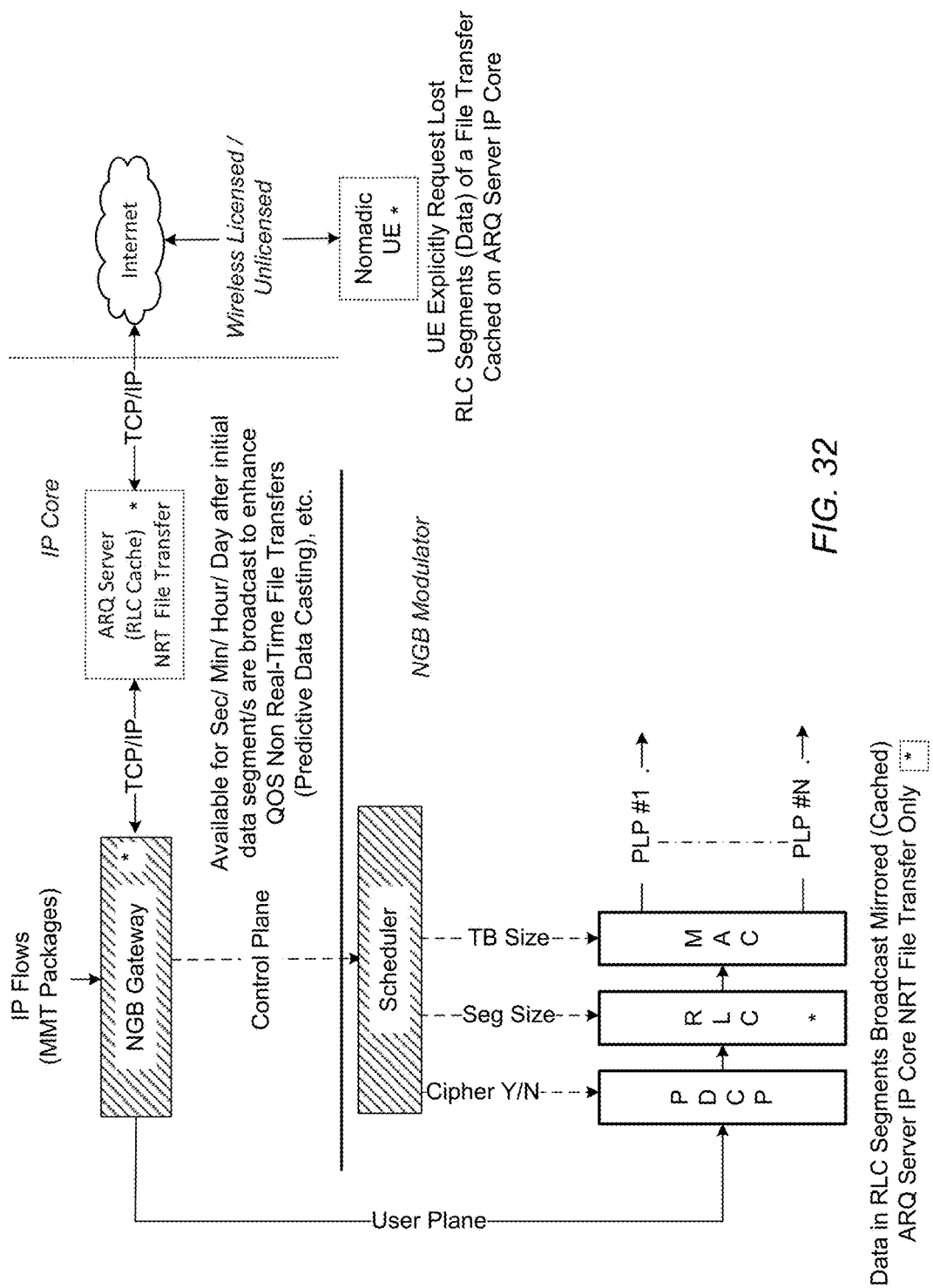
FIG. 32 illustrates ARQ of Lost RLC Segments, according to one embodiment.

2. Increase QOS for Non-Real Time File Transfer Services by Using New ARQ Mechanism FIG. 32 shows the concept to improve QOS for non-real time file transfer services on the NGBP. Files must be delivered without errors to be useful. In the case of LTE, there are several mechanisms to achieve this: Mac Layer Adaptive HARQ; RLC ARQ; and Upper Layer TCP.

Briefly stated, the proposed ATSC 3.0 physical layer (NGBP IP Core) supports an extension of (RLC ARQ) for non-real time file transfer services (without consumer intervention) to ensure successful file transfers. In LTE the RLC layer header has an incrementing segment count and this enables (UE) to detect a lost segment and request a re-transmission quickly. In the proposed broadcast RLC layer the segment count is used with a different protocol for non-real time file transfers, which doesn't assume an instantaneous IP return channel. (Metrics such as UTC time/date the broadcast segment was detected (lost), etc. is also available at UE and would be part of a broadcast ARQ NRT protocol.) The solution also involves leveraging the NGB Gateway cross layer design. The NGB GW is responsible for provisioning all physical layer resources via the scheduler (slave) in NGB modulator. Therefore, the GW has a priori knowledge of which bytes it assigned and will be in each RLC segment of all file transfers processes. The NGB Gateway maintains a cache (RLC Byte Segments) on an ARQ server in the IP core network (NGBP) or using todays over used marketing hype the Cloud. (Broadcaster specifies how long after emission the RLC Bytes with Segment #/UTC timestamps sit on ARQ server to give time for UE to enter a Wi-Fi area or return home ATSC Home GW the file transfer lost RLC segments are explicitly requested.) The ATSC 3.0 nomadic device using an IP connection (when available) using the new protocol explicitly request the lost data bytes in the lost RLC segments by segment number and UTC time stamp, etc. to complete any file transfer and improve QOS.

One possible use case worth mentioning, by 2020 it is projected by some analysis that 50 Billion devices worldwide will be part of the connected internet of things, or in marketing terms Machine to Machine (M2M). This could include market segments such as future advertising including (digital signage, kiosk) to automotive (telematics) to mention just a few. The network aware nature of the NGBP with the proposed physical layer can scale from Kbit bursts to GByte files delivered quickly (CA) to widely distributed machine devices (no human) with a IP return channel (licensed/unlicensed) using a new broadcast RLC/ARQ protocol in the future supporting selective ARQ for these broadcast M2M services. Having a method to ensure QOS takes this into the realm of the possible. The high power transmitters in the NGBP may be put to greater economic value for example in overnight hours by providing M2M services in the future as M2M matures as part of a broadcast business model mix under NGBP (BMX).

3. Increasing Capacity (bps) and Functionality by Carrier Aggregation (CA)

Figure 33:
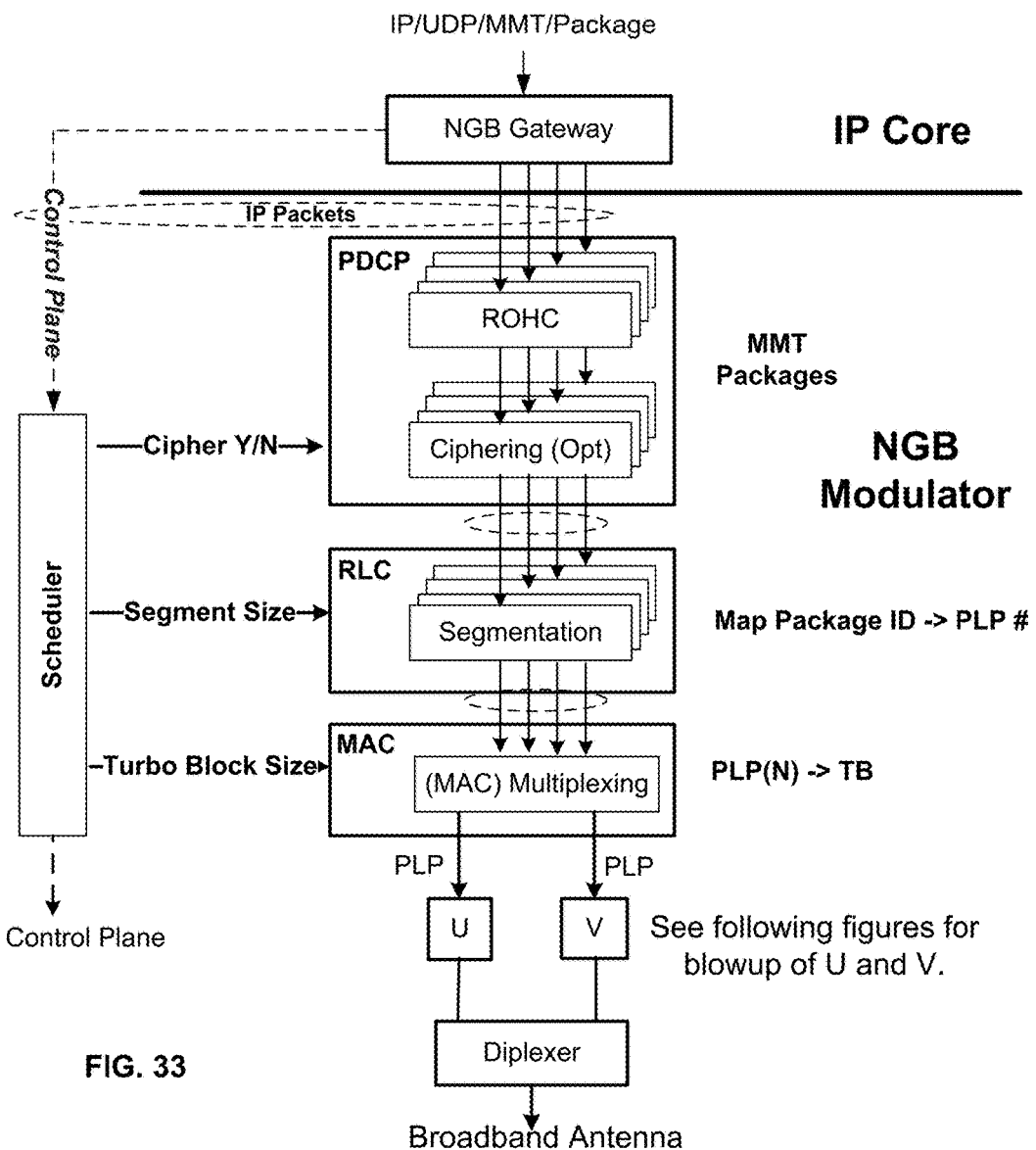
FIGS. 33, 33B and 33C illustrates an an extension of 3GPP LTE-A carrier aggregation (CA) for broadcast, according to one embodiment.
Figure 33B:
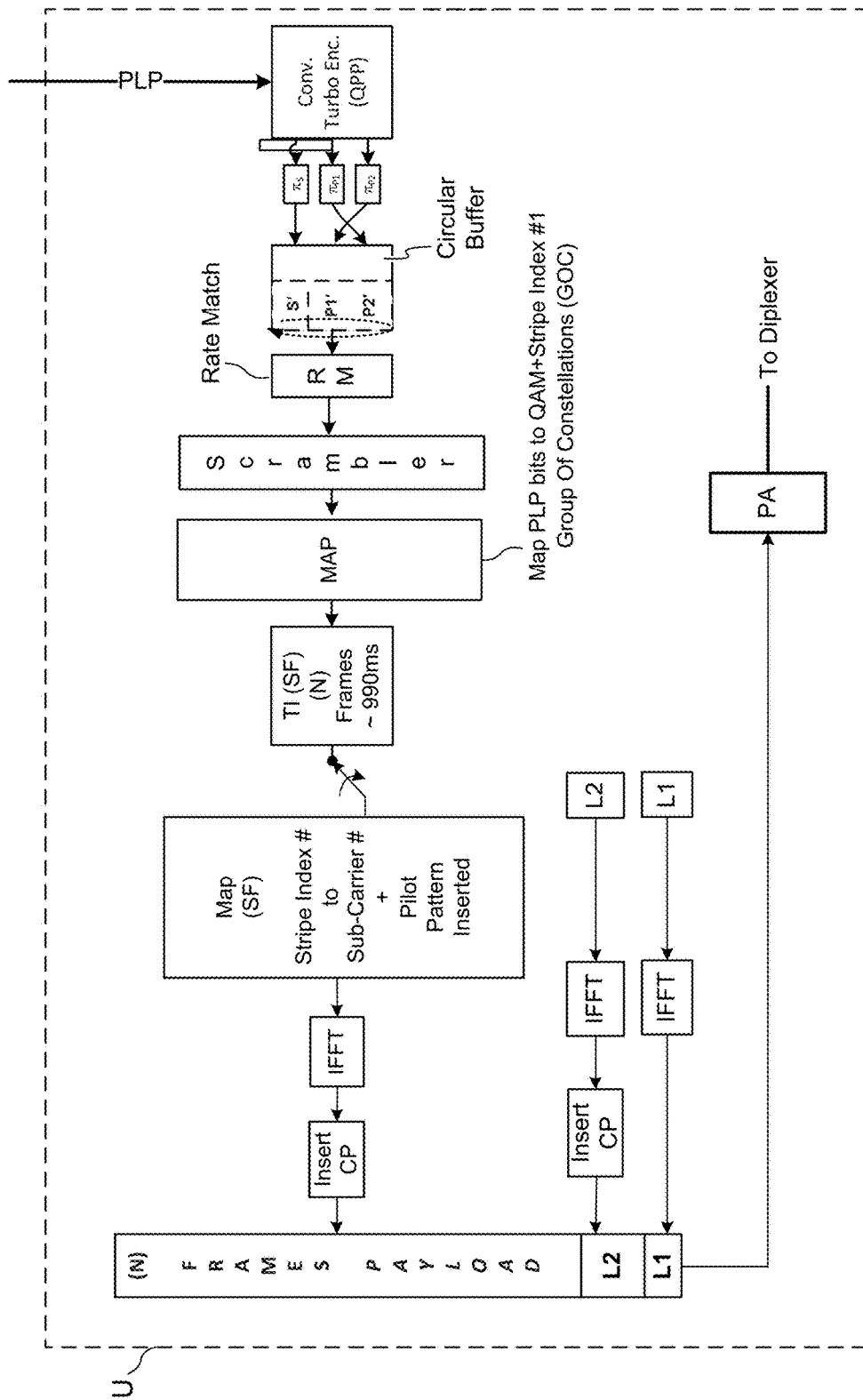
Figure 33C:
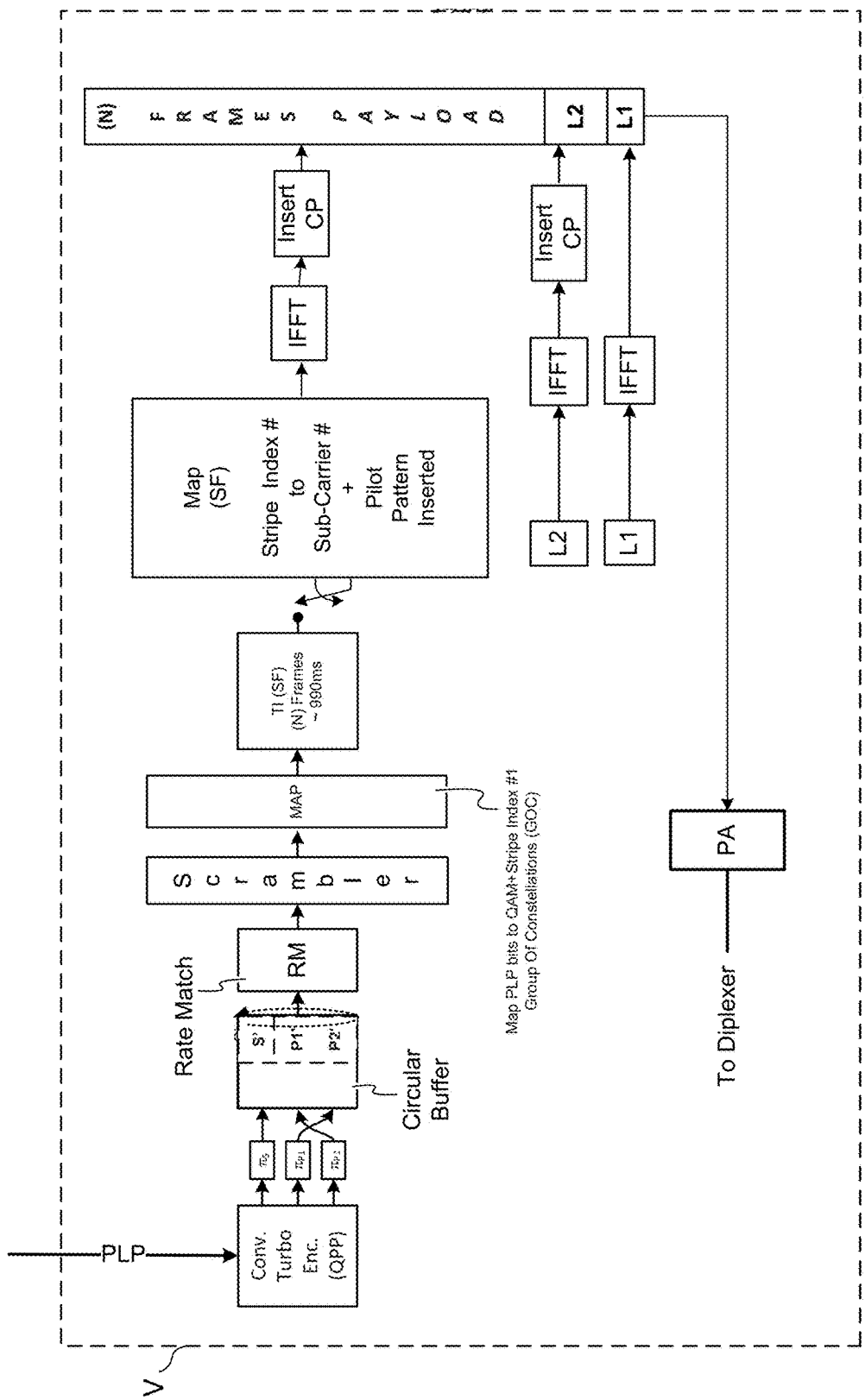

FIGS. 33, 33A and 33B show an extension of 3GPP LTE-A carrier aggregation (CA) for broadcast. The MAC layer is responsible for sending all transport blocks (TB) to the ATSC 3.0 broadcast physical layer. The NGB Gateway (IP Core) controls the MAC layer which is instructed which physical layer (1 of N) the encapsulated IP traffic is assigned. All management of IP flows are handled by the NGB Gateway (IP Core) and the MAC layer (NGB Modulator) is simply instructed it has a new pool of physical layer resources, that's it. The modulator shown has two output ports that feed respective high power stages of two transmitters that feed a diplexer and share a common broadband in the example shown.

Figure 34:
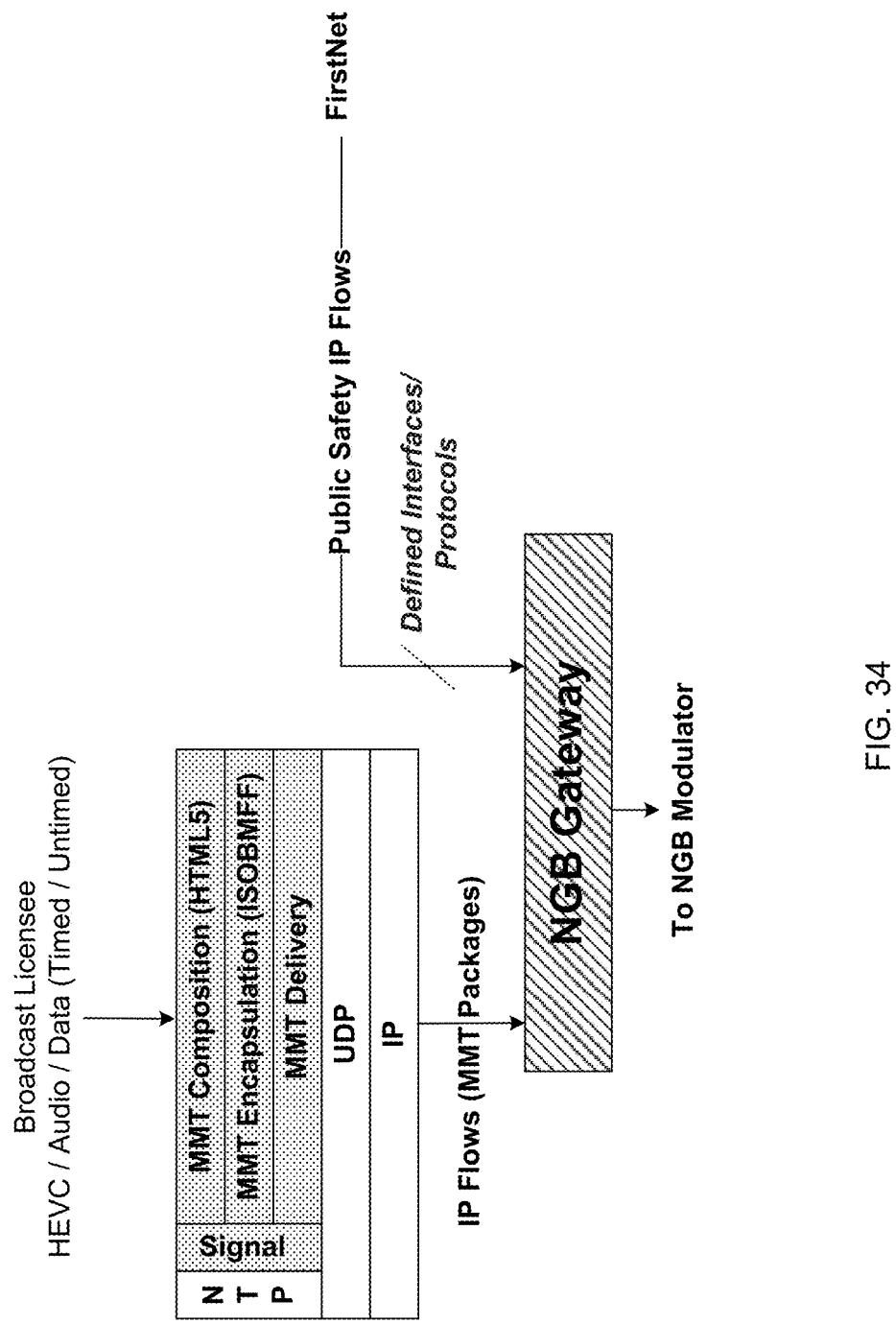
FIG. 34 illustrates IP Flows from First Net to General Public or Private Crypto in Times of Emergencies, according to one embodiment.

4. Serving the Public by Supporting/Augmenting the FirstNet LTE Network Service Types FIG. 34 shows the concept of Broadcasters interworking with the (LTE) FirstNet to help serve the public interest in the future. A defined interface and protocol (IP Core/NGB GW) enables FirstNet IP flows to use the Broadcaster physical layer resources to communicate from a command center to augment (LTE unicast) by sending real-time video or imagery and large files to first responders over a wide area in times of emergencies. Note: bandwidth is made available when needed as part of Broadcaster's on-going legacy effort to serve the public in times of natural or man-made emergencies. During emergencies and other situations, there is a need for secure communications. This private IP traffic would be encrypted data, and optionally, a "Crypto" black box module in PDCP layer (NGB Modulator) can be selected to increase security of the transmission. (In emergency situations first responder communications are crucial to saving lives. Also, these communications should be hardened against jamming, including jamming the GPS satellite downlink frequency. GPS time backup via high accuracy rubidium clocks are already deployed at all cellular base stations, and may easily be deployed at all broadcast transmitter sites to ensure ATSC 3.0 can continue to operate for days or weeks while the GPS downlink is unavailable. A high power transmitter normally has generator power back up; and very low power sites can have a battery pack. These hardening measures maximize system availability for broadcast commerce and public safety.)

There is also the possibility the FirstNet command center could communicate directly to the general public in harms-way (geo targeted) using broadcast under special emergency situations.

5. Carrier Aggregation

Another use of Carrier Aggregation (CA). It is the mechanism by which the broadcast spectrum is applied to off-load wireless traffic for broadband carriers. In the case of a broadcast spectrum restricted to transmit only, it will be used to offload only the down link (DL) traffic for the broadband network. There is no technical limitation on using broadcast spectrum for both uplink and downlink offload should future legislation allow such application.

Figure 35:
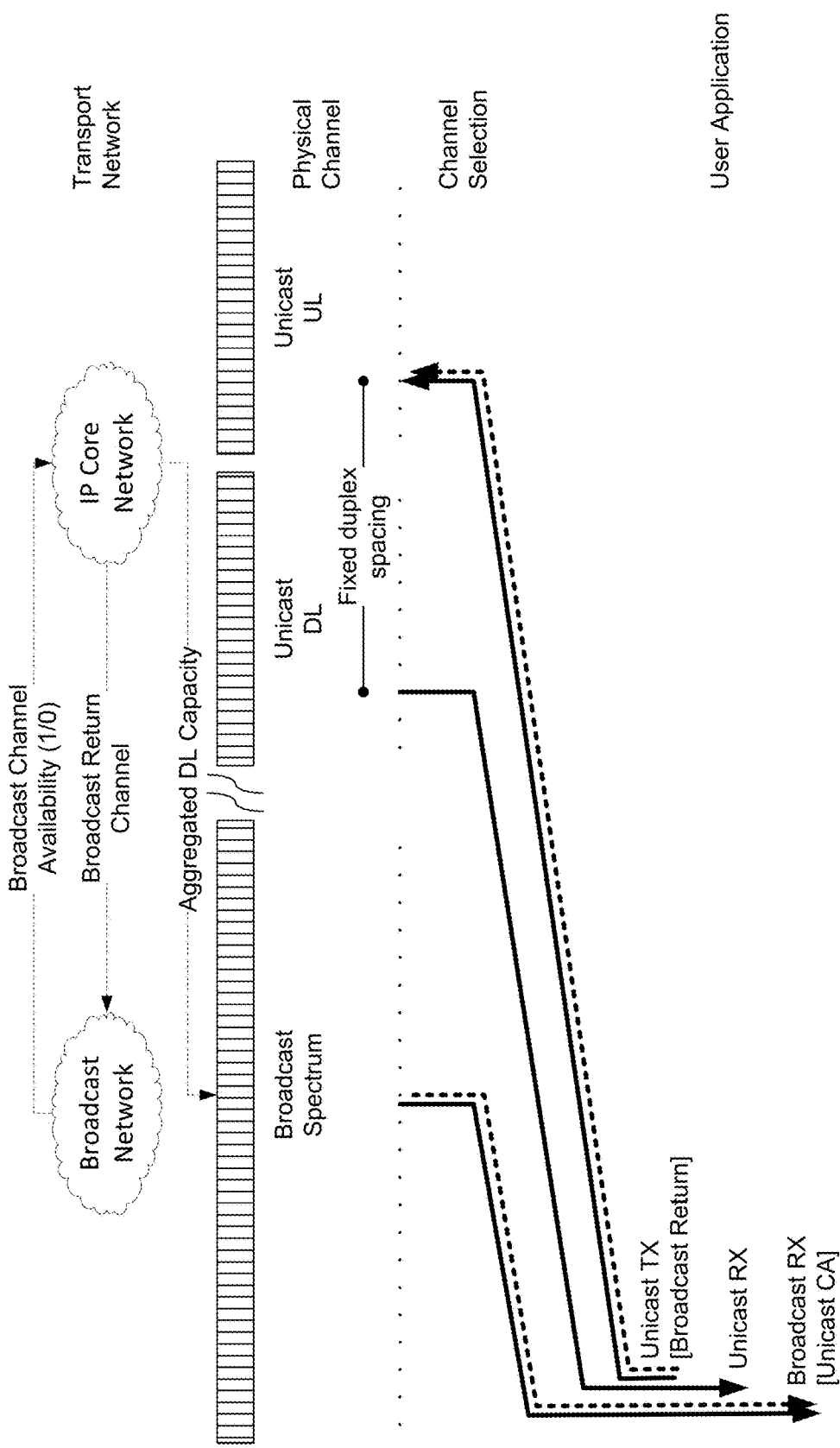
FIG. 35 illustrates Dynamic Spectrum Sharing in a converged Broadcast-Broadband Transport, according to one embodiment.

CA introduces a new mode of spectrum sharing capable of harnessing unused TV spectrum to boost LTE downlink data throughout. Dynamic spectrum sharing uses a particular variant of CA that adds channels aggregated from Broadcast (BC) radio spectrum in the downlink direction, operating alongside two-way transport separated by a fixed duplex arrangement in broadband (BB) spectrum as depicted in FIG. 35.

Dynamic CA is enabled by a spectrum server, whose responsibilities include monitoring traffic demand from registered eNBs, querying the Broadcast Exchange for channel availability then harmonizing the demand for traffic with the available spectrum.

Upon registering a new eNB, the Spectrum Server: (a) Determines the level of CA support, i.e. supported bands, maximum number of Component Carriers (CCs) and maximum aggregate bandwidth; (b) Establishes the CC update frequency and the maximum duration of an aggregate channel grant, after which access must be renegotiated; (c) Establishes the update frequency used in querying the broadcast exchange for channel availability.

Broadcast/Broadband Convergence Network

Since the introduction of the first ATSC standard by the Grand Alliance in 1995, the world has gone mobile. The rapid advancement of wireless broadband network has altered the way content is created, delivered, and consumed. A new generation of consumers has grown up with the always-connected Internet, on-demand content, and social networking in a world not anticipated when ATSC was conceived. In the past two decades, we have experienced significant social, economic, and technological changes that profoundly impacted the way we live, work, and play. It's time to rethink broadcast.

Despite the advancement in wireless broadband technology, broadcast remains the most cost effective way to deliver content to a large number of viewers concurrently. Harmonization between broadcast and broadband is a matter of economics. Unlike a broadcast system serving linear programming to many viewer simultaneously, content-on-demand requires a unicast system in which the transport cost increases as the number of users increases. Broadband providers have the need to offload traffic from highly congested licensed spectrum to unlicensed spectrum (Wi-Fi, Whitespace) and to broadcast network and spectrum, which represents significant new revenue opportunity for Broadcasters.

Harmonization with the LTE wireless broadband systems enhances user experience, facilitates sharing of valuable spectrum, and enables equipment (transmitter, base station, and User Equipment (UE)) to support both broadcast and wireless broadband at minimal incremental cost.

Content-on-demand is clearly the preferred user experience of the Internet generation. Enhancing the conventional broadcast paradigm with unicast user experience seamlessly is therefore critical to the long-term success of the broadcast industry.

The Next Generation Broadcast Platform (NGBP) preserves the conventional broadcast model and allows each Broadcaster to maintain autonomy with their business decisions while providing additional revenue generating options for any Broadcaster to leverage wireless broadband.

Broadcast/Broadband Convergence System

Figure 36:
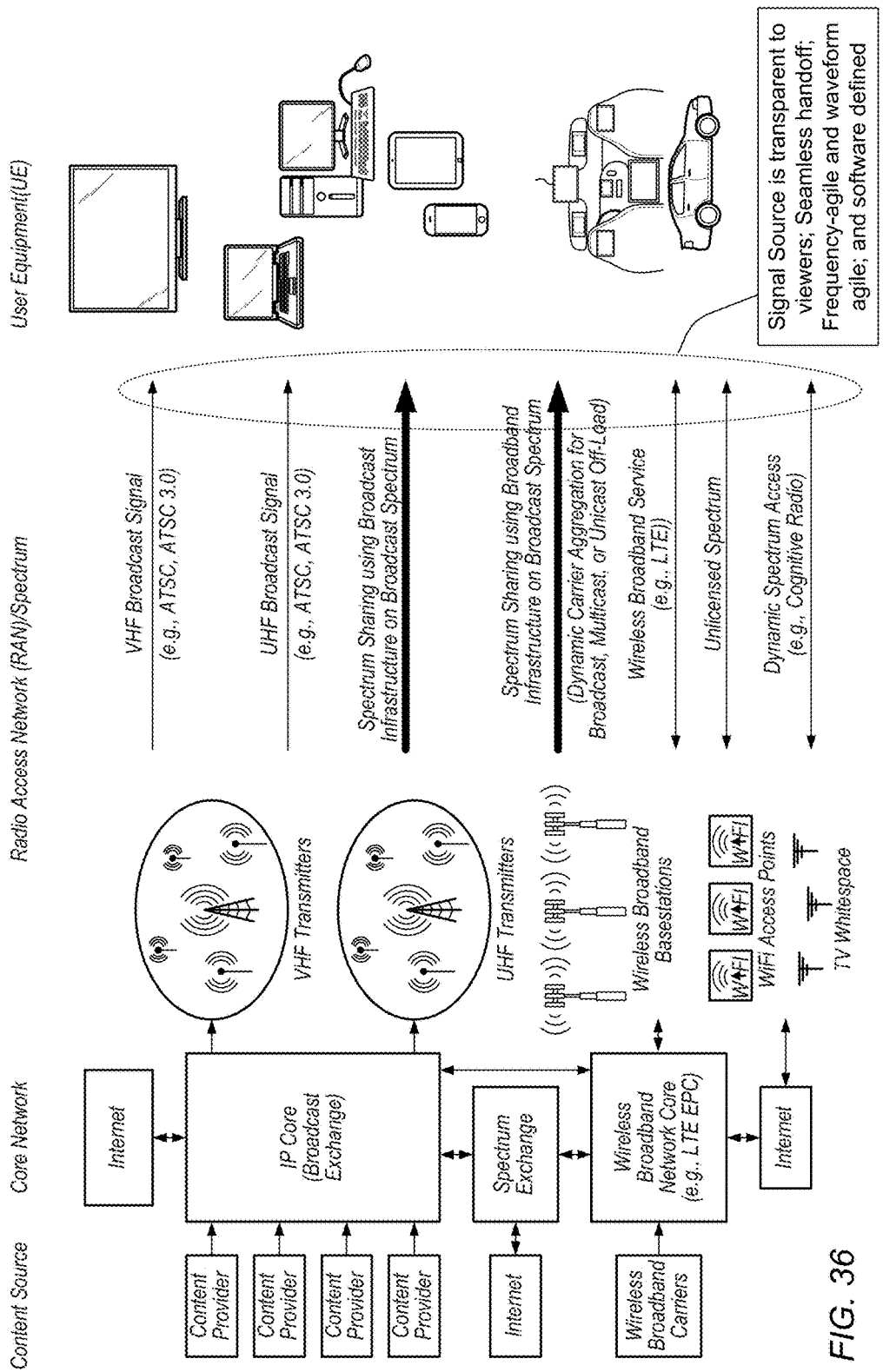
FIG. 36 illustrates one embodiment of a Broadcast-Broadband Convergence System.

FIG. 36 depicts a new broadcast/broadband convergence system delivering content from content source to User Equipment (UE). This system provides significantly enhanced mobile capability to the broadcast industry, additional revenue source for the broadcast industry, additional spectrum for the broadband industry through sharing, and an enriched user experience. All existing business models are preserved so that there is no need for a synchronized transition from today's system to the new system.

The communication links between systems in FIG. 36 are logical connections, not necessarily a dedicated physical link. For example, many communication links may take place over a common network (e.g., the internet), many systems may co-locate or merge as one, and both distributed and centralized control capabilities are allowed. The purpose of FIG. 36 is to illustrate the fundamental operating principle of the network. Various configurations and topologies are possible to achieve the same goal.

Broadcast Mode

The broadcast mode in the Internet age is essentially the conventional broadcast paradigm with the option of using existing wireless broadband network as the uplink (e.g., Wi-Fi, LTE, whitespace, etc.). The two transports operate independently with the Broadcaster solely occupying the broadcast spectrum and transmitting to a broadcast receiver in the UE. The UE may contain a wireless broadband transceiver, capable of two-way DL/UL communication, operating on licensed and/or unlicensed broadband spectrum.

There are three usage scenarios in the broadcast mode:

(1) Non-real time uplink: The user runs a broadcast TV application in the UE, which controls the broadcast receiver similar to watching conventional TV. The TV application collects statistics and other data on the viewing habits of the user. When the device is connected to a broadband network, the collected data will be down loaded to a Broadcaster server for rating, targeted advertisement, and other data mining purposes.

(2) Real-time uplink: A broadband connection is used for uplink in a real time interactive mode. User feedback and broadcast response to user feedback are instantaneous. The full Internet experience, such as social networking, communication, and data access, is available to the user while viewing broadcast content. Association between the broadcast transport and the broadband return channel are accomplished via established internetworking protocols between the broadband and broadcast networks.

(3) No uplink: The user opts out of the uplink option. No data collection, no interactivity, and no uplink. Like a conventional TV.

Broadcast/Broadband Spectrum Sharing Mode

Broadcast and broadband spectrum utilization is in general complementary. For example, the peak broadband spectrum usage is usually during daytime business hours, whereas the peak broadcast revenue generation occurs in evening prime time. From the user perspective, despite the preference for on-demand content in general, time-sensitive broadcast contents such as live events, news, and first airing of popular TV shows are exceptions to the on-demand preference. Spectrum sharing provides additional revenue opportunity for Broadcaster to maximize the return by applying the valuable spectrum to carrying different payloads at different time in a market driven manner under BMX.

Broadcast Market Exchange (BMX)

In one spectrum sharing mode, wireless broadband network content that can benefit from the economics of the broadcast paradigm, can be off-loaded to a converged broadcast network as proposed by the Sinclair Broadcast Group.

A Broadcast Market Exchange is created to enable the aggregation of broadcast spectrum and/or broadcast infrastructure (e.g., transmission towers) by Broadcasters in a given area, ranging from a regional basis (e.g., a Designated Market Area (DMA)) to a national basis. The Broadcast Exchange is responsible for delivering content from participating member Broadcasters using the pool of scarce spectrum resources in the most efficient and effective way in terms of coverage, revenue, (e.g., people served/MHz, revenue/MHz) and Quality of Service (QOS).

The aggregation of spectrum to form a Broadcast Market Exchange is through the voluntary cooperation/agreement of the Broadcasters. Some Broadcasters may prefer to maintain the current broadcast model. Therefore, the broadcast/broadband convergence network is designed to support all existing business models as well as the newly formed exchange models. The centralized control design of a Broadcast Market Exchange is not a requirement to benefit from the enhanced mobile reception, tiered services (e.g., from free advertisement supported content to paid subscription), mobile-friendly, and Internet-friendly user experience offered by the new broadcast/broadband convergence network.

In the current broadcast model, a Broadcaster occupies an entire broadcast channel (e.g., 6 MHz in the US) for its exclusive use 24×7 even though, for many TV stations, a small number of programs generate the majority of revenue and profit. In the new model, the Broadcast Market Exchange is aimed at eliminating the inefficiency in spectrum usage, providing maximum flexibility in delivering content through VHF (optimized for fixed devices) or UHF frequency/transmitters (optimized for mobile devices), and maximizing the revenue potential of the broadcast spectrum for its members.

For instance, additional bandwidth can be freed up through the adoption of next generation codec and an efficient market driven mechanism to distribute available bandwidth to different content by adjusting the resolution (from SD, HD, to 4K and beyond) on a time varying basis. Some Broadcasters may choose to broadcast some of its content only during prime time hours and free up spectrum in the pool for other uses during daytime to generate more revenue. The Broadcast Market Exchange server effectively repacks the broadcast spectrum to deliver contents efficiently for its member Broadcasters and allocate surplus spectrum for other applications including, but not limited to, 4G data offload for wireless carriers, non-real time data delivery, delivery mechanism for other content providers besides Broadcasters, OTT content owners, public services, etc.

Spectrum repacking or repacking TV stations into a smaller block of spectrum is historically the function of a regulatory agency (e.g., FCC in the US) through a legislation process. Unlike spectrum repacking through legislative means, the centralized and coordinated spectrum repacking performed by the Broadcast Market Exchange is dynamic and market driven. In addition to improving the efficiency of spectrum usage for broadcast, the Broadcast Market Exchanges' control of real time dynamic spectrum repacking is essential to creating high value surplus spectrum with minimum interference for non-broadcast use when low power broadband network may have to operate in the vicinity of high power broadcast network.

Spectrum Exchange

In another spectrum sharing mode, Broadcasters will be the primary user of the broadcast spectrum. Broadcasters can share the broadcast spectrum with wireless broadband carriers by shutting off the transmitter and relinquishing control of the spectrum to wireless broadband. Unlike conventional spectrum sharing schemes, spectrum sensing is not required due to the coordination between broadcast and broadband network servers.

Spectrum sharing is enabled whenever spare capacity becomes available on the broadcast transport spectrum. Whenever possible, the broadband network aggregates capacity from any channels designated as available (i.e. unused by the broadcast network). The availability of unused broadcast channels may vary by market or geography as well as by day of the week or time of day. When vacant, the broadcast channel capacity can be redirected to augment the broadband channel capacity until the use of that channel spectrum is reclaimed for broadcast use.

The Spectrum Exchange acquires wholesale spectrum blocks from the Broadcast Market Exchange and makes it available for broadband use in blocks of variable time duration. The length of the blocks, the schedule of channel availability, and the amount of channels available in any geographic location may be determined statically in advance or dynamically in real time based on market conditions.

When the spectrum is under the control of wireless broadband, wireless operators have the option of using the broadcast towers as macro towers in addition to other towers under carrier control. In the case of LTE, wireless broadband operators also have the option to use LTE, LTE+eMBMS, or LTE+enhanced eMBMS ($e^2$MBMS).

Carrier Aggregation

Carrier aggregation is the mechanism by which the broadcast spectrum is applied to off-load wireless traffic for broadband carriers. In the case of a broadcast spectrum restricted to transmit only, it will be used to offload only the down link (DL) traffic for the broadband network. There is no technical limitation on using broadcast spectrum for both uplink and downlink offload should future legislation allow such application.

The off-load spectrum, controlled by an entity which may not be the carrier, can be used to serve multiple wireless broadband carriers. This is different from the conventional notion that all spectrum used in carrier aggregation is controlled by a single carrier for the sole purpose of serving the network of that single carrier.

Programmable Radio Chipset for Next Generation UE

FIG. 37 depicts the architecture of new generation UE to fully leverage the capability of the broadcast/broadband convergence network. Unlike previous broadcast standards, the proposed architecture enables evolution over time, similar to the evolution of the LTE (Long Term Evolution) wireless broadband standard. By using software-defined architecture, the UE is adaptable to evolving standard. It is the goal of the proposed architecture to be the last TV transition, at least in our lifetime. By harmonizing with LTE, the incremental cost of supporting both broadcast and broadband is minimal and the same chipset(s) can be used in all fixed and mobile devices. Only by leveraging this approach to future product, when coupled to specific, standardized methods that allow extensible "Parameterized Waveforms" to evolve will be given an opportunity to compete in a continuously changing technological marketplace. When coupled with an all IP transport and flexible application architecture we will stay competitive and aligned (harmonized) at all levels of our standards capabilities.

NGB PHY Proposal

In various embodiments, a generation broadcast system and method are based on a configurable OFDM transport that permits the broadcaster to provision a network deployment based on the intended cell range and anticipated user mobility. (OFDM is an acronym for Orthogonal Frequency-Division Multiplexing. ATSC is an acronym for Advanced Television Systems Committee. PHY is an abbreviation for Physical Layer.) The aim is to select PHY system parameters suited to the assigned center frequency, in order to meet prescribed performance objectives across a variety of use case scenarios. Parameter selections are made as a function of geography as well as time-of-day (e.g., as user densities shift from primarily mobile reception during peak commute times to mostly static reception during late evening extending into nighttime viewing hours).

Figure 38:
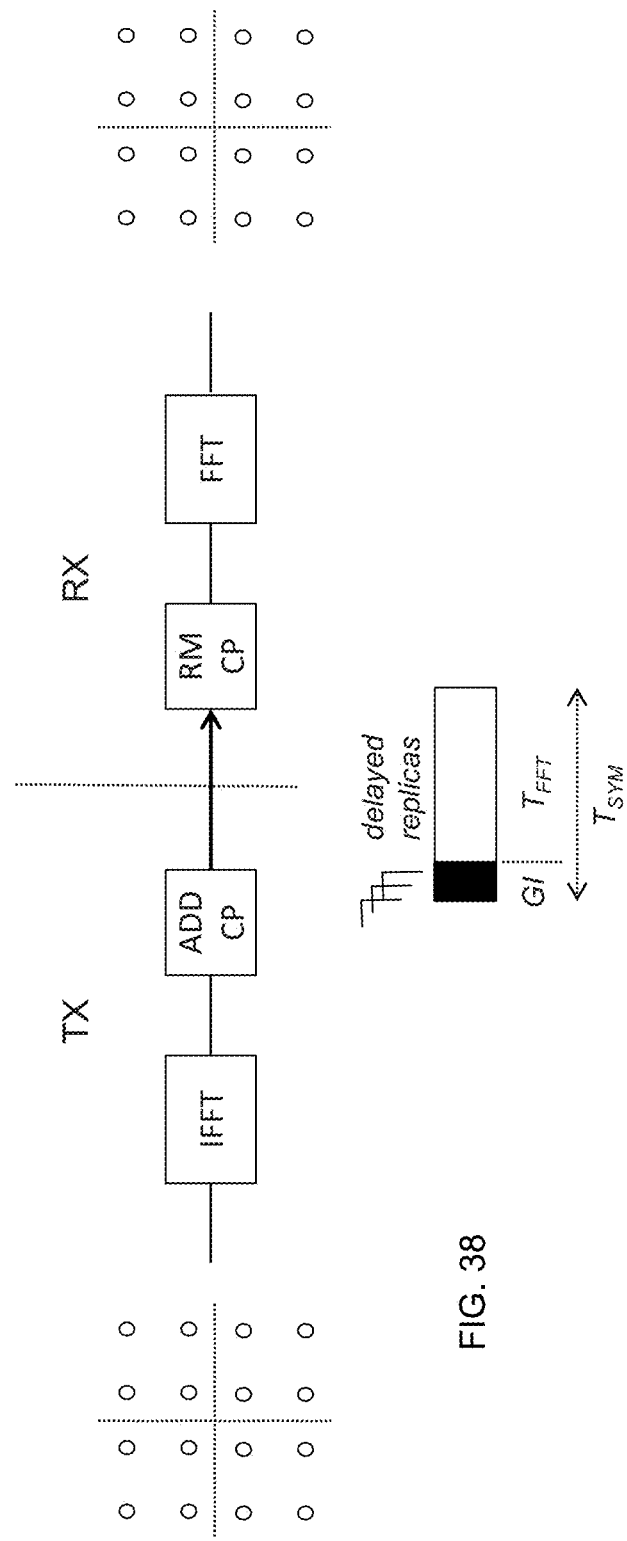
FIG. 38 illustrates an OFDM data pump with cyclic prefix (CP) insertion/removal, according to one embodiment.

Referring now to FIG. 38, which illustrates an OFDM data pump with cyclic prefix (CP) insertion/removal, key performance objectives are discussed below.

Range

The cell operating range is a key factor in determining capital expenditure associated with outfitting a broadcast network. The distance between adjacent towers determines the delay spread tolerance required to operate the system in SFN mode without degradation due to excess multipath interference. The delay spread tolerance is determined by the length of the Guard Interval (GI) inserted ahead of each OFDM symbol in the form of a Cyclic Prefix (CP), as depicted in FIG. 38. (The cyclic prefix duration is also referred to herein as the GI duration.) The system operates free of Inter-Symbol-Interference (ISI) provided the multipath delay spread is fully contained within the GI duration. The GI duration may be specified in terms of a percentage or ratio, e.g., in terms of a percentage (CP %) of the usable OFDM symbol period $T_{FFT}$. The usable OFDM symbol period $T_{FFT}$ is equal to (and may be computed as) the inverse of the subcarrier spacing $\Delta f$: $T_{FFT}=1/\Delta f$. $T_{FFT}$ and the selected CP % determine the GI duration, and thus, the maximum allowable delay spread. Reducing the subcarrier spacing $\Delta f$ extends the usable OFDM symbol period $T_{FFT}$, and thus, reduces the temporal overhead (in terms of CP %) required to achieve a given delay spread tolerance specified by the system operator.

User Mobility

User mobility results in a Doppler shift in the signals received at the user equipment device. The OFDM transport is immune to Doppler shift, provided the Doppler shift remains small with respect to the normalized subcarrier spacing $\Delta f$:

$$V_D << \frac{c \cdot \Delta f}{f_c},$$

where c is the speed of light, where $f_c$ is the frequency of the subcarrier, where $V_D$ is the radial speed of the user equipment (UE) device with respect to the broadcast tower.

The choice of subcarrier spacing $\Delta f$ therefore requires a tradeoff between Doppler performance and delay spread tolerance. In other words, for a given value of CP %, a larger (smaller) value of $\Delta f$ implies a larger (smaller) value for the maximum allowed Dopper shift and a smaller (larger) value for the maximum allowed delay spread. The NGB PHY provides a system operator (or an automated selection agent) with increased flexibility in parameter selection, to accommodate refined tradeoffs in system performance.

Enhanced System Features

A number of features are introduced to enhance system performance or introduce new service modes are summarized in the following subsections.

Scalable System Configuration

The NGB PHY takes a blended approach in dimensioning the OFDM signal, to meet a wide range of performance objectives. In some embodiments, the proposed PHY may use sampling rates derived from those employed by 3GPP LTE. See FIG. 39. (The term "sampling rate" may refer to the digital-to-analog conversion rate at the base station and/or to the analog-to-digital conversion rate at the UE device.)

Figure 39:
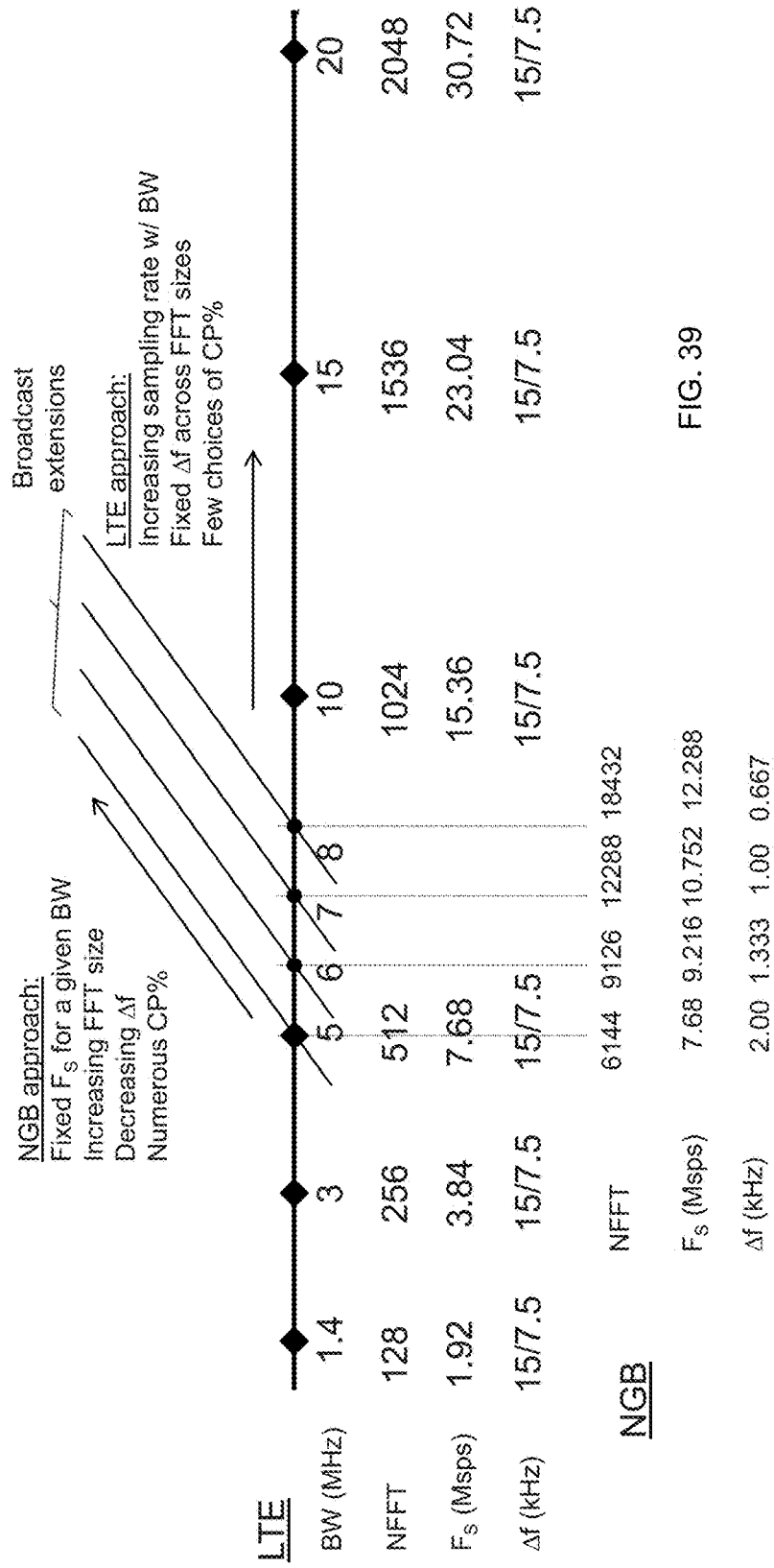
FIG. 39 illustrates a blended approach to extending the PHY for enhanced broadcast performance, according to one embodiment.
Figure 41:
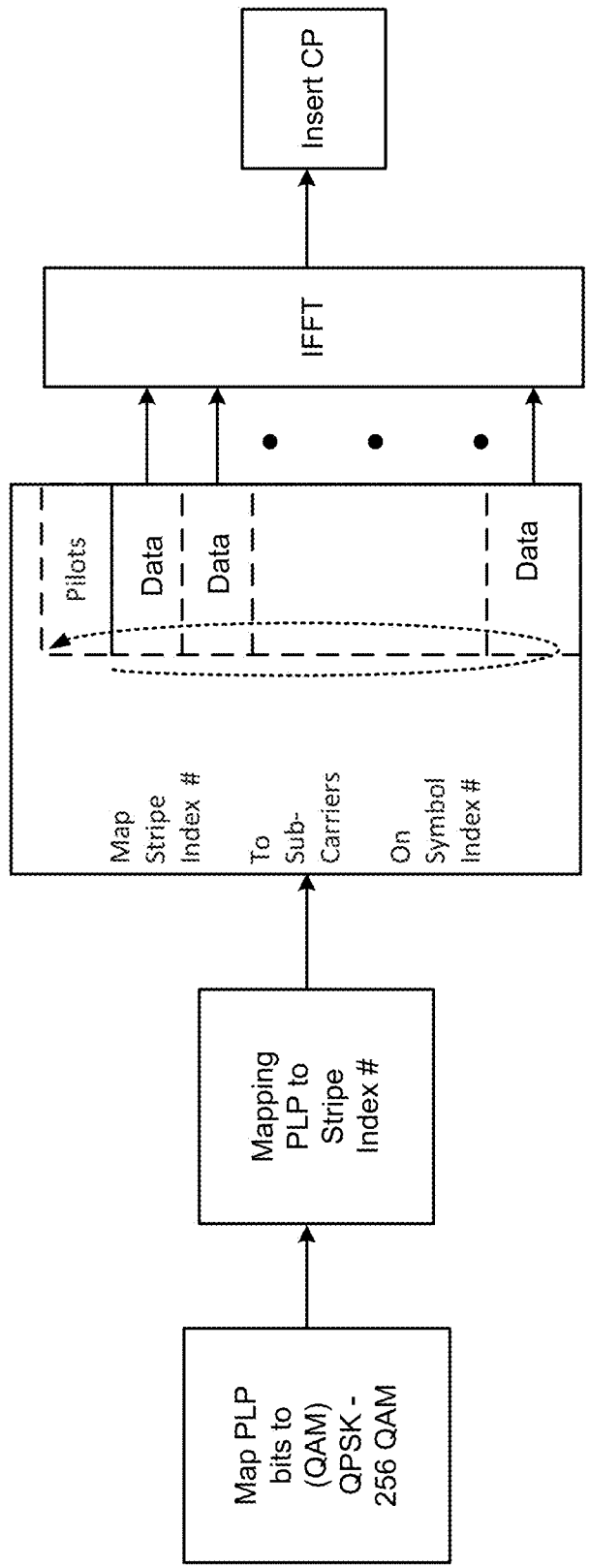
FIG. 41 illustrates one embodiment of a Mapping of Physical Layer Pipes (PLPs) onto the OFDM PHY Transport.

Referring now to FIG. 39, we describe a blended approach to extending the PHY for enhanced broadcast performance, according to one embodiment. LTE affords a limited set of choices in CP % and subcarrier spacing Δf for a given signal bandwidth BW. In contrast, the NGB PHY extends the system parameters in a DVB-like fashion, providing increased flexibility in system configuration. (DVB is an acronym for Digital Video Broadcasting.)

PHY Provisioning

LTE increases the FFT size NFFT with fixed subcarrier spacing to enable deployment in larger signal bandwidths. A 5 MHz signal uses NFFT=512 whereas 10 and 20 MHz signals use NFFT=1024 and 2048, respectively. The LTE PHY maintains fixed subcarrier spacing (15 kHz for unicast operation; 15 or 7.5 kHz is available for broadcast use) resulting in fixed symbol duration independent of signal bandwidth. The NGB PHY on the other hand employs increasingly larger FFTs with reduced subcarrier spacing in a given signal bandwidth as a means of extending the symbol duration for increased delay spread tolerance with minimal GI overhead. Table 17 (i.e., FIG. 40) lists a sample configuration based on 6 MHz channel bandwidth for a variety of range/Doppler performance targets. The system parameters were selected to yield the same CP % overhead resulting in uniform spectral efficiency despite the aim to address vastly different performance objectives.

Variable Pilot Density

The number of carriers per stripe $N_{SCPS}$ is calculated as the number of subcarriers $N_{SC}$ available in the transport divided by one plus the number of stripes $N_{DATA}$:

$$N_{SCPS}=N_{SC}/(N_{DATA}+1),$$

where $N_{DATA}$ indicates the number of data stripes, allowing one additional stripe for pilot carriers. The stripes are in turn mapped to IFFT inputs according to a prescribed offset and stride. The stride indicates the number of subcarriers to skip when placing consecutive data elements associated with each stripe. Given a stride equivalent to $N_{DATA}$, subcarriers from each stripe, pilot carriers included, are distributed evenly across the available signal bandwidth providing built-in frequency diversity. By varying the offset (over successive OFDM symbols) according to a schedule known to both the transmitter and the receiver, the subcarriers associated with each stripe sweep the available channel bandwidth, providing additional immunity to frequency-selective fading. For example, the offset may increase linearly as a function of time index, e.g., the time-domain OFDM symbol index. Pilots are swept in frequency along with the data subcarriers, facilitating channel estimation.

The ratio of data stripes to pilots can be varied to accommodate different levels of mobility. For reduced mobility, the pilot frequency (i.e., pilot density in the space of subcarriers) can be relatively low, e.g. $N_{PILOT}:N_{DATA}$=1:11, corresponding to a stripe density of $N_{DATA}/(N_{DATA}+1)$=11/12=0.9167. Higher mobility requires increased pilot frequency, e.g. $N_{PILOT}:N_{DATA}$=1:4, resulting in a stripe density of $$N_{DATA}/(N_{DATA}+1)=4/5=0.8.$$

Given the appropriate offset and stride, pilot and data subcarriers will be distributed evenly or approximately evenly. To enable even distribution, the number of available subcarriers may be evenly divisible by the number of stripes, i.e., $$N_{SC}/(N_{DATA}+1)=\text{INTEGER}.$$

Rate Matching to Accommodate VBR Source Coding

The notion of Rate Matching (RM) is borrowed from cellular telephone technology with significant modifications. For example, in 3GPP, rate matching is used to match an encoded block of potentially variable size (comprising information and parity bits) to the varying carrying capacity of a selected transport path between a cell base station and individual user equipment (UE). The carrying capacity depends on modulation and nominal coding rate, in combination with noise and distortion introduced by the radio propagation path between the base station and the UE. A base station such as eNodeB continually adjusts the modulation and coding scheme per subframe according to the current channel capacity it perceives is available to each individual UE. In the telephony environment, RM is used primarily to accommodate variability in channel capacity.

In a broadcast environment, the carrying capacity is much more constant than source data rates. For hours or days at a time the carry capacity remains fixed while the source data rates may change by large ratios in milliseconds. Broadcast equipment may select amongst different modulation types QPSK or 16/64/256-QAM with a nominal coding rate, R=k/n, depending on the availability and throughput efficiency the broadcaster wishes to deliver. (Availability increases as the modulation order and coding rate are reduced. Throughput efficiency increases as the modulation order and coding rate are increased.) The bit rate due to source coding, however, is highly variable, depending on video scene content and associated quality metrics the encoders are working to maintain. (Video encoding of a source video stream, e.g., MPEG or HEVC encoding, may be interpreted as a form of source coding.) Our proposed NGB system exploits cross layer visibility to maximize the efficiency of the available transport. Cross layer visibility refers to employing knowledge of the rate resulting from source encoding in determining the optimal rate matching to apply at the PHY transport.

Figure 42:
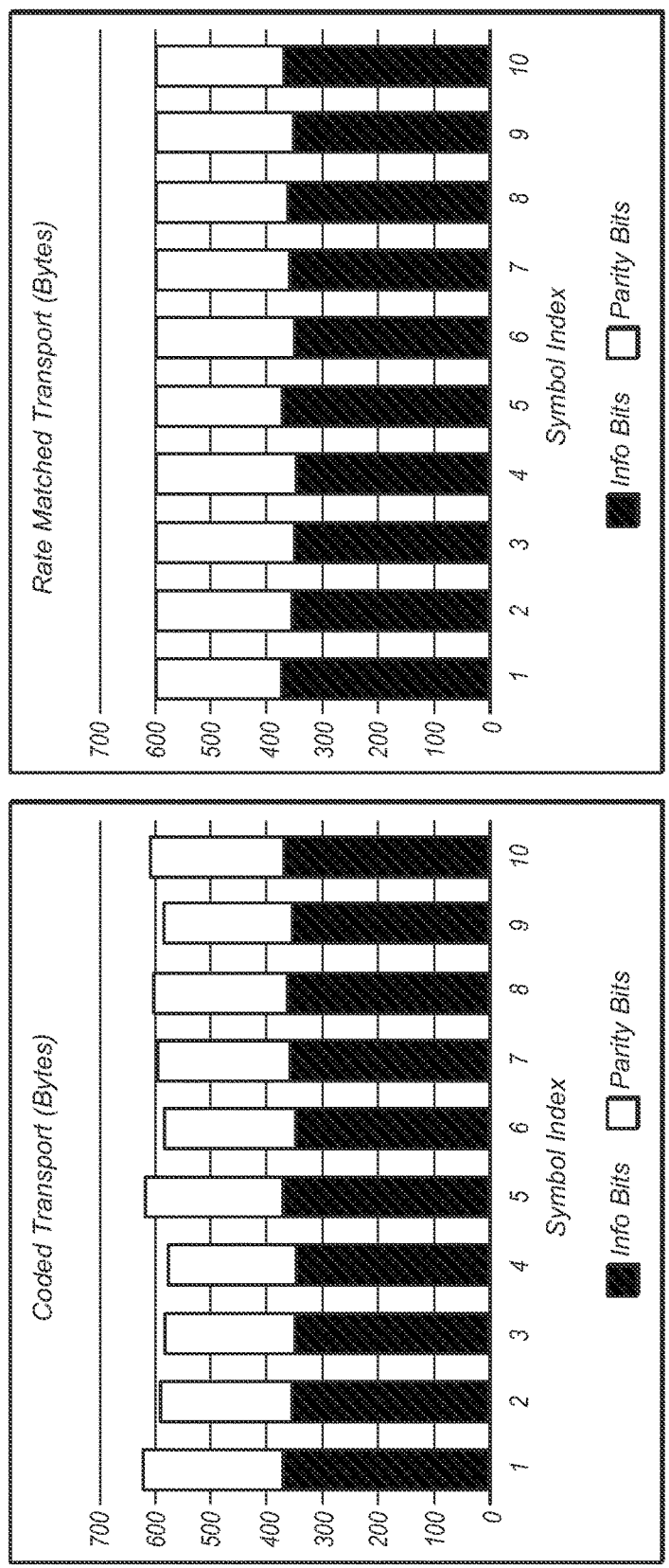
FIGS. 42A and 42B illustrate one embodiment of rate matching to accommodate Variable Bit Rate (VBR) source coding.

Referring now to FIGS. 42A and 42B, we discuss rate matching to accommodate VBR source coding. Rate matching enables Variable Bit Rate (VBR) source coding on top of a fixed capacity transport. The block size after encoding is slightly smaller/greater than the available transport depending on the VBR coding rate in a given frame as depicted in FIGS. 42A and 42B. Rate matching inserts/deletes parity bits to match the available transport resulting in slightly lower/higher coding rate per frame, again as a function of the VBR source coding. Observe that the rate-matched block sizes (in FIG. 42B) are all equal to the available transport size.

Non-Real Time File Transfer

Figure 43:
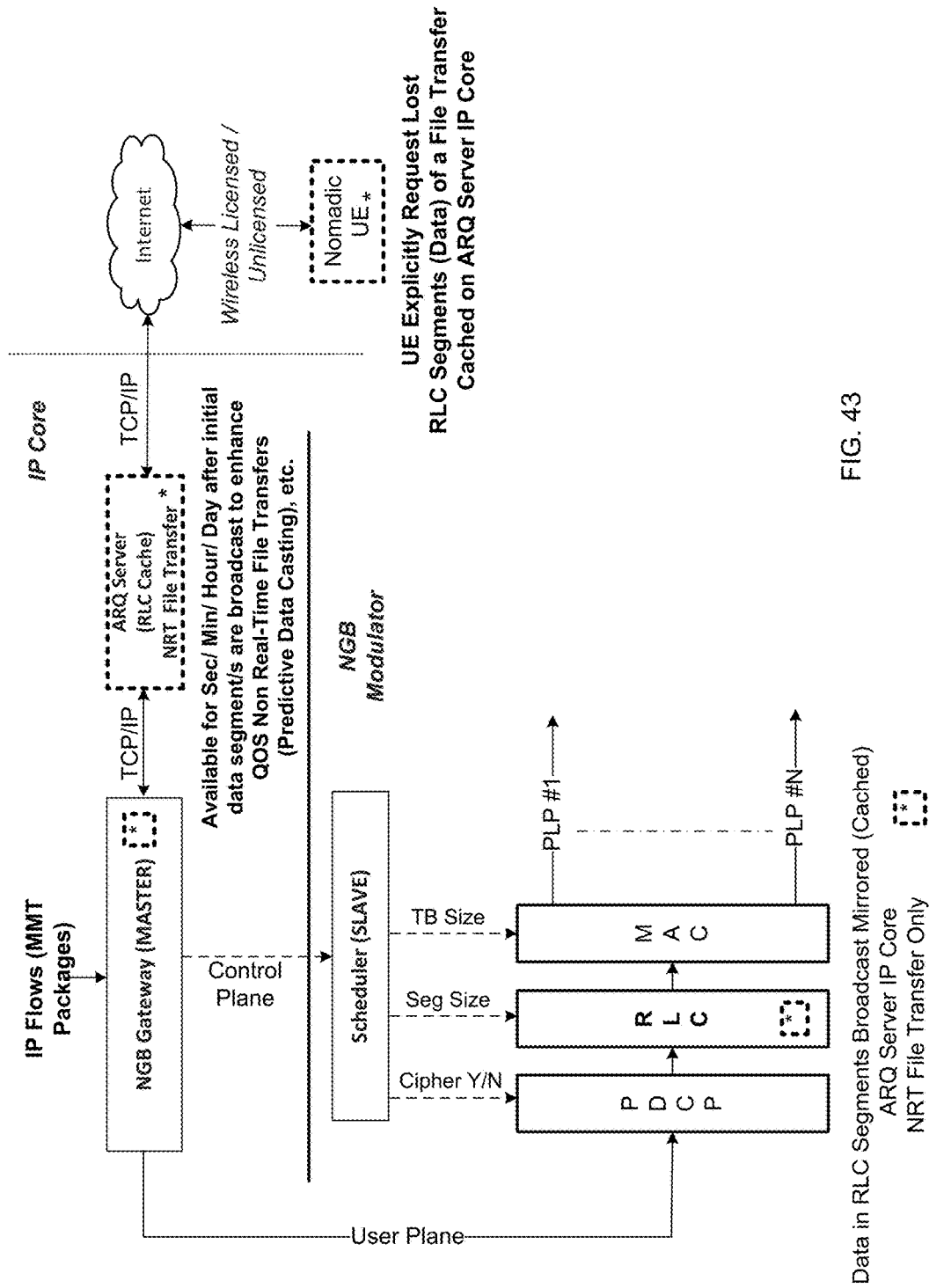
FIG. 43 illustrates one embodiment of Non-Real Time File Transfer with Quality of Service (QOS) via ARQ Server.

Referring now to FIG. 43, we describe non-realtime file transfer with QOS via ARQ Server. The Cross Layer nature of the NGB Gateway is the basis for the concept underlying Non-Real Time (NRT) file transfer. NRT file transfer refers to delivery of broadcast media or some file contents sent alongside streaming broadcast content by the NGB modulator. When broadcasting a media file, the data must be received without errors to be of use at the receive terminal. Unlike LTE, one-way broadcast lacks a real-time return channel for a UE to request retransmission of lost data segments. In addition, retransmitting lost segments as requested by each UE from a high power, one-to-many broadcast transmitter spanning service areas up to 30 km constitutes an inefficient use of the broadcast spectrum.

The proposed ATSC 3.0 transport sends content in chunks at exactly one second intervals in cadence with the GPS 1PPS clock, locking the NGB Modulator (Slave) to the NGB Gateway (Master). The modulator uses a modified Radio Link Control (RLC) layer, borrowed from LTE. The RLC attaches a segment count incremented as part of the RLC header included with every segment, plus a UTC timestamp indicating when the data was originally broadcast. This method of detecting lost segments can be extended for use in a broadcast scenario provided the availability of an IP network to transport real-time user feedback. The IP network is also used to retransmit any lost data segments as described below.

Cross layer control of the NGB Modulator equips the NGB Gateway with a priori knowledge of all file transfer processes underway. The NGB Gateway automatically pushes data segments belonging to a file transfer along with their associated segment counts and timestamps to an RLC Cache. The RLC cache is used in servicing Automatic Repeat reQuests (ARQ) entirely within the IP Core Network. The NGB Gateway also sends metadata along with the broadcast files directing the UE to the URL of an ARQ server, resident in the IP Core Network. When a broadcast UE detects a missing sequence number, it requests re-transmission of the data corresponding to the lost segment(s) from the ARQ server. The re-transmission request contains the missing sequence number(s) and original UTC timestamp(s). Mirroring the broadcast data in this manner, via an ARQ Server, enables recovery of lost data segments associated with a specific file transfer (as specified by segment #, UTC timestamp) via a Unicast return channel providing an enhanced user experience with increased QoS. The ARQ process can be automated so that the file transfer is completed in the background when a UE encounters WiFi or a licensed radio service such as LTE.

Figure 44:
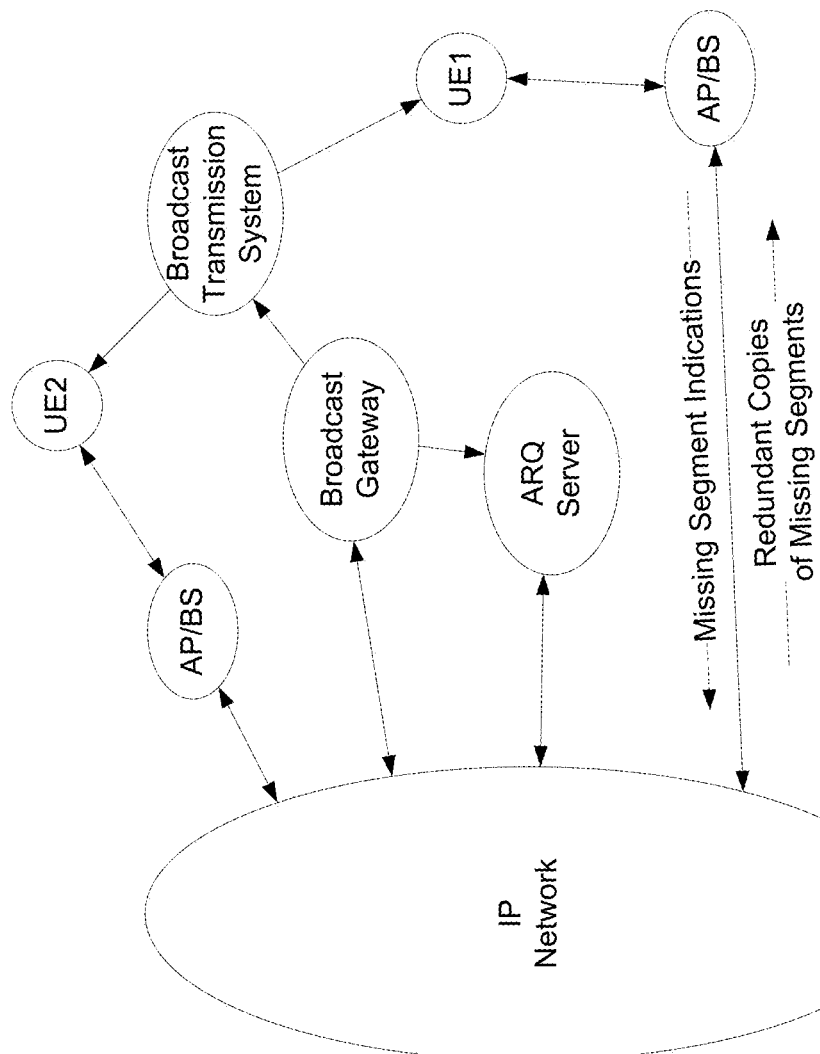
FIG. 44 illustrates one embodiment of a System Architecture for Non-Real Time File Transfer.

In some embodiments, a method for performing file transfers (e.g., non-real time file transfers) to user devices may utilize a system architecture as illustrated in FIG. 44. These embodiments may include any subset of the features, elements and embodiments described above.

A broadcast gateway may send segments of a data file to a broadcast transmission system and also to an ARQ server. The broadcast gateway may also send one or more video content streams to the broadcast transmission system. (The broadcast gateway and the ARQ server may be included as parts of an IP network.) The broadcast transmission system transmits into space a RF signal including the segments and the one or more video streams. While the data file may be targeted for a single user equipment (UE) device such as the first UE device (UE 1), the one or more video content streams are typically intended for broadcast to a plurality (e.g., a large number) of UE devices. The first UE device receives the RF signal and generates one or more missing segment indications identifying one or more segments that it is not able to successfully recover from the RF signal. The first UE device transmits the one or more missing segment indications to the ARQ server through the IP network, e.g., using a WiFi connection to a WiFi access point (AP), which couples to the IP network, or using a wireless connection to a base station (BS), which couples to the IP network. (In some embodiments, the base station may be an LTE eNodeB.) The ARQ server receives the missing segments indications, and sends the one or more segments identified by the missing segment indications to the first UE device through the IP network (e.g., using the same WiFi connection or LTE connection). Each of the missing segment indications may include a sequence number of the respective missing segment and a time-stamp associated with the respective missing segment.

The broadcast gateway may also provide the URL of the ARQ server to the broadcast transmission system, in which case the broadcast transmission system may transmit the URL to the first UE device as part of the RF signal. The first UE device may use the URL to establish a connection to the server through the IP network.

The transfer of a second data file to a second UE device (UE2) may be performed in a similar fashion. The transfer of the second data file may be conducted in parallel (or, partially in parallel) with the transfer of the first data file. The second UE device may send its missing segment indications to the same ARQ server (or perhaps, a different ARQ server).

FIG. 44 shows only two UE devices, to avoid overcomplication of the diagram. However, it should be understood that the broadcast transmission system may typically be broadcasting video content to a large number of UE devices, and transferring data files to selected ones of those UE devices. For example, a data file may be transferred to a UE device in response to a request asserted by that UE device, e.g., a request asserted through the access point (or base station) and the IP network.

Example of Variable Pilot Density

Figure 45:
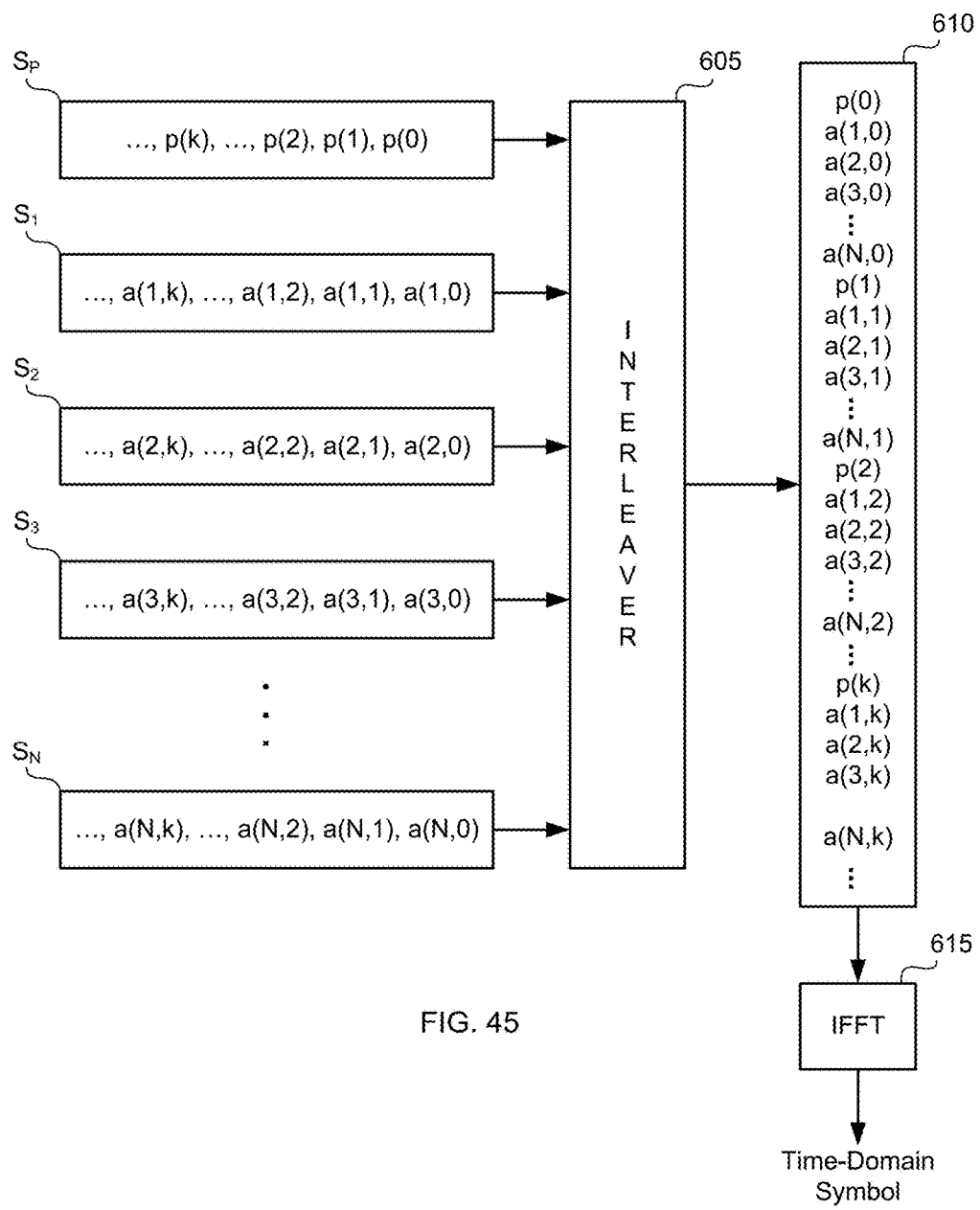
FIG. 45 illustrates an example of Stripe-to-Subcarrier Mapping, according to one embodiment.

In one set of embodiments, an interleaver 605 may be configured to receive data from a pilot buffer $S_P$, and N stripes buffers corresponding to N respective physical layer pipes, as shown in FIG. 45. The pilot buffer $S_P$ includes pilot symbols. (This variable N corresponds to the variable $N_{DATA}$ from the discussion above.) The N stripe buffers are denoted $S_1, S_2, \ldots, S_N$.

Each stripe buffer stores a block of symbols of the corresponding physical layer pipe $PLP_k$. For example, stripe buffer $S_k$ stores a block of samples $$\{a(k,j): j=0,1,2,\ldots,M_{BLOCK}-1\},$$

where k is the stripe index (or PLP index), and j is the symbol-within-block index. The interleaver 605 generates a sequence of subcarriers 610 by spreading out (e.g., interleaving) the symbols from the pilot symbol buffer and the N stripe buffers.

For example, in one embodiment, the $n^{th}$ symbol in the generated symbol sequence 610, denoted b(n), may be defined by:

$$m=(n-\text{Offset}) \bmod N_{SC}$$

$$k=\text{floor}(m/(N+1))$$

$$j=m \bmod (N+1)$$

$$b(n)=a(k,j),$$

where $n=0, 1, 2, \ldots, N_{SC}-1$, where [x] denotes the integer part of x, where a(0,k) is defined to be p(k), i.e., the $k^{th}$ symbol of the pilot buffer. FIG. 6 shows the case where Offset=0. After generating the symbol sequence 610, the N stripe buffers may be loaded with more data from the N corresponding physical layer pipes. As described above, the value of N is programmable. (The inverse of N, i.e., 1/N, may be referred to as pilot density.) A network controller may initially set the value of N based on an expected maximum mobility of the UE devices that will receive from the broadcast transmission system. Furthermore, the value of N may be changed, e.g., in response to an expected change in the maximum UE mobility. Higher mobility typically requires a smaller value of N. Conversely, lower mobility will typically allow a larger value of N.

The Offset may vary from one OFDM symbol to the next (or, one group of OFDM symbols to the next), e.g., in a linear fashion. In one embodiment, the Offset may be incremented by a fixed amount between OFDM symbols:

Offset←Offset+Constant.

Thus, the positions of pilot symbols and symbols from each of the stripe buffers will continuously rotate through the subcarrier space as a function of OFDM time index. The symbol sequence 610 may be inverse transformed by IFFT unit 615. The resulting time-domain symbol may be transmitted, e.g., after guard interval insertion.

Figure 46:
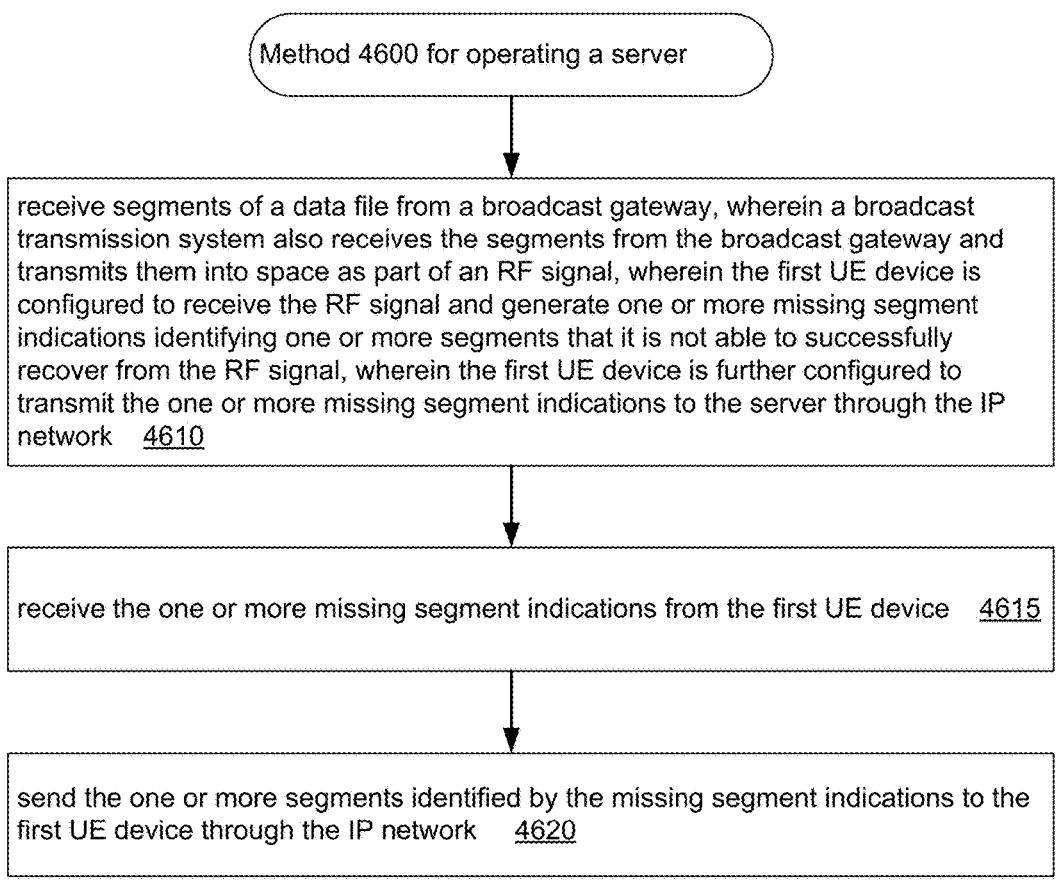
FIG. 46 illustrates one embodiment of a method for operating a server to facilitate the transfer of a data file to a user equipment (UE) device.

In one set of embodiments, a method 4600 for operating a server may include the operations shown in FIG. 46. (The method 4600 may also include any subset of the features, elements and embodiments described above.) The method 4600 may be used to facilitate the transfer of a data file to a first user equipment (UE) device, wherein the server is part of an IP network.

At 4610, the server may receive segments of a data file from a broadcast gateway, wherein a broadcast transmission system also receives the segments from the broadcast gateway and transmits them into space as part of an RF signal. The first UE device is configured to receive the RF signal and generate one or more missing segment indications identifying one or more segments that it is not able to successfully recover from the RF signal, wherein the first UE device is further configured to transmit the one or more missing segment indications to the server through the IP network (e.g., using an WiFi connection to a WiFi access point, which couples to the IP network, or using a wireless connection to an LTE eNodeB, which couples to the IP network.

At 4615, the server receives the one or more missing segment indications from the first UE device.

At 420, the server sends the one or more segments identified by the missing segment indications to the first UE device through the IP network (e.g., through the same WiFi connection or LTE connection).

In some embodiments, the broadcast gateway is also part of the IP network.

In some embodiments, each of the missing segment indications includes a sequence number of the respective missing segment and a time-stamp associated with the respective missing segment.

In some embodiments, the RF signal also carries a video broadcast signal for reception by a plurality of user devices.

In some embodiments, the broadcast gateway also provides a Uniform Resource Locator (URL) of the server to the broadcast transmission system, wherein the broadcast transmission system transmits the URL to the first UE device as part of the RF signal, wherein the first UE device uses the URL to establish a connection to the server through the IP network.

Figure 47:
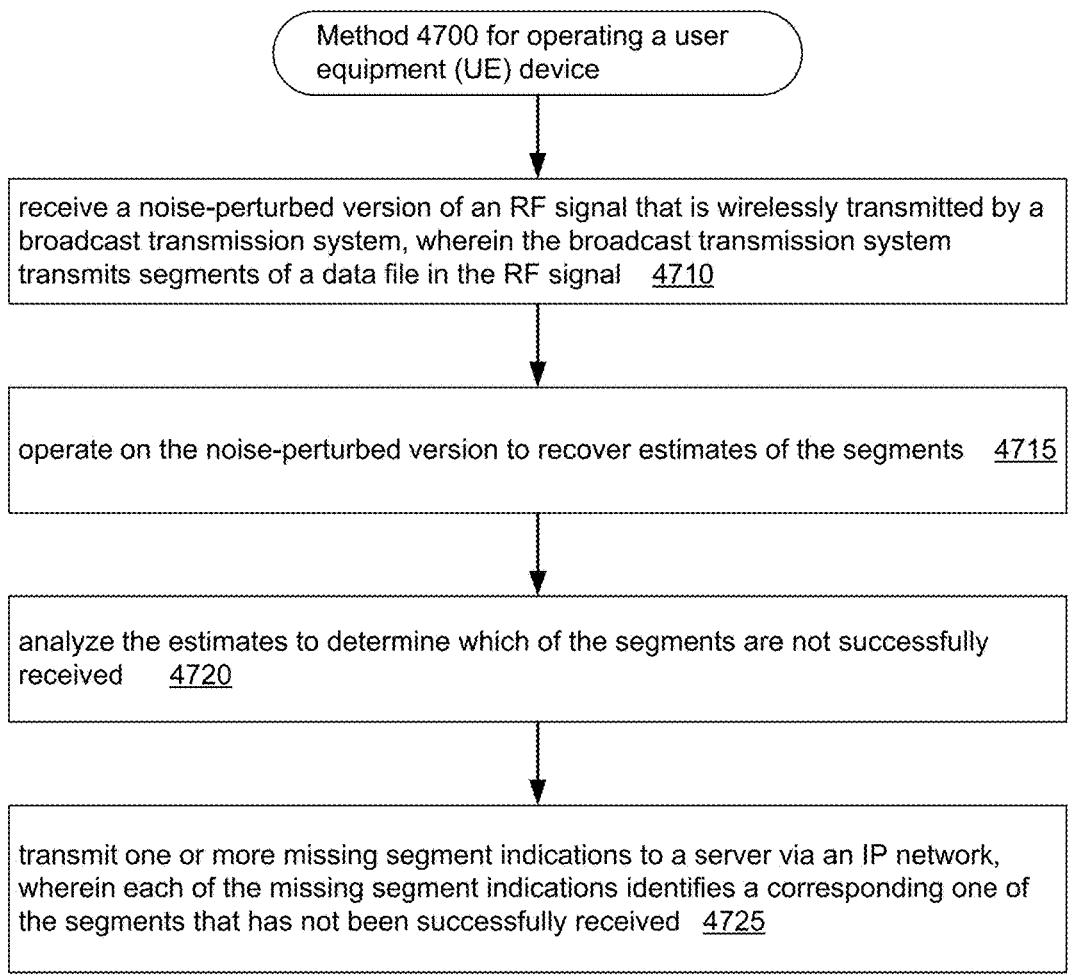
FIG. 47 illustrates one embodiment of a method for operating a user equipment device to facilitate the transfer of a data file to the user equipment.

In one set of embodiments, a method 4700 for operating a user equipment device may include the operations shown in FIG. 47. (The method 4700 may also include any subset of the features, elements and embodiments described above.) The method 4700 may be used to facilitate the transfer of a data file to the user equipment.

At 4710, the user equipment device receives a noise-perturbed version of an RF signal that is wirelessly transmitted by a broadcast transmission system, wherein the broadcast transmission system transmits segments of a data file in the RF signal.

At 4715, the user equipment device operates on the noise-perturbed version (e.g., by conventional means such as down conversion to baseband, analog-to-digital conversion, symbol estimation and data decoding) to recover estimates of the segments.

At 4720, the user equipment device analyzes the estimates to determine which of the segments are not successfully received (e.g., by analyzing an error detection code such as CRC).

At 4725, the user equipment device transmits one or more missing segment indications to a server via an IP network, wherein each of the missing segment indications identifies a corresponding one of the segments (e.g., by its sequence number and/or reception time stamp) that has not been successfully received.

In some embodiments, in response to receiving the missing segment indications, the server sends missing segment data to the user equipment device through the IP network, wherein the missing segment data includes a copy of each of the one or more segments identified by the one or more missing segment indications.

In some embodiments, the action transmitting the one or more missing segment indications includes wirelessly transmitting the one or more missing segment indications using a WiFi connection to a WiFi access point, wherein the WiFi access point is coupled (not necessarily directly) to the IP network.

In some embodiments, the action of transmitting the one or more missing segment indications includes wirelessly transmitting the one or more missing segment indications using a wireless connection to a base station, wherein the base station is coupled (not necessarily directly) to the IP network.

In some embodiments, the wireless connection is an LTE connection, wherein the base station is an LTE eNodeB.

In some embodiments, the RF signal also carries one or more video broadcast streams.

In some embodiments, the broadcast transmission system is part of a broadcast network that is connected to the IP network.

Figure 48:
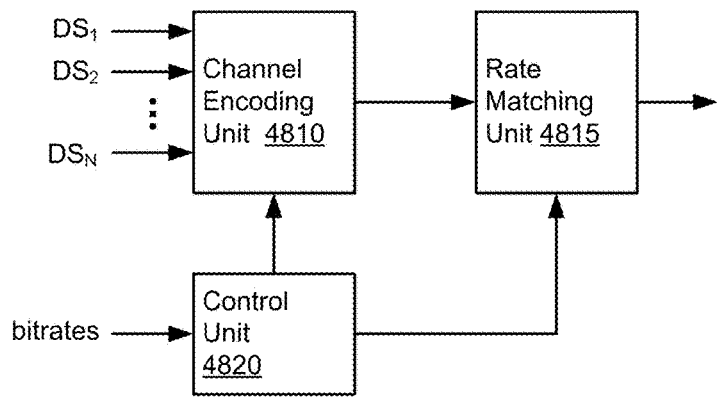
FIG. 48 illustrates one embodiment of a gateway that may be used to apply channel encoding with dynamically-variable coding rate to one or more data streams to be transmitted by a broadcast transmission system.

In one set of embodiments, a gateway 4800 may be configured as shown in FIG. 48. The gateway 4800 may include a channel encoding unit 4810, a rate matching unit 4815 and a control unit 4820. (The gateway 4800 may also include any subset of the features, elements and embodiments described above.) The gateway may be used to apply channel encoding with dynamically-variable coding rate to one or more data streams to be transmitted by a broadcast transmission system. At least one of the one or more data streams is a variable rate stream (i.e., including a variable number of information bits per unit time). The broadcast transmission system is configured to transmit data with a constant physical transport rate, the gateway comprising:

The gateway may be implemented by a computer system, by dedicated digital hardware such as one or more ASICs, by one or more programmable hardware elements such FPGAs, or by any combinatinon of the foregoing.

The channel encoding unit 4810 is configured to applying channel coding with fixed coding rate to the one or more data streams $DS_1, DS_2, \ldots, DS_N$ to obtain respectively one or more coded streams.

The rate matching unit (RMU) 4815 is configured to modify the one or more coded streams in order to obtain one or more respective modified streams, wherein the RMU is configured to modify the one or more coded streams by injecting null values into the one or more coded streams and/or by puncturing (i.e., discarding) selected values of the one or more coded streams.

The control unit 4820 is configured to receive information indicating a number of information bits per unit time in each of the one or more data streams.

The control unit 4820 is futher configured to vary the number of injected null values per unit time and/or the number of punctured values per unit time so that an aggregate bitrate of the one or more modified streams matches (i.e., is close to, and not greater than) the constant physical transport rate. The control unit supplies control signals to the rate matching unit, specifying null injection rates and/or puncture rates. The control unit varies the number of injected nulls per unit time and/or the number of punctured values per unit time based on the one or more numbers of information bits per unit time in the one or more respective data streams.

In some embodiments, the broadcast transmission system is configured to transmit the one or more modified streams as part of an OFDM output signal.

In some embodiments, the constant physical transport rate is determined at least in part by a number of subcarriers used by the OFDM output signal, a symbol rate of the OFDM output signal and a modulation scheme used by the subcarriers.

In some embodiments, the one or more data streams include one or more video streams, and/or, one or more audio streams.

Figure 49:
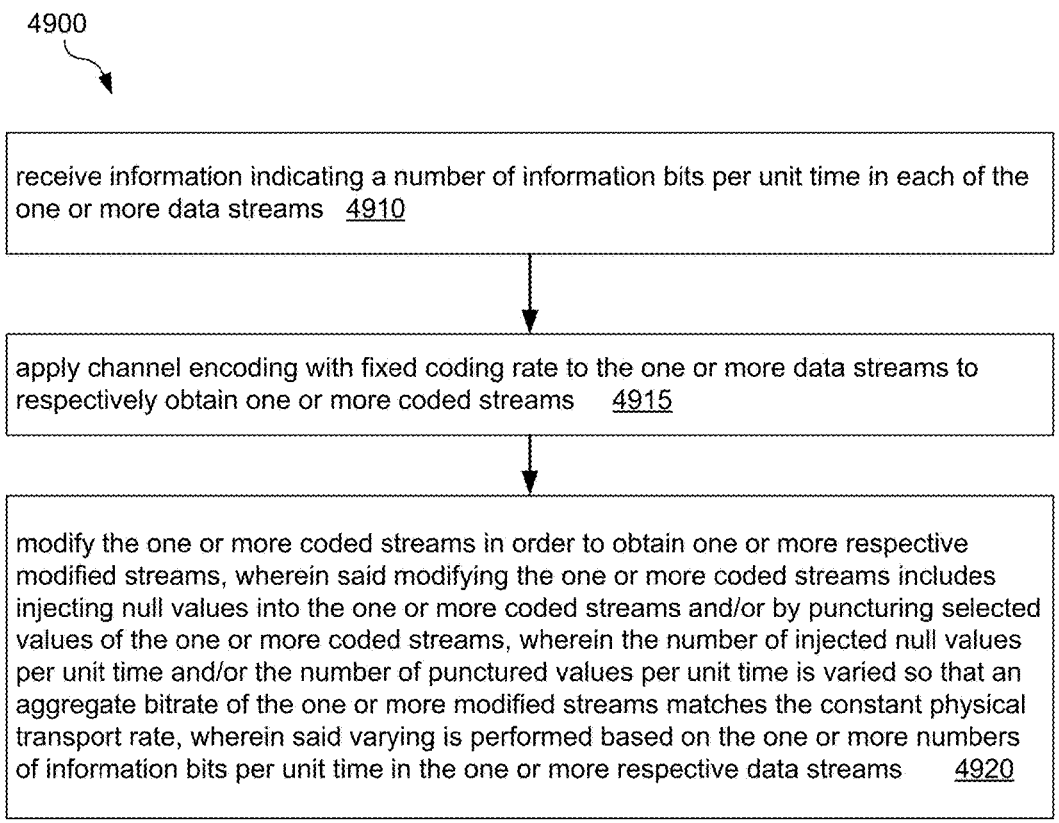
FIG. 49 illustrates one embodiment of a method for applying channel encoding with dynamically-variable coding rate to one or more data streams to be transmitted by a broadcast transmission system.

In one set of embodiments, a method 4900 may include the operations shown in FIG. 49. (The method 4900 may also include any subset of the features, elements and embodiments described above.) The method 4900 may used for applying channel encoding with dynamically-variable coding rate to one or more data streams to be transmitted by a broadcast transmission system. At least one of the one or more data streams is a variable rate stream (i.e., including a variable number of information bits per unit time), wherein the broadcast transmission system is configured to transmit data with a constant physical transport rate.

At 4910, the method includes receiving information indicating a number of information bits per unit time in each of the one or more data streams.

At 4915, the method includes applying channel encoding with fixed coding rate to the one or more data streams to respectively obtain one or more coded streams.

At 4920, the method includes modifying the one or more coded streams in order to obtain one or more respective modified streams, wherein said modifying the one or more coded streams includes injecting null values into the one or more coded streams and/or by puncturing (i.e., discarding) selected values of the one or more coded streams, wherein the number of injected null values per unit time and/or the number of punctured values per unit time is varied so that an aggregate bitrate of the one or more modified streams matches the constant physical transport rate, wherein said varying is performed based on the one or more numbers of information bits per unit time in the one or more respective data streams.

In some embodiments, the method also includes supplying the one or more modified streams to the broadcast transmission system for transmission through a wireless channel.

Additional embodiments regarding OFDM waveform configurability are disclosed in the following numbered paragraphs.

1.1 A method for configuring a broadcast transmission system, wherein the broadcast transmission system is configured to transmit signals using OFDM, the method comprising:

configuring the broadcast transmission system to transmit using a selected transmission band and one or more of the following: a value of FFT size selected from a set of two or more FFT sizes; a value of cyclic prefix percentage (for transmitted OFDM symbols) selected from a set of two or more CP percentage values;

wherein the selected transmission band is selected from a set of available transmission bands of different bandwidths, wherein a value of sample rate to be used by a digital-to-analog conversion unit of the broadcast transmission system is determined based on the bandwidth of the selected transmission band according to a linear relationship between sample rate and bandwidth.

1.2 The method of claim 1.1, wherein the linear relationship conforms to an existing LTE communication standard.

1.3 The method of claim 1.1, wherein the selected value of CP percentage is determined based on a maximum expected delay spread for user equipment devices in a cell corresponding to the broadcast transmission system.

1.4 The method of claim 1.1, wherein the selected value of FFT size is determined based on a maximum expected rate of motion of user equipment devices in a cell corresponding to the broadcast transmission system.

2.1 A method for configuring a broadcast transmission system, wherein the broadcast transmission system is configured to transmit signals using OFDM, the method comprising:

configuring the broadcast transmission system to transmit using a selected transmission band and one or more of the following: a value of OFDM subcarrier spacing selected from a set of two or more spacing values; and a value of cyclic prefix percentage (for transmitted OFDM symbols) selected from a set of two or more CP percentage values;

wherein the selected transmission band is selected from a set of available transmission bands of different bandwidths, wherein a value of sample rate to be used by a digital-to-analog conversion unit of the broadcast transmission system is determined based on the bandwidth of the selected transmission band according to a linear relationship between sample rate and bandwidth.

2.2 The method of claim 2.1, wherein the set of two or more spacing values comprises three or more spacing values.

2.3 The method of claim 2.1, wherein the selected value of subcarrier spacing is determined based on a maximum expected rate of motion of user equipment devices in a cell corresponding to the broadcast transmission system.

3.1 A method for configuring a broadcast transmission system, wherein the broadcast transmission system is configured to transmit signals using OFDM, the method comprising:

configuring the broadcast transmission system to transmit using a selected transmission band and one or more of the following: a first parameter value selected from a first set of two or more values, wherein the first set is a set of FFT sizes or a set of OFDM subcarrier spacing values; a second parameter value selected from a second set of two or more values, wherein the second set is a set of CP percentage values or a set of guard interval durations;

wherein the selected transmission band is selected from a set of available transmission bands of different bandwidths, wherein a value of sample rate to be used by a digital-to-analog conversion unit of the broadcast transmission system is determined based on the bandwidth of the selected transmission band according to a linear relationship between sample rate and bandwidth.

3.2 The method of claim 3.1, wherein the second parameter value is a guard interval duration, wherein the guard interval duration is a cyclic prefix duration or a null interval duration.

4.1 A computer-implemented method for configuring a broadcast transmission system, wherein the broadcast transmission system is configured to transmit signals using OFDM, the method comprising:

selecting a transmission band and one or more of the following:

a first parameter value from a first set of two or more values, wherein the first set is a set of FFT sizes or a set of OFDM subcarrier spacing values;

a second parameter value from a second set of two or more values, wherein the second set is a set of CP percentages or a set of guard interval durations;

wherein the transmission band is selected from a set of available transmission bands of different bandwidths, wherein a value of sample rate to be used by a digital-to-analog conversion unit of the broadcast transmission system is determined based on the bandwidth of the selected transmission band according to a linear relationship between sample rate and bandwidth;

transmitting parameter information to the broadcast transmission system (e.g., through an IP network), where the parameter information identifies the selected transmission band, the first parameter value and the second parameter value, wherein the broadcast transmission system is designed to reconfigure itself to transmit OFDM signals using the selected transmission band, the first parameter value and the second parameter value.

4.2 The method of claim 4.1, wherein the broadcast transmission system is configured to transmit the parameter information to UE devices (e.g., via a wireless broadcast transmission to the UE devices), wherein the UE devices are designed to reconfigure themselves to receive OFDM signals using the selected transmission band, the first parameter value and the second parameter value.

5.1 A method for configuring a user equipment (UE) device, wherein the UE device is configured to receive signals using OFDM, the method comprising:

configuring the UE device to receive using a selected reception band and one or more of the following:

a first parameter value selected from a first set of two or more values, wherein the first set is a set of FFT sizes or a set of OFDM subcarrier spacings;

a second parameter value selected from a second set of two or more values, wherein the second set is a set of CP percentages or a set of guard interval durations;

wherein the selected reception band is selected from a set of available reception bands of different bandwidths, wherein a value of sample rate to be used by an analog-to-digital conversion unit of the UE device is determined based on the bandwidth of the selected reception band according to a linear relationship between sample rate and bandwidth.

5.2 The method of claim 5.1, wherein the linear relationship conforms to an existing LTE communication standard.

Additional embodiments regarding configurable pilot density are disclosed in the following numbered paragraphs.

6.1 A method for operating a broadcast transmission system to accommodate a selected environment of user equipment mobility, the method comprising:

receiving N data stripes, wherein N is a positive integer, wherein N is a programmable parameter, wherein the value of N has been selected based on the maximum expected mobility of UE devices, wherein the N data stripes include data for one or more video data streams;

generating a sequence of symbols, wherein each of the symbols of said sequence corresponds to a respective one of a set of OFDM subcarriers, wherein said generating includes periodically interleaving pilot symbols and symbols from the N data stripes, wherein each contiguous segment of N+1 symbols in said sequence includes one symbol from each of the N stripes and one pilot symbol;

performing an IFFT on the sequence of symbols to obtain an OFDM transmit symbol.

6.2 The method of claim 6.1, wherein the value of N is selected by evaluating a predetermined decreasing function of the maximum expected mobility.

6.3 The method of claim 6.1, wherein N is greater than one.

6.4 The method of claim 6.1, further comprising:

receiving input redefining the value of N; and performing said generating and said performing the IFFT using the redefined value of N to achieve a different density of pilot symbols in the sequence of symbols.

6.5 The method of claim 8.1, further comprising:

repeating said generating and said performing an IFFT on a periodic basis, wherein, in each repetition, said periodically interleaving advances a mapping of subcarrier positions to stripe index by a fixed amount relative to an immediately previous repetition.

7.1 A method for operating a user equipment (UE) device, the method comprising:

receiving an OFDM signal from a wireless channel;

performing an FFT on a time-domain OFDM symbol of the OFDM signal to obtain a sequence of symbols, wherein each of the symbols of said sequence corresponds to a respective one of a set of OFDM subcarriers, wherein each contiguous segment of N+1 symbols in said sequence includes one symbol from each of N data stripes and one pilot symbol;

recovering symbols corresponding to each of the N stripes from the sequence of symbols by deinterleaving the symbols of the sequence;

forwarding the symbols corresponding to each of the N stripes to a corresponding stripe output buffer.

7.2 The method of claim 7.1, wherein the value of N is programmable.

7.3 The method of claim 7.1, wherein N is greater than one.

7.4 The method of claim 7.1, wherein the pilot symbols are used by the UE device to perform channel estimation.

7.5 The method of claim 7.1, further comprising:

operating on the symbols from one or more of the stripe output buffers to obtain corresponding stripe output streams.

7.5 The method of claim 7.1, further comprising:

recovering a redefined value of N from the OFDM signal; and performing said FFT, said recovering and said forwarding using the redefined value of N.

7.6 The method of claim 7.1, further comprising:

repeating said FFT, said recovering and said forwarding on a periodic basis, wherein, in each repetition, said deinterleaving advances a mapping of subcarrier positions to stripe index by a fixed amount relative to an immediately previous repetition.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

Although the above embodiments have been described in connection with the preferred embodiment, it is not intended to be limited to the specific form set forth herein, but on the contrary, it is intended to cover such alternatives, modifications, and equivalents, as can be reasonably included within the spirit and scope of the embodiments of the invention as defined by the appended claims.

What is claimed is:

1. A method for operating a server, wherein the server is part of an Internet Protocol (IP) network, the method comprising:
    performing operations to facilitate a non-realtime transfer of a data file to a user equipment (UE) device, the operations including:
        receiving segments of the data file from a broadcast gateway, wherein the broadcast gateway is configured to provide the segments to a broadcast transmission system for transmission as a Radio Frequency (RF) signal, wherein the RF signal includes a Uniform Resource Locator (URL) of the server, and wherein the broadcast gateway is configured to receive the segments of the data file from an external network;
        establishing a connection, that has been initiated using the URL, with the UE device;
        receiving one or more missing segment indications through the IP network from the UE device, the one or more missing segment indications being generated by the UE device based on the RF signal and identifying one or more segments that the UE device is not able to successfully recover from the RF signal, wherein each of the one or more missing segment indications includes:
            a sequence number of a respective one of the one or more segments that the UE device is not able to successfully recover from the RF signal; and
            a time-stamp associated with the respective one of the one or more segments that the UE device is not able to successfully recover from the RF signal; and
        sending the one or more segments identified by the missing segment indications to the UE device through the IP network.

2. The method of claim 1, wherein the broadcast gateway is also part of the IP network, and the server receives the segments of the data file from the broadcast gateway via the IP network.

3. The method of claim 1, wherein the RF signal also comprises a video broadcast signal for reception by a plurality of user devices.

4. A method for operating a user equipment device, the method comprising:
    performing operations to facilitate a non-realtime transfer of a data file to the user equipment device, wherein the operations include:
        receiving a Radio Frequency (RF) signal that is wirelessly transmitted by a broadcast transmission system, wherein the RF signal includes segments of the data file and a Uniform Resource Locator (URL) of a server that is part of an Internet Protocol (IP) network, wherein a broadcast gateway is configured to receive the segments of the data file from an external network and the broadcast gateway is configured to provide the segments of the data file to the broadcast transmission system and to the server;
        operating on the RF signal to recover estimates of the segments;
        analyzing the estimates to determine which of the segments are not successfully received by the user equipment device;
        establishing a connection, that has been initiated using the URL, with the server;
        transmitting one or more missing segment indications to the server via the IP network, wherein each of the missing segment indications identifies a corresponding one of the segments that has not been successfully received, and wherein each of the one or more missing segment indications includes:
            a sequence number of a respective one of the one or more segments that the UE device is not able to successfully recover from the RF signal; and
            a time-stamp associated with the respective one of the one or more segments that the UE device is not able to successfully recover from the RF signal; and
        receiving, via the IP network, segments corresponding to the missing segment indications.

5. The method of claim 4, wherein the RF signal also comprises one or more video broadcast streams.

6. The method of claim 4, wherein the broadcast transmission system is part of a broadcast network that is connected to the IP network.

7. A non-transitory memory medium for operating a user equipment device, wherein the non-transitory memory medium stores program instructions, wherein the program instructions, when executed by a processor, cause the processor to implement:

performing operations to facilitate a non-realtime transfer of a data file to the user equipment device, wherein the operations include:

receiving a Radio Frequency (RF) signal that is wirelessly transmitted by a broadcast transmission system, wherein the RF signal includes segments of the data file and a Uniform Resource Locator (URL) of a server that is part of an Internet Protocol (IP) network, wherein a broadcast gateway is configured to receive the segments of the data file from an external network and the broadcast gateway is configured to provide the segments of the data file to the broadcast transmission system and to the server;

operating on the RF signal to recover estimates of the segments;

analyzing the estimates to determine which of the segments are not successfully received by the user equipment device;

establishing a connection, that has been initiated using the URL, with the server;

transmitting one or more missing segment indications to the server via the IP network, wherein each of the missing segment indications identifies a corresponding one of the segments that has not been successfully received, and wherein each of the one or more missing segment indications includes:

a sequence number of a respective one of the one or more segments that the UE device is not able to successfully recover from the RF signal; and a time-stamp associated with the respective one of the one or more segments that the UE device is not able to successfully recover from the RF signal; and receiving, via the IP network, segments corresponding to the missing segment indications.

8. The non-transitory memory medium of claim 7, wherein the RF signal also comprises one or more video broadcast streams.

9. The non-transitory memory medium of claim 7, wherein the broadcast transmission system is part of a broadcast network that is connected to the IP network.

10. The non-transitory memory medium of claim 7, wherein the data file is not part of a video broadcast stream.

\* \* \* \* \*